United States Patent
Eickhoff et al.

(10) Patent No.: US 12,194,670 B2
(45) Date of Patent: Jan. 14, 2025

(54) PROCESS OF FORMING POLYMERIC MATERIAL

(71) Applicant: Berry Global, Inc., Evansville, IN (US)

(72) Inventors: Jonathan Eickhoff, Evansville, IN (US); Ryan Dewig, Evansville, IN (US); Jeffrey A. Mann, Evansville, IN (US); Roy E. Ackerman, Evansville, IN (US); Dan Eichelberger, Newburgh, IN (US); Holden W. Barnes, Evansville, IN (US); Zachary L. Baughman, Evansville, IN (US); Kody A. Chapman, Slaughters, KY (US); Daniel O. Davis, Cynthiana, IN (US)

(73) Assignee: Berry Global, Inc., Evansville, IN (US)

( * ) Notice: Subject to any disclaimer, the term of this patent is extended or adjusted under 35 U.S.C. 154(b) by 0 days.

(21) Appl. No.: 18/127,353

(22) Filed: Mar. 28, 2023

(65) Prior Publication Data

US 2023/0234277 A1    Jul. 27, 2023

Related U.S. Application Data

(63) Continuation of application No. 17/871,083, filed on Jul. 22, 2022, now Pat. No. 11,679,542, which is a
(Continued)

(51) Int. Cl.
| | |
|---|---|
| *B29C 51/22* | (2006.01) |
| *B29C 51/26* | (2006.01) |
| *B29C 51/44* | (2006.01) |
| *B29K 21/00* | (2006.01) |
| *B29K 23/00* | (2006.01) |

(52) U.S. Cl.
CPC ............ *B29C 51/22* (2013.01); *B29C 51/268* (2013.01); *B29C 51/44* (2013.01); *B29K 2021/00* (2013.01); *B29K 2023/10* (2013.01)

(58) Field of Classification Search
CPC .................................................... B29C 51/262
See application file for complete search history.

(56) References Cited

U.S. PATENT DOCUMENTS

| | | |
|---|---|---|
| D7,248 S | 3/1874 | Elstrand |
| D53,911 S | 10/1919 | Humphrey |
| (Continued) | | |

FOREIGN PATENT DOCUMENTS

| | | |
|---|---|---|
| CA | 3059250 A1 | 10/2018 |
| CN | 3107990 | 1/1999 |
| (Continued) | | |

OTHER PUBLICATIONS

International Search Report for PCT/US06/32565, dated May 24, 2007.
(Continued)

*Primary Examiner* — Timothy Kennedy
*Assistant Examiner* — Inja Song
(74) *Attorney, Agent, or Firm* — Barnes & Thornburg LLP

(57) ABSTRACT

A method for forming an article includes providing a sheet of material, optionally conditioning the sheet with a surface of a roller, forming the sheet to provide a web, and separating an article from the web to provide the article. An apparatus adapted to form the article from a sheet is provided.

10 Claims, 18 Drawing Sheets

Related U.S. Application Data continuation of application No. 16/782,203, filed on Feb. 5, 2020, now Pat. No. 11,433,591.

(60) Provisional application No. 62/802,014, filed on Feb. 6, 2019.

(56) References Cited

U.S. PATENT DOCUMENTS

| | | | |
|---|---|---|---|
| D58,571 S | 8/1921 | Hyatt | |
| 1,395,594 A | 11/1921 | Pfefferle | |
| D62,268 S | 4/1923 | Stern | |
| D64,091 S | 2/1924 | Weintraub | |
| D65,193 S | 7/1924 | Leveridge | |
| 1,624,849 A * | 4/1927 | Steele | B29C 51/225 156/515 |
| D78,805 S | 6/1929 | Burke | |
| 1,755,042 A | 4/1930 | Zoller | |
| 1,773,972 A | 8/1930 | Eberhart | |
| 1,940,088 A | 12/1933 | Harrison | |
| 2,015,028 A | 9/1935 | Gillette | |
| 2,050,487 A | 8/1936 | Durrant | |
| 2,120,403 A | 6/1938 | Godfrey | |
| D111,097 S | 8/1938 | White | |
| 2,174,618 A | 10/1939 | Burdick | |
| 2,271,589 A | 2/1942 | Hendrickson | |
| 2,313,801 A | 3/1943 | Carll | |
| 2,374,092 A | 4/1945 | Glaser | |
| D141,225 S | 5/1945 | Ray | |
| 2,447,407 A | 8/1948 | Grain | |
| 2,649,984 A | 8/1953 | Abt | |
| D172,089 S | 5/1954 | Du Pree | |
| 2,766,796 A | 10/1956 | Tupper | |
| 2,985,354 A | 5/1961 | Aldington | |
| 3,027,596 A | 4/1962 | Knowles | |
| 3,048,317 A | 8/1962 | Cochrane | |
| 3,055,540 A | 9/1962 | Ringlen | |
| 3,065,875 A | 11/1962 | Negoro | |
| 3,071,281 A | 1/1963 | Sawai | |
| 3,103,224 A | 9/1963 | Dearling | |
| 3,128,903 A | 4/1964 | Crisci | |
| 3,245,691 A | 4/1966 | Gorman | |
| 3,262,602 A | 7/1966 | McConnell | |
| 3,269,734 A | 8/1966 | Ottofy | |
| 3,301,459 A | 1/1967 | Gardner | |
| 3,329,304 A | 7/1967 | Crisci | |
| 3,329,305 A | 7/1967 | Crisci | |
| 3,349,950 A | 10/1967 | Wanderer | |
| 3,392,468 A | 7/1968 | Wolf | |
| 3,421,653 A | 1/1969 | Whaley | |
| 3,433,378 A | 3/1969 | Ross | |
| 3,502,765 A | 3/1970 | Spencer | |
| 3,524,566 A | 8/1970 | Parks | |
| 3,561,668 A | 2/1971 | Bergstrom | |
| 3,583,596 A | 6/1971 | Brewer | |
| D221,420 S | 8/1971 | Davis | |
| 3,604,588 A | 9/1971 | Winnick | |
| 3,609,263 A | 9/1971 | Clementi | |
| 3,610,306 A | 10/1971 | Summers | |
| 3,612,342 A | 10/1971 | Rathbun | |
| 3,624,787 A | 11/1971 | Newman | |
| D222,905 S | 2/1972 | Kinney | |
| 3,676,089 A | 7/1972 | Swett | |
| 3,677,435 A | 7/1972 | Davis | |
| 3,679,088 A | 7/1972 | Swett | |
| 3,679,089 A | 7/1972 | Swett | |
| D226,063 S | 1/1973 | Warnberg | |
| 3,734,276 A | 5/1973 | Bank | |
| 3,743,133 A | 7/1973 | Rathbun | |
| 3,745,055 A | 7/1973 | Gorman | |
| 3,746,158 A | 7/1973 | Connick | |
| 3,752,042 A | 8/1973 | Castille | |
| 3,768,688 A | 10/1973 | Linke | |
| 3,789,095 A * | 1/1974 | Winstead | B29C 51/225 264/DIG. 13 |
| 3,805,991 A | 4/1974 | Cheladze | |
| 3,817,420 A | 6/1974 | Heisler | |
| 3,828,637 A | 8/1974 | Slack | |
| 3,840,144 A | 10/1974 | Dry | |
| D233,599 S | 11/1974 | Davis | |
| 3,926,084 A | 12/1975 | Blazer | |
| RE28,797 E | 5/1976 | Brewer | |
| 3,954,923 A | 5/1976 | Valyi | |
| 3,974,916 A | 8/1976 | Bartolucci | |
| 3,977,563 A | 8/1976 | Holt | |
| 3,994,411 A | 11/1976 | Elfelt | |
| D242,736 S | 12/1976 | Craft, III | |
| D242,738 S | 12/1976 | Michaeli | |
| 4,006,839 A | 2/1977 | Thiel | |
| 4,007,936 A | 2/1977 | Hornsby | |
| 4,018,355 A | 4/1977 | Ando | |
| 4,026,459 A | 5/1977 | Blanchard | |
| 4,054,229 A | 10/1977 | Arfert | |
| 4,061,706 A | 12/1977 | Duffield | |
| D246,955 S | 1/1978 | Davis | |
| 4,074,827 A | 2/1978 | Labe | |
| 4,078,686 A | 3/1978 | Karesh | |
| D248,376 S | 7/1978 | Allen | |
| D251,828 S | 5/1979 | Smith | |
| 4,190,174 A | 2/1980 | Haimowitz | |
| 4,194,645 A | 3/1980 | Zabner | |
| 4,210,258 A | 7/1980 | Von Holdt | |
| 4,211,743 A | 7/1980 | Nauta et al. | |
| D256,558 S | 8/1980 | Smith | |
| D258,576 S | 3/1981 | Smith | |
| 4,266,689 A | 5/1981 | Asher | |
| D261,486 S | 10/1981 | Smith | |
| 4,293,080 A | 10/1981 | Letica | |
| D262,691 S | 1/1982 | Horsley | |
| D264,440 S | 5/1982 | Austin | |
| D264,690 S | 6/1982 | Bagwell | |
| 4,349,119 A | 9/1982 | Letica | |
| 4,351,448 A | 9/1982 | Ingersoll | |
| 4,370,908 A | 2/1983 | Dealto | |
| 4,380,305 A | 4/1983 | Von Holdt | |
| 4,389,802 A | 6/1983 | McLaren | |
| 4,408,698 A | 10/1983 | Ballester | |
| 4,412,467 A | 11/1983 | Desanto | |
| 4,413,964 A * | 11/1983 | Winstead | B29C 48/08 425/161 |
| D271,857 S | 12/1983 | Callahan | |
| 4,421,244 A | 12/1983 | Van Melle | |
| 4,421,712 A | 12/1983 | Winstead | |
| D272,324 S | 1/1984 | Mumford | |
| 4,444,332 A | 4/1984 | Widen | |
| 4,446,986 A | 5/1984 | Bowen | |
| 4,474,305 A | 10/1984 | Marco | |
| 4,508,235 A | 4/1985 | Steele | |
| 4,518,097 A | 5/1985 | Milton | |
| 4,524,882 A | 6/1985 | Buc | |
| 4,562,937 A | 1/1986 | Iyengar | |
| D286,026 S | 10/1986 | Rayner | |
| 4,629,088 A | 12/1986 | Durgin | |
| 4,640,434 A | 2/1987 | Johnsen | |
| 4,640,435 A | 2/1987 | Dutt | |
| 4,674,644 A | 6/1987 | Jacobs | |
| 4,679,699 A | 7/1987 | Malsbury | |
| D292,380 S | 10/1987 | Smith | |
| 4,721,210 A | 1/1988 | Lawrence | |
| 4,722,820 A | 2/1988 | Flecknoe-Brown | |
| 4,782,976 A | 11/1988 | Kenyon | |
| D298,919 S | 12/1988 | Gee | |
| 4,799,602 A | 1/1989 | Collins | |
| 4,836,407 A | 6/1989 | Bruce | |
| 4,872,586 A | 10/1989 | Landis | |
| 4,886,184 A | 12/1989 | Chamourian | |
| 4,934,557 A | 6/1990 | Smith | |
| D309,564 S | 7/1990 | Rayner | |
| 4,971,211 A | 11/1990 | Lake | |
| 4,994,229 A | 2/1991 | Flecknoe-Brown | |
| D317,262 S | 6/1991 | Bluff | |
| 5,064,082 A | 11/1991 | Lombardi | |
| 5,088,367 A | 2/1992 | Cracchiolo | |
| 5,099,232 A | 3/1992 | Howes | |

(56) References Cited

U.S. PATENT DOCUMENTS

| | | |
|---|---|---|
| 5,106,567 A | 4/1992 | Demerest |
| 5,111,961 A | 5/1992 | Van Melle |
| 5,151,233 A | 9/1992 | Wendt |
| 5,180,079 A | 1/1993 | Jeng |
| 5,188,691 A * | 2/1993 | Caputo .................. B32B 38/06 156/499 |
| 5,197,624 A | 3/1993 | Dodaro |
| 5,219,627 A | 6/1993 | Arase |
| D339,027 S | 9/1993 | Mack |
| 5,375,828 A | 12/1994 | Shikami |
| 5,377,860 A | 1/1995 | Littlejohn |
| 5,390,810 A | 2/1995 | Stroble |
| 5,397,023 A | 3/1995 | Toczek |
| 5,398,843 A | 3/1995 | Warden |
| 5,427,266 A | 6/1995 | Yun |
| D360,133 S | 7/1995 | Boller |
| 5,460,286 A | 10/1995 | Rush |
| D365,516 S | 12/1995 | Williamson |
| 5,489,026 A | 2/1996 | Daloia |
| D368,430 S | 4/1996 | Herzog |
| D368,444 S | 4/1996 | Shryock |
| 5,503,289 A | 4/1996 | Fox |
| 5,509,568 A | 4/1996 | Warden |
| 5,524,788 A | 6/1996 | Plester |
| 5,531,347 A | 7/1996 | Goulding |
| 5,542,532 A | 8/1996 | Mitchell |
| D374,822 S | 10/1996 | Philips |
| 5,592,766 A | 1/1997 | Mygatt |
| 5,613,619 A | 3/1997 | Van Melle |
| 5,614,228 A | 3/1997 | Demerest |
| 5,641,063 A | 6/1997 | Gambardella |
| D380,385 S | 7/1997 | Litke |
| D381,267 S | 7/1997 | Rush |
| D384,580 S | 10/1997 | Fernandes |
| D384,862 S | 10/1997 | Hayes |
| 5,713,463 A | 2/1998 | Lakoski |
| 5,722,558 A | 3/1998 | Thompson |
| 5,746,312 A | 5/1998 | Johnson |
| 5,769,263 A | 6/1998 | Willingham |
| 5,775,194 A | 7/1998 | Spada |
| 5,783,229 A | 7/1998 | Manlove |
| 5,791,509 A | 8/1998 | Rush |
| 5,795,535 A | 8/1998 | Giovannone |
| D398,997 S | 9/1998 | Taylor |
| 5,806,707 A | 9/1998 | Boehm |
| 5,820,016 A | 10/1998 | Stropkay |
| 5,829,583 A | 11/1998 | Verweyst |
| 5,839,601 A | 11/1998 | Melle |
| 5,868,309 A | 2/1999 | Sandstrom |
| D408,223 S | 4/1999 | Henry |
| 5,894,952 A | 4/1999 | Mendenhall |
| 5,913,964 A | 6/1999 | Melton |
| 5,947,278 A | 9/1999 | Sawhney |
| 5,947,323 A | 9/1999 | Freek |
| 5,979,690 A | 11/1999 | Hartley |
| 5,983,693 A | 11/1999 | Bodnar |
| 6,021,917 A | 2/2000 | Lovell |
| 6,056,144 A | 5/2000 | Strange |
| 6,070,752 A | 6/2000 | Nava |
| D428,355 S | 7/2000 | Kavalek |
| 6,086,800 A | 7/2000 | Manlove |
| 6,089,397 A | 7/2000 | Van Melle |
| D432,868 S | 10/2000 | Tan |
| 6,126,035 A | 10/2000 | Schaper |
| 6,161,354 A | 12/2000 | Gilbert |
| D437,223 S | 2/2001 | Coy |
| D437,671 S | 2/2001 | Fajerstein |
| 6,196,404 B1 | 3/2001 | Chen |
| 6,196,411 B1 | 3/2001 | Nava |
| 6,216,857 B1 | 4/2001 | Gordon |
| 6,257,435 B1 | 7/2001 | Chedister |
| 6,257,629 B1 | 7/2001 | Weichelt |
| D446,150 S | 8/2001 | Bamminger |
| 6,279,300 B1 | 8/2001 | Simhaee |
| 6,299,014 B1 | 10/2001 | Nava |
| 6,302,288 B1 | 10/2001 | Nava |
| 6,311,860 B1 | 11/2001 | Reidinger |
| 6,319,456 B1 | 11/2001 | Gilbert |
| D452,155 S | 12/2001 | Stodd |
| 6,330,943 B1 | 12/2001 | Gordon |
| 6,349,821 B1 | 2/2002 | Gordon |
| 6,357,619 B1 | 3/2002 | Schaefer |
| 6,364,102 B1 | 4/2002 | Gordon |
| 6,371,289 B1 | 4/2002 | Gordon |
| 6,394,783 B1 | 5/2002 | Dalgewicz, III |
| 6,404,730 B2 | 6/2002 | Yeo |
| 6,412,629 B1 | 7/2002 | Gordon |
| 6,419,112 B1 | 7/2002 | Bruce |
| D461,141 S | 8/2002 | Steiner |
| 6,427,832 B1 | 8/2002 | Ali |
| 6,454,087 B2 | 9/2002 | Gordon |
| 6,460,716 B1 | 10/2002 | Wong |
| 6,464,072 B2 | 10/2002 | Gordon |
| 6,478,148 B2 | 11/2002 | Gordon |
| 6,481,573 B2 | 11/2002 | Gordon |
| D468,494 S | 1/2003 | Holloway |
| D469,693 S | 2/2003 | Weiss |
| D471,810 S | 3/2003 | Hayes |
| 6,533,114 B1 | 3/2003 | Gordon |
| 6,554,154 B1 | 4/2003 | Chauhan |
| 6,557,698 B2 | 5/2003 | Gordon |
| 6,561,122 B1 | 5/2003 | Kurja |
| 6,561,345 B2 | 5/2003 | Gordon |
| 6,571,943 B2 | 6/2003 | Gordon |
| 6,576,309 B2 | 6/2003 | Dalgewicz, III |
| 6,588,182 B2 | 7/2003 | Gordon |
| 6,598,741 B2 | 7/2003 | Gordon |
| 6,604,629 B2 | 8/2003 | Gordon |
| 6,612,456 B1 | 9/2003 | Hundley |
| 6,625,959 B2 | 9/2003 | Gordon |
| 6,626,288 B2 | 9/2003 | Gordon |
| D480,968 S | 10/2003 | Atkins |
| 6,641,384 B2 | 11/2003 | Bosler |
| 6,647,696 B2 | 11/2003 | Gordon |
| 6,648,134 B2 | 11/2003 | Gordon |
| D482,985 S | 12/2003 | Bombeke |
| 6,688,487 B2 | 2/2004 | Oakes |
| D487,411 S | 3/2004 | Bamminger |
| 6,737,008 B2 | 5/2004 | Gilbert |
| D492,901 S | 7/2004 | Woods |
| 6,814,905 B1 | 11/2004 | Dalgewicz |
| 6,840,375 B2 | 1/2005 | Gordon |
| 6,846,533 B2 | 1/2005 | Wu |
| D502,050 S | 2/2005 | Munson |
| 6,874,649 B2 | 4/2005 | Clarke |
| 6,886,707 B2 | 5/2005 | Giraud |
| 6,889,860 B2 | 5/2005 | Mazzarolo |
| 6,907,702 B2 | 6/2005 | Gilbert |
| 6,910,599 B2 | 6/2005 | Tucker |
| 6,923,338 B2 | 8/2005 | Dees |
| 6,929,143 B2 | 8/2005 | Mazzarolo |
| 6,932,234 B2 | 8/2005 | Damato |
| 6,948,633 B2 | 9/2005 | Freek |
| 6,959,829 B2 | 11/2005 | Crider |
| 7,000,522 B2 | 2/2006 | Pfaff, Jr. |
| D516,910 S | 3/2006 | Bresler |
| D517,322 S | 3/2006 | Zettle |
| 7,017,774 B2 | 3/2006 | Haedt |
| D519,374 S | 4/2006 | Hornke |
| D521,382 S | 5/2006 | Gross |
| D522,240 S | 6/2006 | Laval |
| 7,055,715 B2 | 6/2006 | Maravich |
| 7,063,224 B2 | 6/2006 | Clarke |
| D525,869 S | 8/2006 | Tedford, Jr. |
| D527,261 S | 8/2006 | Hrnke |
| 7,100,787 B2 | 9/2006 | Farnsworth |
| 7,108,495 B2 | 9/2006 | Gilbert |
| D529,391 S | 10/2006 | Glass |
| D533,777 S | 12/2006 | Hundley |
| 7,144,619 B2 | 12/2006 | Ramchandra |
| 7,156,251 B2 | 1/2007 | Smith |
| 7,157,034 B2 | 1/2007 | Bristow |
| 7,159,732 B2 | 1/2007 | Smith |
| 7,169,855 B2 | 1/2007 | Yamaguchi |

(56) References Cited

U.S. PATENT DOCUMENTS

| | | |
|---|---|---|
| 7,175,042 B2 | 2/2007 | Durdon |
| 7,213,709 B2 | 5/2007 | Moskovich |
| D543,787 S | 6/2007 | Wasserman |
| 7,225,945 B2 | 6/2007 | Crider |
| 7,232,302 B2 | 6/2007 | Marzona |
| 7,246,714 B2 | 7/2007 | Garg |
| 7,255,391 B2 | 8/2007 | Bristow |
| 7,284,673 B2 | 10/2007 | Habeger |
| 7,284,676 B2 | 10/2007 | Dantani |
| D556,037 S | 11/2007 | D'Amato |
| D556,574 S | 12/2007 | Hollis |
| D559,105 S | 1/2008 | D'Amato |
| D560,120 S | 1/2008 | Maravich |
| 7,318,536 B2 | 1/2008 | Maravich |
| 7,318,563 B2 | 1/2008 | Houts |
| 7,328,791 B1 | 2/2008 | Bosworth |
| D564,354 S | 3/2008 | Maravich |
| 7,353,582 B2 | 4/2008 | MacKenzie |
| D569,245 S | 5/2008 | Joshi |
| D570,685 S | 6/2008 | Koennecke |
| D570,686 S | 6/2008 | Hollis |
| D572,587 S | 7/2008 | Rush |
| D574,231 S | 8/2008 | Laval |
| D574,238 S | 8/2008 | Walker, III |
| D574,290 S | 8/2008 | Shah |
| 7,413,698 B2 | 8/2008 | Bearse |
| D578,829 S | 10/2008 | Freeman |
| 7,455,006 B2 | 11/2008 | Toth |
| 7,464,831 B2 | 12/2008 | Aiken |
| 7,484,639 B2 | 2/2009 | Maravich |
| D588,002 S | 3/2009 | D'Amato |
| 7,513,382 B2 | 4/2009 | Clarke |
| 7,523,534 B2 | 4/2009 | Mackenzie |
| D591,476 S | 5/2009 | Colman |
| D592,952 S | 5/2009 | Hundley |
| D593,892 S | 6/2009 | Schneider |
| 7,549,559 B2 | 6/2009 | Conroy |
| D596,524 S | 7/2009 | Schneider |
| 7,591,389 B2 | 9/2009 | Wong |
| 7,611,660 B2 | 11/2009 | Bosler |
| 7,624,536 B2 | 12/2009 | Schromm |
| 7,628,946 B2 | 12/2009 | Gandon |
| 7,642,316 B2 | 1/2010 | Rego |
| 7,658,296 B2 | 2/2010 | Van Handel |
| 7,658,882 B2 | 2/2010 | Minganti |
| 7,676,909 B2 | 3/2010 | MacKenzie |
| 7,685,677 B2 | 3/2010 | Garg |
| D613,199 S | 4/2010 | Schneider |
| 7,691,302 B2 | 4/2010 | Hollis |
| D614,954 S | 5/2010 | Crowell |
| 7,754,299 B2 | 7/2010 | Wu |
| 7,762,213 B2 | 7/2010 | Cook |
| 7,784,641 B2 | 8/2010 | Chou |
| D624,413 S | 9/2010 | Selina |
| 7,819,271 B2 | 10/2010 | Hollis |
| 7,837,923 B2 | 11/2010 | Bearse |
| 7,845,510 B2 | 12/2010 | Schmidtner |
| 7,845,514 B2 | 12/2010 | Rush |
| 7,850,812 B2 | 12/2010 | Sekar |
| 7,866,502 B2 | 1/2011 | Maxwell |
| 7,874,449 B1 | 1/2011 | Studee |
| 7,992,741 B2 | 8/2011 | Hundley |
| 7,997,230 B2 | 8/2011 | Cook |
| 8,007,269 B1 | 8/2011 | Otto |
| 8,038,432 B2 | 10/2011 | Mazzarolo |
| 8,074,331 B2 | 12/2011 | Voges |
| 8,074,831 B2 | 12/2011 | Walker |
| 8,084,109 B2 | 12/2011 | Gao |
| 8,113,379 B2 | 2/2012 | Cai |
| 8,142,587 B2 | 3/2012 | Sekar |
| 8,142,599 B2 | 3/2012 | Sekar |
| 8,152,018 B2 | 4/2012 | Smith |
| 8,196,500 B2 | 6/2012 | Mansfield |
| 8,211,355 B2 | 7/2012 | Otto |
| 8,276,776 B2 | 10/2012 | Roth |
| 8,282,382 B2 | 10/2012 | Mazzarolo |
| 8,286,823 B2 | 10/2012 | Turvey |
| 8,287,270 B2 | 10/2012 | Lee |
| 8,308,884 B2 | 11/2012 | Sekar |
| 8,312,993 B2 | 11/2012 | Sams |
| 8,317,050 B2 | 11/2012 | Hollis |
| 8,348,053 B2 | 1/2013 | Bellamah |
| 8,418,871 B1 | 4/2013 | Lamasney |
| 8,430,268 B2 | 4/2013 | Weiss |
| D685,286 S | 7/2013 | Bhansali |
| 8,474,643 B2 | 7/2013 | Hundley |
| 8,486,211 B2 | 7/2013 | Sekar |
| 8,499,947 B2 | 8/2013 | Trost |
| 8,544,677 B2 | 10/2013 | Selina |
| D693,181 S | 11/2013 | Chase |
| D694,109 S | 11/2013 | Tanner |
| 8,573,400 B1 | 11/2013 | Lamasney |
| 8,592,014 B2 | 11/2013 | Alvarez |
| D695,612 S | 12/2013 | Chou |
| 8,616,405 B2 | 12/2013 | French |
| D696,940 S | 1/2014 | Hale |
| 8,623,261 B2 | 1/2014 | Patkar |
| 8,628,319 B2 | 1/2014 | Mazzarolo |
| 8,628,718 B2 | 1/2014 | Li |
| 8,632,831 B2 | 1/2014 | Perry |
| D699,619 S | 2/2014 | Kothari |
| 8,642,102 B2 | 2/2014 | Field |
| D700,513 S | 3/2014 | Carsrud |
| 8,662,880 B2 | 3/2014 | Fowler |
| 8,753,106 B2 | 6/2014 | Lee |
| 8,764,928 B2 | 7/2014 | Sekar |
| 8,771,451 B2 | 7/2014 | Sekar |
| 8,777,013 B1 | 7/2014 | Jalindre |
| 8,777,046 B2 | 7/2014 | Mann |
| 8,800,801 B2 | 8/2014 | Freeman |
| 8,895,092 B1 | 11/2014 | Field |
| 8,939,312 B1 | 1/2015 | Buck |
| D722,873 S | 2/2015 | Wu |
| 8,950,623 B2 | 2/2015 | Fleming |
| D726,025 S | 4/2015 | Somers |
| 9,034,231 B2 | 5/2015 | Tabor |
| D732,959 S | 6/2015 | Branstad |
| 9,051,106 B2 | 6/2015 | Milano |
| D734,894 S | 7/2015 | Schlatter |
| 9,078,535 B1 | 7/2015 | Buck |
| 9,102,446 B2 | 8/2015 | Kowal |
| 9,114,902 B2 | 8/2015 | Temple, Jr. |
| D737,689 S | 9/2015 | Monteparo |
| 9,144,464 B2 | 9/2015 | Knowlton |
| 9,156,950 B2 | 10/2015 | Garralda |
| D744,288 S | 12/2015 | Rosen |
| 9,199,776 B1 | 12/2015 | Bruce |
| D746,682 S | 1/2016 | Trombetta |
| D751,382 S | 3/2016 | Torrison |
| 9,278,787 B2 | 3/2016 | Garg |
| 9,352,886 B2 | 5/2016 | Baillies |
| D761,104 S | 7/2016 | Buck |
| 9,421,710 B2 | 8/2016 | Drebes |
| 9,474,420 B2 | 10/2016 | Oakes |
| 9,526,362 B2 | 12/2016 | Wang |
| 9,546,018 B1 | 1/2017 | Vovan |
| 9,561,885 B1 | 2/2017 | Studee |
| 9,656,418 B2 | 5/2017 | Kezios |
| 9,669,992 B2 | 6/2017 | Temple, Jr. |
| D793,231 S | 8/2017 | Ken |
| D793,899 S | 8/2017 | Tilbrook |
| 9,717,651 B2 | 8/2017 | Hohl |
| 9,814,334 B2 | 11/2017 | Eickhoff |
| 9,815,239 B2 | 11/2017 | Borse |
| 10,113,058 B2 | 10/2018 | Bockman |
| D838,590 S | 1/2019 | Lee |
| D838,591 S | 1/2019 | Lee |
| 10,201,241 B2 | 2/2019 | Eickhoff |
| D845,128 S | 4/2019 | Eickhoff |
| 10,286,593 B2 | 5/2019 | Topolkaraev |
| D850,260 S | 6/2019 | Eickhoff |
| D867,873 S | 11/2019 | Troudt |
| D876,233 S | 2/2020 | Pan |
| 10,570,263 B2 | 2/2020 | Wallis |

(56) References Cited

U.S. PATENT DOCUMENTS

| | | |
|---|---|---|
| 10,577,159 B2 | 3/2020 | Peng |
| D885,911 S | 6/2020 | Silva |
| D885,912 S | 6/2020 | Silva |
| D907,997 S | 1/2021 | Eickhoff |
| D911,168 S | 2/2021 | Eickhoff |
| 11,014,722 B2 | 5/2021 | Peng |
| 11,040,499 B2 | 6/2021 | Eickhoff |
| D930,476 S | 9/2021 | Bontrager |
| D944,083 S | 2/2022 | Boggs |
| D945,264 S | 3/2022 | Eickhoff |
| D953,161 S | 5/2022 | Tang |
| D955,160 S | 6/2022 | Liu |
| 11,433,591 B2 | 9/2022 | Eickhoff |
| D976,105 S | 1/2023 | Eickhoff |
| 11,548,701 B2 | 1/2023 | Peng |
| D984,894 S | 5/2023 | Eickhoff |
| D993,770 S | 8/2023 | Eickhoff |
| D993,771 S | 8/2023 | Eickhoff |
| 11,891,488 B2 | 2/2024 | Peng |
| 2001/0001376 A1 | 5/2001 | Kneppe |
| 2002/0027139 A1 | 3/2002 | Oneill |
| 2002/0037378 A1 | 3/2002 | Littlejohn |
| 2002/0184985 A1 | 12/2002 | Ishibuchi |
| 2002/0189957 A1 | 12/2002 | Gordon |
| 2003/0062272 A1 | 4/2003 | Gordon |
| 2003/0089714 A1 | 5/2003 | Dart |
| 2003/0089726 A1 | 5/2003 | Mazzarolo |
| 2003/0114288 A1 | 6/2003 | Harding |
| 2003/0155353 A1 | 8/2003 | Tucker |
| 2003/0170460 A1 | 9/2003 | Sienkiewicz |
| 2003/0192890 A1 | 10/2003 | Mazzarolo |
| 2004/0011803 A1 | 1/2004 | Damato |
| 2004/0094553 A1 | 5/2004 | Crider |
| 2004/0101703 A1 | 5/2004 | Funaki |
| 2004/0134911 A1 | 7/2004 | Padovani |
| 2004/0144676 A1 | 7/2004 | Rider |
| 2004/0159080 A1 | 8/2004 | Stewart |
| 2004/0178199 A1 | 9/2004 | Stroup |
| 2004/0217033 A1 | 11/2004 | Gordon |
| 2004/0222226 A1 | 11/2004 | Gottainer |
| 2004/0245261 A1 | 12/2004 | Stanos |
| 2005/0037168 A1 | 2/2005 | Dalgewicz |
| 2005/0051442 A1 | 3/2005 | Gordon |
| 2005/0082177 A1 | 4/2005 | Weiss |
| 2005/0092749 A1 | 5/2005 | Durdon |
| 2005/0109780 A1 | 5/2005 | Pendergrass |
| 2005/0155969 A1 | 7/2005 | Clarke |
| 2005/0167294 A1 | 8/2005 | Swayne |
| 2005/0178766 A1 | 8/2005 | Washington |
| 2005/0210085 A1 | 9/2005 | Bessiere |
| 2005/0224505 A1 | 10/2005 | Brown |
| 2005/0230406 A1 | 10/2005 | Maravich |
| 2005/0263413 A1 | 12/2005 | Harman |
| 2005/0269328 A1 | 12/2005 | Crider |
| 2006/0071008 A1 | 4/2006 | Sadlier |
| 2006/0060589 A1 | 5/2006 | Lee |
| 2006/0096983 A1 | 5/2006 | Patterson |
| 2006/0097516 A1 | 5/2006 | Kozlowski |
| 2006/0180028 A1 | 8/2006 | Burchard |
| 2006/0213908 A1 | 9/2006 | Clarke |
| 2006/0226148 A1 | 10/2006 | Hundley |
| 2006/0255038 A1 | 11/2006 | Hollis |
| 2007/0007298 A1 | 1/2007 | Tucker |
| 2007/0034629 A1 | 2/2007 | Mazzarolo |
| 2007/0062943 A1 | 3/2007 | Bosworth |
| 2007/0075080 A1 | 4/2007 | Farnsworth |
| 2007/0107578 A1 | 5/2007 | Koelsch |
| 2007/0246862 A1 | 10/2007 | Jones |
| 2008/0035681 A1 | 2/2008 | Skillin |
| 2008/0097516 A1 | 4/2008 | Chang |
| 2008/0105696 A1 | 5/2008 | Dart |
| 2008/0197134 A1 | 8/2008 | Maxwell |
| 2008/0230176 A1 | 9/2008 | Van De Weijer |
| 2008/0245792 A1 | 10/2008 | Chou |
| 2009/0026219 A1 | 1/2009 | Bal |
| 2009/0223961 A1 | 9/2009 | Wang |
| 2009/0266829 A1 | 10/2009 | Bailey |
| 2009/0272742 A1 | 11/2009 | Dybala |
| 2009/0308882 A1 | 12/2009 | Hundley |
| 2009/0313956 A1 | 12/2009 | Martinez Sampedro |
| 2010/0037780 A1 | 2/2010 | Pas |
| 2010/0255137 A1 | 10/2010 | Mazzarolo |
| 2010/0282400 A1 | 11/2010 | Sekar |
| 2011/0011863 A1 | 1/2011 | Hollis |
| 2011/0062173 A1 | 3/2011 | Trotter |
| 2011/0089187 A1 | 4/2011 | Steiger |
| 2011/0124817 A1 | 5/2011 | Dias |
| 2011/0272318 A1 | 11/2011 | Gallop |
| 2011/0284564 A1 | 11/2011 | Hsieh |
| 2011/0297573 A1 | 12/2011 | Chen |
| 2012/0024871 A1 | 2/2012 | Hundley |
| 2012/0048856 A1 | 3/2012 | Walker |
| 2012/0097690 A1 | 4/2012 | Chien |
| 2012/0113488 A1 | 5/2012 | Machida |
| 2012/0132699 A1 | 5/2012 | Mann |
| 2012/0208961 A1 | 8/2012 | Carnahan |
| 2012/0261417 A1 | 10/2012 | Tabor |
| 2012/0272622 A1 | 11/2012 | Weiss |
| 2012/0298032 A1* | 11/2012 | Mazzarolo ............ B65D 47/06 118/46 |
| 2013/0020338 A1 | 1/2013 | French |
| 2013/0037558 A1 | 2/2013 | Selina |
| 2013/0142975 A1 | 6/2013 | Wallace |
| 2013/0277380 A1 | 10/2013 | Koestring |
| 2014/0072674 A1 | 3/2014 | Holinda, Jr. |
| 2014/0224805 A1 | 8/2014 | Merbach |
| 2014/0238583 A1 | 8/2014 | Sekar |
| 2014/0238584 A1 | 8/2014 | Sekar |
| 2014/0263378 A1 | 9/2014 | Bolek |
| 2014/0284344 A1 | 9/2014 | French |
| 2014/0325715 A1 | 10/2014 | Wendeln |
| 2015/0014090 A1 | 1/2015 | Masor |
| 2015/0021345 A1 | 1/2015 | Wu |
| 2015/0094406 A1 | 4/2015 | Miley |
| 2015/0191282 A1 | 7/2015 | Crudgington |
| 2015/0216342 A1 | 8/2015 | Tabor |
| 2015/0251818 A1 | 9/2015 | Strachan |
| 2015/0337059 A1 | 11/2015 | Guylaine |
| 2015/0344647 A1 | 12/2015 | Maeda |
| 2015/0367566 A1 | 12/2015 | Schwab |
| 2016/0000243 A1 | 1/2016 | Tedford, Jr. |
| 2016/0000269 A1 | 1/2016 | Van Puijenbroek |
| 2016/0016389 A1 | 1/2016 | Dias |
| 2016/0016702 A1 | 1/2016 | Siskindovich |
| 2016/0058223 A1 | 3/2016 | Savenok |
| 2016/0075487 A1 | 3/2016 | Lin |
| 2016/0081280 A1 | 3/2016 | Moore |
| 2016/0090218 A1 | 3/2016 | Sun |
| 2016/0107786 A1 | 4/2016 | Lin |
| 2016/0113424 A1 | 4/2016 | Eickhoff |
| 2016/0137364 A1 | 5/2016 | Pirrella |
| 2016/0160004 A1 | 6/2016 | Skaggs |
| 2016/0167855 A1 | 6/2016 | Umbarger |
| 2016/0318686 A1 | 11/2016 | Russell |
| 2016/0355327 A1 | 12/2016 | Minganti |
| 2017/0008187 A1 | 1/2017 | Iwai |
| 2017/0029189 A1 | 2/2017 | Sanders |
| 2017/0043913 A1 | 2/2017 | Strachan |
| 2017/0121089 A1 | 5/2017 | Gillblad |
| 2017/0137159 A1 | 5/2017 | Sullivan |
| 2018/0022012 A1* | 1/2018 | Rapparini ............ B29C 51/08 156/242 |
| 2018/0050826 A1 | 2/2018 | Hartman |
| 2018/0127161 A1 | 5/2018 | Smith |
| 2018/0133919 A1 | 5/2018 | Waterman |
| 2018/0290798 A1 | 10/2018 | Peng |
| 2019/0039328 A1 | 2/2019 | Eickhoff |
| 2020/0024039 A1 | 1/2020 | Chou |
| 2020/0029712 A1 | 1/2020 | O'Nan |
| 2020/0055640 A1 | 2/2020 | Lee |
| 2020/0247034 A1 | 8/2020 | Eickhoff |
| 2020/0247967 A1 | 8/2020 | Peng |
| 2021/0047083 A1 | 2/2021 | Eickhoff |
| 2021/0253318 A1 | 8/2021 | Waterman |

(56) References Cited

U.S. PATENT DOCUMENTS

| | | |
|---|---|---|
| 2022/0041341 A1 | 2/2022 | Eickhoff |
| 2022/0097925 A1 | 3/2022 | Baird |
| 2023/0105117 A1 | 4/2023 | Waterman |

FOREIGN PATENT DOCUMENTS

| | | |
|---|---|---|
| CN | 99813627 | 1/1999 |
| CN | 99813014 | 9/1999 |
| DE | 20116771 U1 | 12/2001 |
| DE | 20301404 U1 | 4/2003 |
| DE | 202016006730 U1 | 2/2018 |
| EP | 0934893 A1 | 8/1999 |
| EP | 1319493 A1 | 6/2003 |
| EP | 1464458 B1 | 10/2004 |
| EP | 1208958 B1 | 1/2006 |
| EP | 1837138 B1 | 9/2007 |
| FR | 2484903 A1 | 12/1981 |
| GB | 1496299 A | 12/1977 |
| JP | H09171322 A | 6/1997 |
| JP | 11040499 A | 2/1999 |
| JP | 2002104686 A | 4/2002 |
| JP | 2002210616 A | 7/2002 |
| JP | 2002210818 A | 7/2002 |
| JP | 2002241514 A | 8/2002 |
| JP | 2002241515 A | 8/2002 |
| JP | 2004025802 A | 1/2004 |
| JP | 2004106519 A | 4/2004 |
| WO | 1999017923 A1 | 4/1999 |
| WO | 0018662 | 4/2000 |
| WO | 0018663 | 4/2000 |
| WO | 0185575 | 11/2001 |
| WO | 03011716 | 2/2003 |
| WO | 2004014776 | 2/2004 |
| WO | 2005013247 A1 | 2/2005 |
| WO | 2010018749 A1 | 2/2010 |
| WO | 2011149583 A2 | 12/2011 |

OTHER PUBLICATIONS

Supplementary European Search Report dated Apr. 6, 2009, for European Patent Application No. 05735742.8.
International Search Report and Written Opinion dated Jul. 9, 2008, for PCT/US2008/054888.
Supplementary European Search Report dated Jul. 28, 2008, for European Patent Application No. 06813520.1.
International Search Report and Written Opinion for International Application No. PCT/US2014/006277, Jul. 15, 2014, 8 pages.
Notice of Non-Final Rejection for U.S. Appl. No. 13/448,050, filed Oct. 8, 2014, 13 pages.
Notice of Non-Final Rejection for U.S. Appl. No. 13/554,771, filed Jun. 7, 2013, 14 pages.
Notice of Non-Final Rejection for U.S. Appl. No. 14/214,236, filed Oct. 3, 2014, 10 pages.
PCT International Search Report and Written Opinion completed by the ISA/US on Jun. 19, 2014 and issued in connection with PCT/US2014/027067.
Chinse Office Action for Chinese Patent Application 201480010419.3 dated Jul. 19, 2016, 8 pages.
Extended European Search Report for European Patent Application No. 14768275.1, mailed Sep. 14, 2016, 7 pages.
Office Action dated Sep. 30, 2016 for U.S. Appl. No. 14/214,236.
Chinese Office Action for Chinese App. No. 201480010419.3 dated Dec. 22, 2016, 4 pages.
Office Action dated Apr. 3, 2017 for U.S. Appl. No. 14/921,540.
Australian Search Report for Australian App. No. 2014240016 sent Mar. 17, 2017, 3 pages.
Office Action dated May 15, 2017 for U.S. Appl. No. 14/214,236.
Singapore Written Opinion for Singapore Patent App. No. 11201507343Y dated Sep. 6, 2017, 6 pages.
Office action dated Jun. 14, 2017 for U.S. Appl. No. 14/921,540 (pp. 1-8).
Australian Search Report for Australian App. No. 2014240016 sent Aug. 25, 2017, 3 pages.
Office Action mailed Oct. 6, 2017 for U.S. Appl. No. 15/485,299 (pp. 1-5).
Japanese Office Action for Japanese App. No. 2016-502328 sent Oct. 3, 2017, 11 pages.
Office Action dated Jan. 16, 2018 for U.S. Appl. No. 14/214,236; (pp. 1-13).
Russian Office Action and Search Report for Russian App. No. 2015134775 sent on Mar. 13, 2018, 10 pages.
Japanese Office Action for Japanese App. No. 2016-502328 sent Mar. 6, 2018, 4 pages.
Emvato Tuts+. Create a Set of Flat Precious Gems Icons in Adobe Illustrator by Yulia Sokolova. Apr. 9, 2014 [earliest online date], [ site visited Feb. 22, 2018]. Available from Internet, <URL:https://design.tutsplus.com/tutorials/ create-a-set-of-flat-precious-gems-icons-in-adobe-illustrator-vector-26188>. (Year: 2014), 77 pages.
Office Action dated Apr. 4, 2018 for U.S. Appl. No. 29/599,942 (pp. 1-5).
Infinity Blade Wiki. Hexagon gem. Nov. 17, 2013 [earliest online date], [site visited Feb. 22, 2018]. Available from Internet, <URL:http://infinityblade.wikia.conn/wiki/Hexagon gem>. (Year: 2013), 1 page.
Office Action dated Apr. 4, 2018 for U.S. Appl. No. 29/599,948 (pp. 1-5).
Office Action dated Apr. 16, 2018 for U.S. Appl. No. 15/485,299, (pp. 1-4).
Office Action dated Jul. 10, 2018 for U.S. Appl. No. 15/172,650, (pp. 1-9).
Office Action dated Jul. 5, 2018 for U.S. Appl. No. 29/599,942, (pp. 1-4).
Blogspot. The Herman Letters. Jul. 12, 2011 [earliest online date], [site visited Jul. 23, 2018]. Available from Internet, <URL: http://thehermanletters.blogspot.com/2011/07/ipost-190-is-mcdonalds-selling-p.html>. (Year: 2011).
Office Action dated Jul. 27, 2018 for U.S. Appl. No. 29/599,948, (pp. 1-5).
Office Action dated Nov. 30, 2018 for U.S. Appl. No. 29/599,948, (pp. 1-5).
Office Action dated Jan. 7, 2019 for U.S. Appl. No. 15/172,650, (pp. 1-9).
International (PCT) Search Report and Written Opinion for PCT App. No. PCT/US18/264467 mailed Jul. 3, 2018, 11 pages.
International (PCT) Search Report and Written Opinion for PCT/US18/45575 established Oct. 19, 2018, 13 pages.
Office Action dated Sep. 12, 2019 for U.S. Appl. No. 15/946,023, (pp. 1-15).
First Examination Report for Indian App. No. 8804/DELNP/2015 sent Oct. 30, 2019, 6 pages.
Office Action mailed Mar. 19, 2020, for U.S. Appl. No. 15/172,650, (pp. 1-11).
Office Action dated Mar. 19, 2020, for U.S. Appl. No. 15/172,650 (pp. 1-11).
Third Party Submission Under 37 CFR 1.290 in U.S. Appl. No. 16/057,122, dated Apr. 16, 2020, 49 pages.
Solo 668NS: Site Visited [Apr. 30, 2020]. Available from Internet URL: https://www.dartcontainer.com/products/foodservice-catalog/accessories/lids/solo-pet-plastic-flat-cold-cup-lids/668ns/ 1/2.
Single Use Spill Resistant Flat Lid_Berry Global: Site Visited [Apr. 30, 2020]. Available from Internet URL: https://catalog.berryglobal .com/products/lid/liddrink/dit308srcp.
Thermoform Strawless Lid with Straw Slot_Berry Global: Site Visited [Apr. 30, 2020]. Available from Internet URL: https://catalog.berryglobal .com/products/lid/liddrink/dit402ssl p.
International Search Report and Writen Opinion dated Apr. 29, 2020, 11 pages.
International (PCT) Search Report and Written Opinion for PCT/2020/016769 dated May 27, 2020, 12 pages.
Office Action dated Aug. 6, 2020 for U.S. Appl. No. 16/736,849, (pp. 1-18).
Office Action dated Aug. 20, 2020 for U.S. Appl. No. 16/057,122, (pp. 1-20).

(56) References Cited

OTHER PUBLICATIONS

Polymer Properties of Omnexus—Transparency (https://web.archive.Org/web/20170406012756/https://omnexus.specialchem.com/polymer-properties/properties/transparency, available in public at least on or after Apr. 6, 2017) (Year: 2017).
Office Action dated Jul. 5, 2023 for U.S. Appl. No. 16/782,165, (pp. 1-7).
Office Action (Final Rejection) dated Jul. 5, 2023 for U.S. Appl. No. 16/782,165 (pp. 1-14).
Extended European Search Report for EP 20852216.9 dated Sep. 11, 2023, 7 pages.
European Extended Search Report for EP23180774.4 dated Sep. 25, 2023, 9 pages.
Office Action dated Sep. 22, 2023 for U.S. Appl. No. 29/896,014 (pp. 1-9).
12SL Foam Cup Straw Lid: Announced (May 24, 2019 online). Site visited (Sep. 18, 2023). Available from URL: https://www.mrplasticsinc.com/12oz-foam-cup-straw-slotted-lid-match-12j12-1000ps.
PET Thermoform Flat Lid with Flavor Buttons: Site Visited (Sep. 14, 2023; online). Avaailable from URL: https://www.berryglobal.com/en/product/lids/47inches-pet-thermoform-flat-lid-with-flavor-buttons-13183158.
Fabri-Kal Greetware: Site Visited (Sep. 18, 2023). Available from URL: https://www.officedepot.com/a/products/1639774/Fabri-Kal-Greenware-Cold-Drink-Cup/.
Office Action dated Sep. 22, 2023 for U.S. Appl. No. 29/896,017 (pp. 1-9).
Office Action dated Oct. 10, 2023 for U.S. Appl. No. 29/798,668, (pp. 1-10).
Polymer Properties of Omnexus—Haze (https://web.archive.Org/web/20170519201652/https://omnexus.specialchem.com/polymer-properties/properties/haze, available in public at least on or after May 19, 2017) (Year: 2017).
Impact Plastics Blog (http://blog.impactplastics-ct.com/blog/basic-guide-to-the-three-main-grades-of-polypropylene-resin, available in public from the date May 16, 2017) (Year: 2017).
Canadian Filing of Prior Art Under Section 34.1(1) of the Canadian Patent Act by Third Party, Aug. 7, 2020, 20 pages.
Chartier Octagonal Wall Modern and Contemporary Accent Mirror: Site Visited [Sep. 14, 2020. Available from Internet URL: https://www.wayfair.com/decor-pillows/pdp/eichholtz-chartier-octagonal-wall-modern-and-contemporary-accent-mirror-eitz2666.html.
Nathan Wall Mounted Mirror: Announced Jul. 2, 2020 [online]. Site Visited [Sep. 14, 2020], Available from Internet URL: https://www.wayfair.com/decor-pillows/pdp/house-of-hampton-nathan-wall-mounted-mirror-hmpt5079.html.
Office Action dated Dec. 30, 2020 for U.S. Appl. No. 15/172,650, (pp. 1-24).
International (PCT) Search Report and Written Opinion for PCT/US20/46469 dated Nov. 30, 2020, 9 pages.
European Search Report for European App. No. 18780978.5 dated Jan. 28, 2021, 8 pages.
European Search Report for European App. No. 18844658.7 dated Apr. 4, 2021, 11 pages.
Office Action dated Jul. 1, 2021 for U.S. Appl. No. 15/172,650, (pp. 1-6).
First Chinese Office Action for Chinese Patent App. No. 20180065303.8 dated Jun. 15, 2021, 12 pages.
European First Substantive Examination Report for European App. No. 18780978.5 dated Aug. 24, 2021, 4 pages.
Office Action dated Nov. 23, 2021 for U.S. Appl. No. 16/782,203, (pp. 1-36).
"Polymers and Environment," by Ojeda, available at https://www.intechopen.com/chapters/42104, published on Jan. 23, 2013. (Year: 2013).
Office Action dated Jan. 14, 2022 for U.S. Appl. No. 29/761,992, (pp. 1-8).
Octagonal Wall Mirror: Announced Aug. 26, 2019 [online]. Site Visite [Jan. 10, 2022. Available from Internet URL: https://www.wayfair.com/decor-pillows/pdp/house-of-hampton-nathan-wall-mounted-mirror-hmpt5079.html, 16 pages.
European Examination Report for EP 18780978.5 dated Nov. 25, 2022, 5 pages.
International (PCT) Search Report and Written Opinion for PCT/US21/44766 dated Jan. 11, 2022, 14 pages.
Second Chinese Office Action for Chinese Patent App. No. 20180065303.8 dated Jun. 24, 2022, 9 pages.
Thermoform Spill Resistant Flat Lid: Site Visited [Feb. 15, 2022]. Available from Internet URL: https://catalog.berryglobal.com/products/lid/liddrink/dit408srcp.
Office Action dated Feb. 22, 2022 for U.S. Appl. No. 29/765,808, (pp. 1-8).
Chinese Rejection Decision for Chinese Patent App. No. 20180065303.8 dated May 27, 2022, 12 pages.
European Search Report for European App. No. 20753137.7 dated Sep. 1, 2022, 6 pages.
Office Action dated Aug. 26, 2022 for U.S. Appl. No. 29/765,808, (pp. 1-5).
European Search Report for European App. No. 20753051.0 dated Sep. 23, 2022, 15 pages.
Solo PET Plastic Flat Cold Cup Lids: Announced (Oct. 28, 2020 (online)) Site Visited (Sep. 20, 2022). Available from Internet URL: https://www.dartcontainer.com/products/foodservice-catalog/accessories/lids/solo-pet-plastic-flat-cold-cup-lids/668ns/.
Office Action (Non-Final Rejection) dated Oct. 5, 2022 for U.S. Appl. No. 17/550,292 (pp. 1-13).
International (PCT) Search Report and Written Opinion for PCT/US2022/035911 dated Oct. 5, 2022, 8 pages.
DART Hot/Cold Cup Lid: Site Visited (Nov. 30, 2022). Available from URL: :https://www.grainger.com/product/1UCV4?gucic :N:PS:Paid:GGL:CSM-2295:4P7A1P:20501231&gclid=EAlalQobChMIps6Jzu7W-wIVIYXIChOnpwZYEAKYCyABEgKSkfD_BwE& gclsrc=aw.ds.
Dixie Long-Skirt Selector Lid: Site Visited (Nov. 30, 2022). Available from URL: https://caljaninc.com/catalog/p/DXE- 914LSRD/Dixie-Long-Skirt-Selector-Lid-For-12-16-21-oz/.
Office Action dated Dec. 8, 2022 for U.S. Appl. No. 29/843,255, (pp. 1-8).
Office Action dated Dec. 8, 2022 for U.S. Appl. No. 29/843,256, (pp. 1-8).
Supplementary European Search Report for European App. No. 20753051.0 dated Jan. 3, 2023, 13 pages.
Third Chinese Office Action for Chinese App. No. 201880065303.8 dated Jan. 5, 2023, 12 pages.
Black Plastic Straw: Announced (May 19, 2022; online). Site Vistied (Dec. 17, 2022). Available from URL: https://www.restaurantware.com/disposables/coffee-cups-accessories/coffee-cup-lids/black-plastic-2-in-1-straw-or-sip-coffee-cup-lid-fits-8- 12-16-and-20-oz-100-count-box/.
Black Flip Top Hot Cup Lid: Announced (Sep. 9, 2020 (online)). Site Visited (Dec. 17, 2022). Available from URL: https://hotcupfactory.com/collections/hot-cup-lids/products/black-flip-top-hot-cup-lids-8-10-12-16-20-22-oz.
English translation of JP-2004025802-A by EPO (OA Appendix) (Year: 2004).
English translation of JP-2002210818-A by EPO (OA Appendix) (Year: 2002).
International (PCT) Preliminary Report on Patentability dated Feb. 7, 2023, 10pages.
Office Action (Non-Final Rejection) dated Mar. 16, 2023 for U.S. Appl. No. 16/782,165, (pp. 1-14).
Office Action dated Apr. 13, 2023 for U.S. Appl. No. 29/798,668, (pp. 1-9).
Office Action (Non-Final Rejection) dated Dec. 21, 2023 for U.S. Appl. No. 17/395,182, (pp. 1-13).
Office Action (Non-Final Rejection) dated Jan. 31, 2024 for U.S. Appl. No. 18/217,763 (pp. 1-10).
Office Action (Non-Final Rejection) dated Jun. 18, 2024 for U.S. Appl. No. 17/856,124, (pp. 1-10).
Office Action (Non-Final Rejection) dated Jun. 20, 2024 for U.S. Appl. No. 18/101,385, (pp. 1-17).

(56) References Cited

OTHER PUBLICATIONS

Extended European Search Report for European Patent App. No. EP21853805.6 dated Jul. 23, 2024, BP-554B EP II, 8 pages.
Kocsis et al. The Polypropylene Handbook (Year: 2018).
Entec Stress Whitening in Polypropylene (Year: 2020).
Office Action (Non-Final Rejection) dated Jul. 17, 2024 for U.S. Appl. No. 18/399,886 (pp. 1-21).
Extended European Search Report for European Patent App. No. EP24204859.3 dated Nov. 12, 2024, BP-558 EP-DIV1 II, 8 pages.

* cited by examiner

PROCESS OF FORMING POLYMERIC MATERIAL

PRIORITY CLAIM

This application is a continuation application of U.S. Non-Provisional application Ser. No. 17/871,083, filed Jul. 22, 2022, which is a continuation of U.S. Non-Provisional application Ser. No. 16/782,203, filed Feb. 5, 2020, which claims priority under 35 U.S.C. § 119(e) to U.S. Provisional Application No. 62/802,014, filed Feb. 6, 2019, each of which are expressly incorporated by reference herein.

BACKGROUND

The present disclosure relates to forming materials, and particularly to forming articles from materials. More particularly, the present disclosure relates to a process for forming polymeric articles.

SUMMARY

According to the present disclosure, a method of forming an article includes a number of stages. The method includes providing a sheet comprising polymeric materials, optionally conditioning the sheet with a rotating roller, forming the sheet to provide a web, and cutting the web to provide the article.

In some embodiments, the method further includes a splitting stage. The splitting stage separates the web into at least two strips after the thermoforming stage.

In some embodiments, the cutting stage is performed using a rotary cutter. The method may include rotating a rotor die included in a rotary cutter about an axis, measuring a distance between the rotor die and an article blank included in the web located upstream of the rotor die, varying a rotational speed of the rotor die based on the distance, and applying pressure to the article-blank web with the rotor die.

In illustrative embodiments, the conditioning stage includes applying the extruded sheet to a rotating roller having a textured surface. The forming stage includes receiving a polymeric sheet from the conditioning stage and applying the sheet to a rotating rotor (sometimes called a form tool) included in a rotary thermoformer. The sheet molds onto article molds coupled to the rotor to form continuously an article-blank web having a plurality of article blanks formed therein. The article-blank web is moved to a cutting stage where the article blanks are cut from the article-blank web to form articles.

In illustrative embodiments, the rotating roller has an outer surface having a surface roughness configured to provide an article having desired characteristics such as, for example, thickness, surface finish, transparency, levelness, and strength. In illustrative embodiments, at least a portion of the outer surface that contacts the sheet has a surface roughness of less than about 400 Ra (microinches). In illustrative embodiments, at least a portion of the outer surface that contacts the sheet has a surface roughness between about 100 Ra (microinches) and about 240 Ra (microinches). In illustrative embodiments, the surface roughness of the provided article is less than the surface roughness of the conditioning roller. In some embodiments, the surface roughness of the article is between about 10 Ra (microinches) and about 20 Ra (microinches).

In illustrative embodiments, the surface roughness of the outer surface may be varied to provide a transparent article. For example, the surface roughness of the outer surface of the rotating roller may be chosen to provide an article having a clarity of about or greater than about 40% as measured using ASTM D 1746 and a haze of about or less than about 70% as measured using ASTM D 1003 procedure B.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
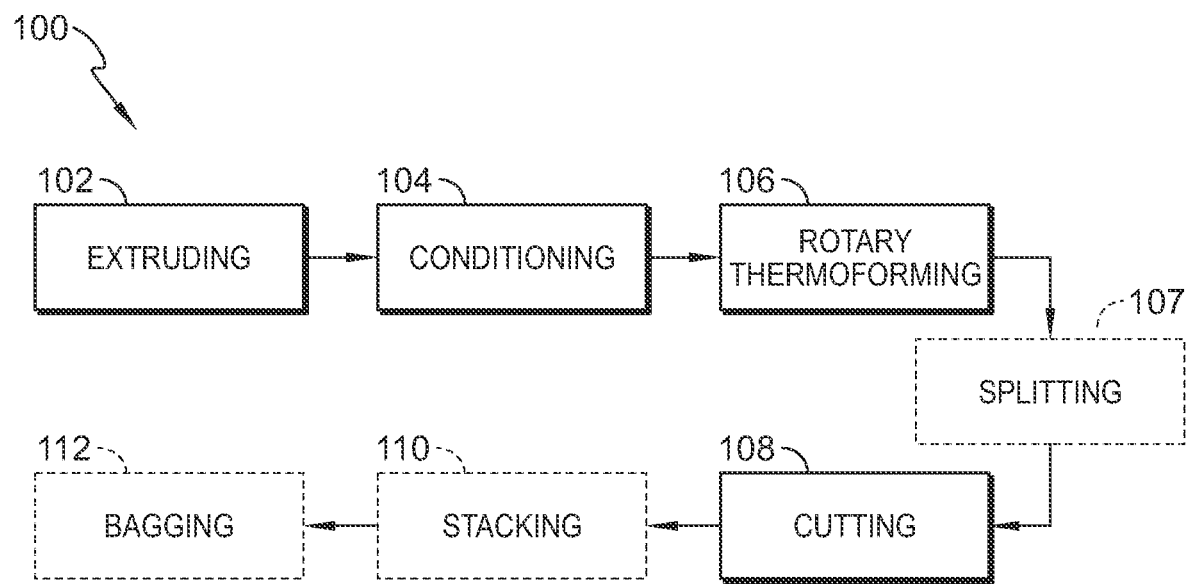
FIG. 1 is a diagrammatic view of an article-manufacturing process in accordance with the present disclosure for making an article using a rotary thermoformer and showing that the article-manufacturing process includes the stages of extruding a sheet comprising polymeric materials, conditioning the sheet, rotary thermoforming the sheet to provide an article-blank web, optionally splitting the article-blank web into two or more strips, cutting the article-blank web to provide the article shown, for example, in FIG. 2, optionally stacking the article with other articles, and optionally bagging the article for storage and transportation.
Figure 2:
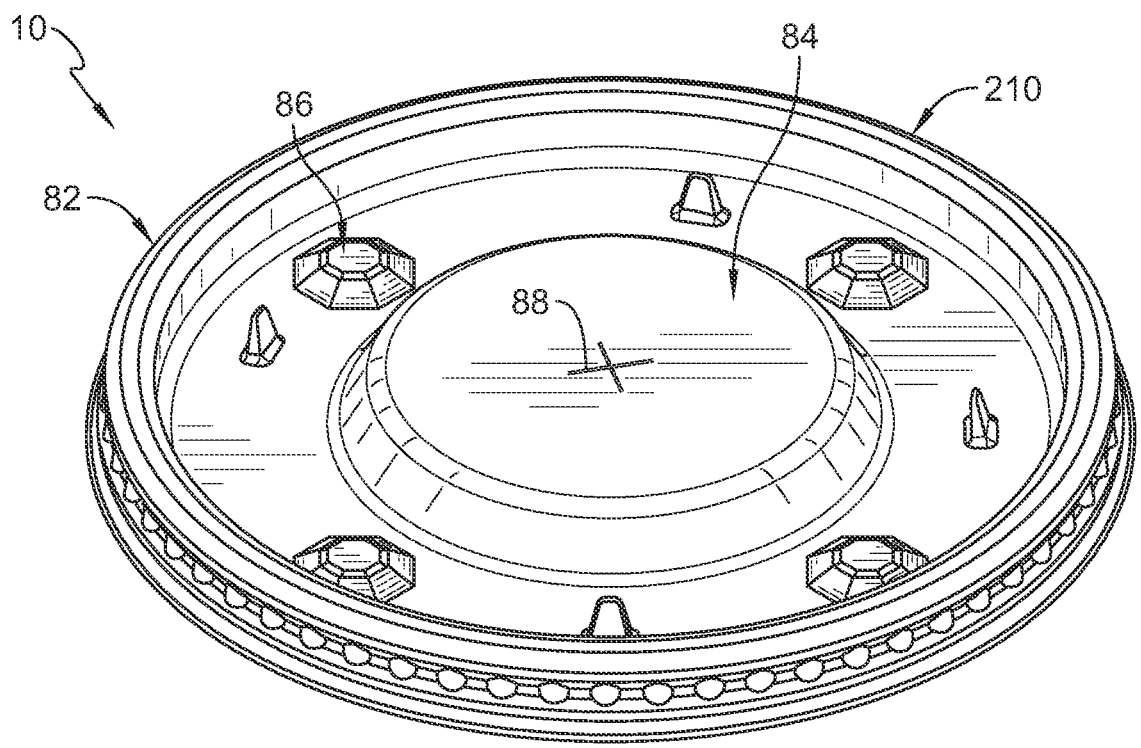
FIG. 2 is a perspective view of a lid formed by the article-manufacturing process shown in FIG. 1.
Figure 3:
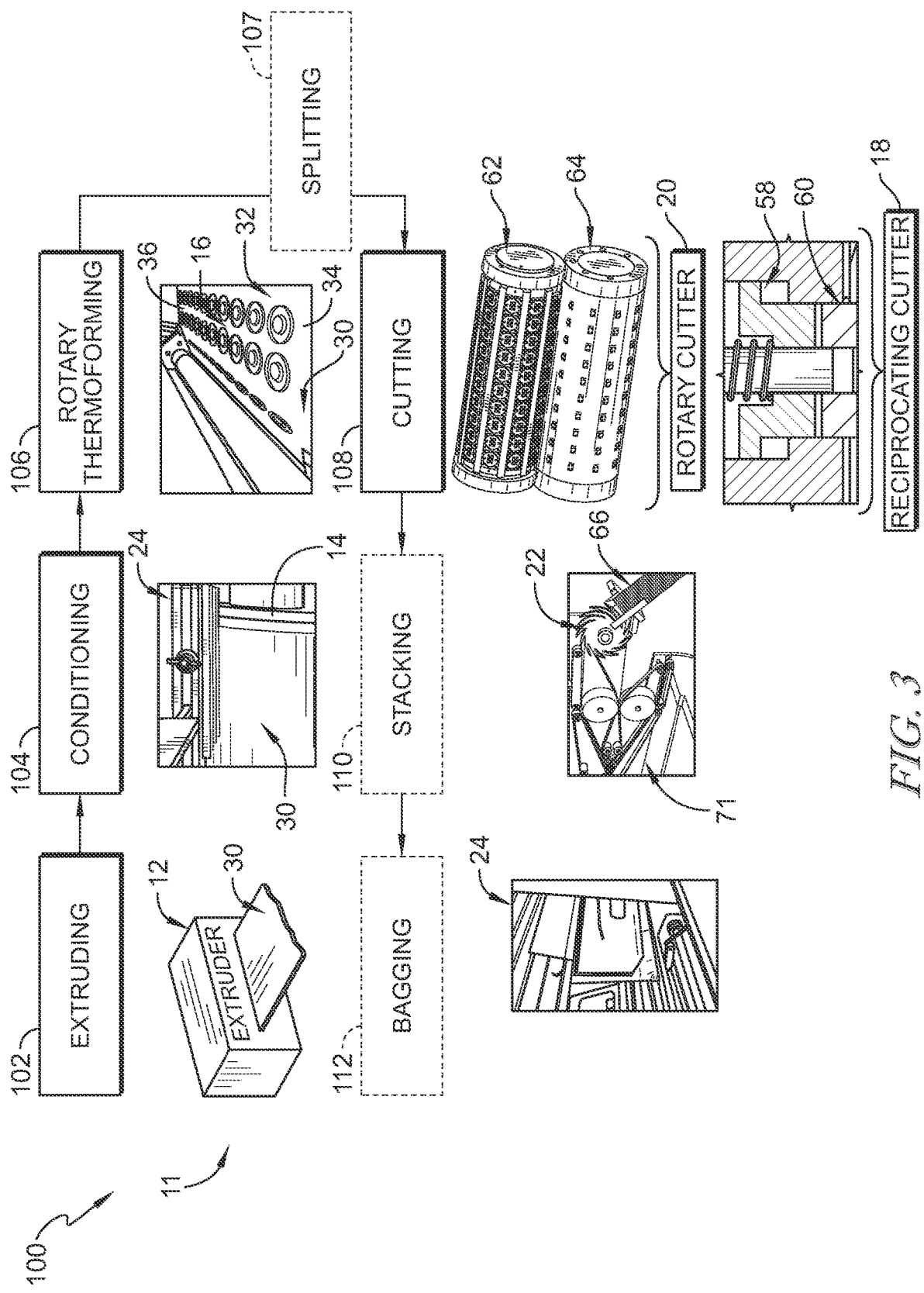
FIG. 3 is a perspective and diagrammatic view of the article-manufacturing process of FIG. 1 showing the various processes and illustrative equipment used in the article-manufacturing process including extruding the sheet comprising polymeric materials with an extruder and die, conditioning the sheet with a rotating conditioning roller, rotary thermoforming the sheet with a rotary thermoformer to provide the article-blank web, optionally splitting the article-blank web into two or more strips, cutting the article-blank web with either a rotary cutter or a reciprocating cutter to provide the article, optionally stacking the article with other articles using a star-wheel stacker, and optionally bagging the article for storage and transportation.

A manufacturing process 100 for forming an article 10 in accordance with the present disclosure is shown, for example, in FIGS. 1 and 3. Article 10 may be for example, a lid for a container as shown in FIG. 2, a bowl, a tray, a plate, a film, a container such as a pill container, storage container, tamper evident container, a damage or tamper evident indicator, an information indicator selector, or any other suitable article. Illustratively, the article 10 is a shallow draw article formed with a rotary thermoforming process, however aspects of the present disclosure may be incorporated in other article forming processes such as, for example, deep draw thermoforming, blow molding, casting, molding on a tread of molds, flatbed thermoforming, etc. Components of a system 11 for performing manufacturing process 100 are shown in FIG. 3.

Manufacturing process 100 is illustratively an article-manufacturing process 100 for forming articles 10 as shown, for example, in FIGS. 1 and 3. The illustrative article 10 is a lid 210 which is adapted to mate with a brim of a container such as a cup or a bowl. One embodiment of lid 210 made by article-manufacturing process 100 is shown, for example, in FIG. 2. Article-manufacturing process 100 may provide articles 10 at a faster rate than traditional manufacturing processes and/or with desired characteristics such as, for example, thickness, surface finish, transparency, levelness, and strength. Reference is hereby made to U.S. application Ser. No. 16/057,122, filed Aug. 7, 2018 and titled METHOD AND APPARATUS FOR THERMOFORMING AN ARTICLE, for relating to a method of manufacturing articles, which application is hereby incorporated in its entirety.

Article-manufacturing process 100 includes an extrusion stage 102, a conditioning stage 104, a rotary thermoforming stage 106, an optional splitting stage 107, a cutting stage 108, an optional stacking stage 110, and an optional bagging stage 112 as shown, for example, in FIGS. 1 and 3. Extrusion stage 102 provides a sheet 30 of polymeric material as suggested in FIG. 3. Conditioning stage 104 establishes a desired surface finish, temperature, and feed rate of sheet 30 as suggested in FIGS. 7 and 8. Rotary thermoforming stage 106 thermoforms sheet 30 to rotary thermoformer 16 to form continuously article-blank web 32 as suggested in FIGS. 13 and 16. Cutting stage 108 cuts article-blank web 32 to provide at least one article 10 as shown in FIGS. 19-22.

In other embodiments, rotary thermoforming stage 106 is replaced with another thermoforming stage such as flatbed thermoforming, casting, or blow molding. In other embodiments, conditioning stage 104 is omitted and a sheet of polymeric material is applied directly from extrusion stage 102 to rotary thermoforming stage 106 or other thermoforming stage.

Figure 23:
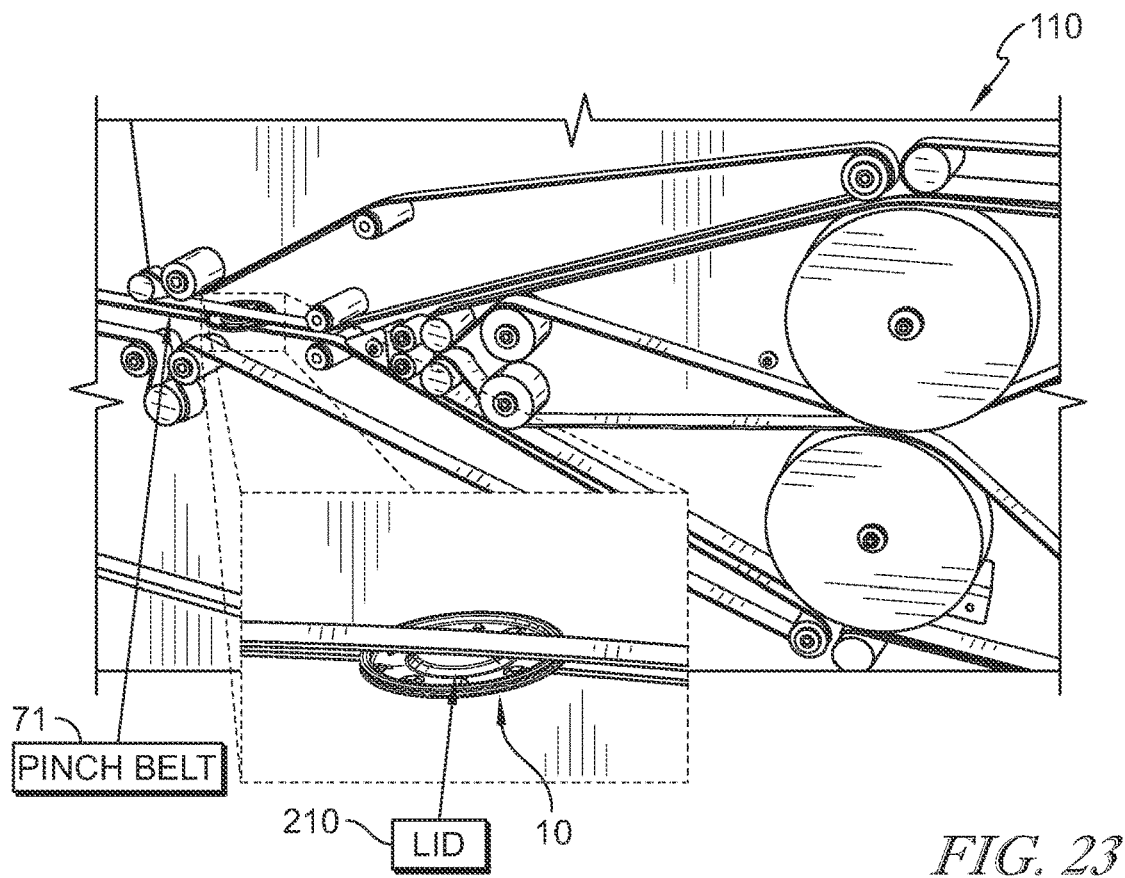
FIG. 23 is a perspective and diagrammatic view of the stacking stage of the article-manufacturing process of FIG. 3 showing that the articles are lids and that the lids are moved continuously along a predetermined path by a pinch belt.
Figure 24:
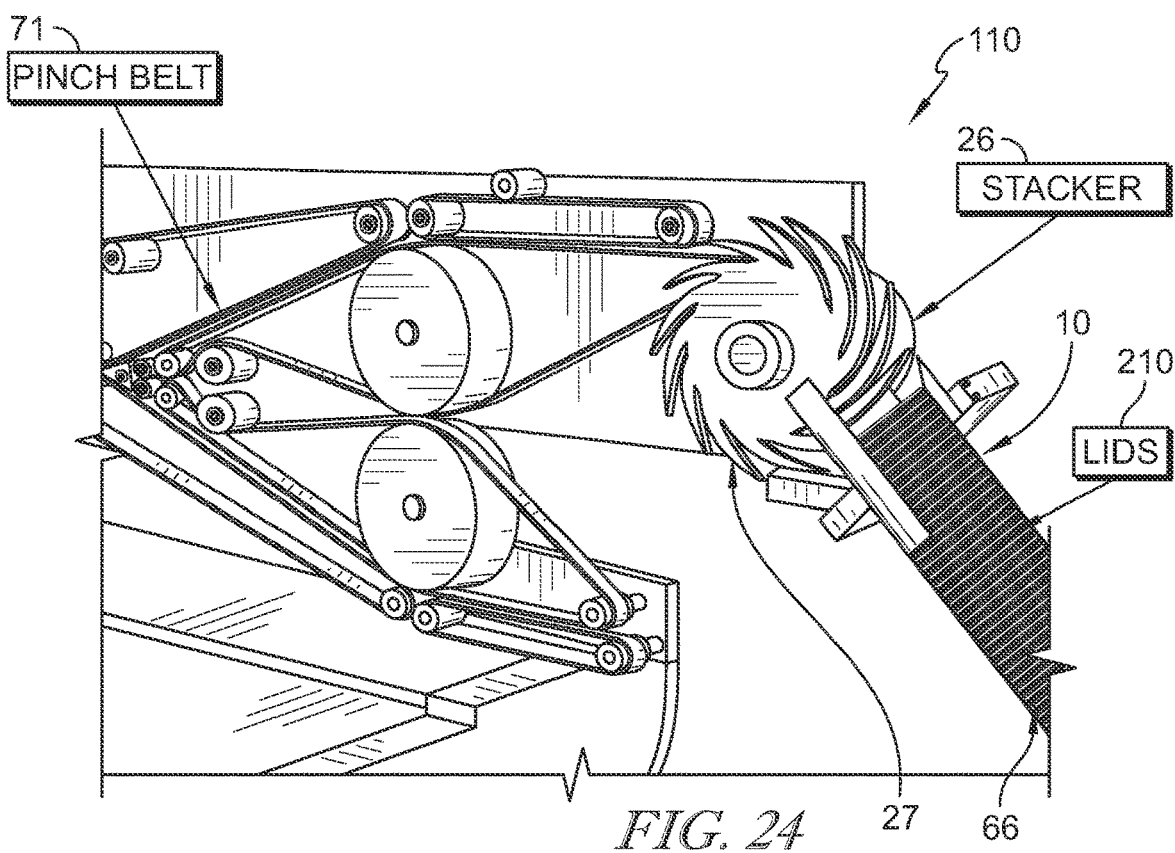
FIG. 24 is a perspective and diagrammatic view of the stacking stage showing that the articles are directed continuously by the pinch belt into a star-wheel stacker that aligns a plurality of articles to form a stack of articles.
Figure 25:
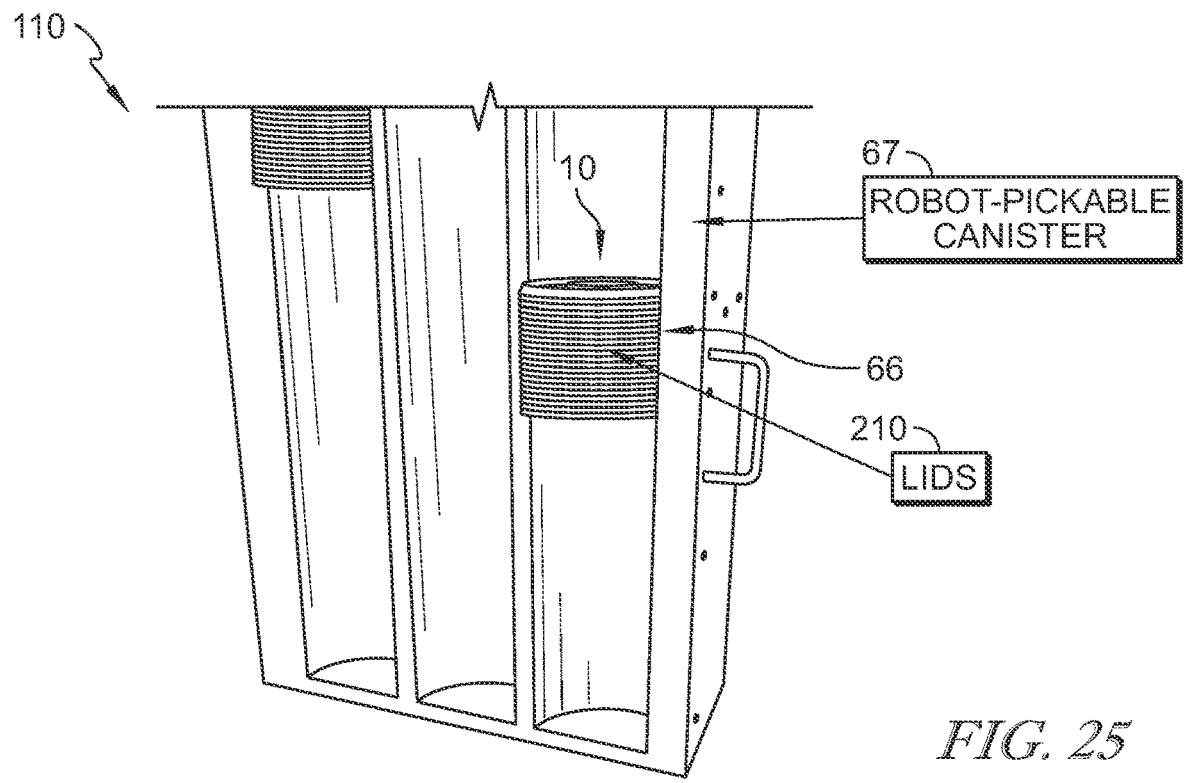
FIG. 25 is a perspective and diagrammatic view of a canister used in the stacking stage showing that the canister is arranged to receive a plurality of stacks of articles and suggesting that the canister is configured to be pickable by a robot during the article-manufacturing process.

Splitting stage 107 splits the article-blank web 32 into two or more strips to assist handling of the article-blank web 32 at the cutting stage 108. In some embodiments, cutting stage 108 is performed using a rotary cutter configured to adjust its rotational speed on the fly during cutting stage 108. In such embodiments, splitting stage 107 may be omitted. Stacking stage 110 stacks article 10 with a plurality of other articles 10 as shown in FIGS. 23-25. Bagging stage 112 packages the plurality of articles 10 for storage and transportation as suggested in FIG. 3.

In illustrative embodiments, article-manufacturing process 100 has a line speed between about 50 feet per minute and 500 feet per minute. In some embodiments, article-manufacturing process 100 has a line speed between about 100 feet per minute and 250 feet per minute. In some embodiments, article-manufacturing process 100 has a line speed between about 100 feet per minute and 200 feet per minute. In some embodiments, article-manufacturing process 100 has a line speed between about 110 feet per minute and 200 feet per minute. In some embodiments, article-manufacturing process 100 has a line speed between about 100 feet per minute and 160 feet per minute. In some embodiments, article-manufacturing process 100 has a line speed between about 160 feet per minute and 200 feet per minute. In some embodiments, article-manufacturing process 100 has a line speed between about 110 feet per minute and 120 feet per minute.

Figure 4:
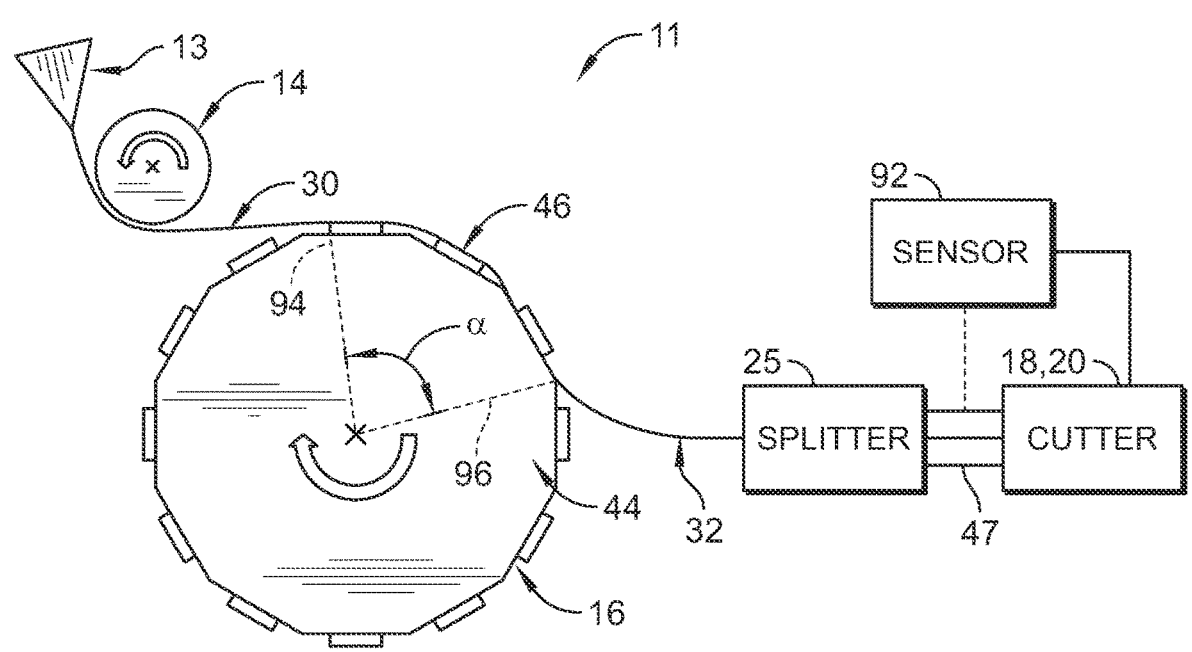
FIG. 4 is a diagrammatic view of the extrusion stage, the conditioning stage, the rotary thermoforming stage, the splitting stage, and the cutting stage showing that the illustrative sheet is extruded through a die and applied to the conditioning roller before being applied to the rotary thermoformer and further showing that the sheet may be split into strips before being cut by the cutter.

The illustrative system 11 is configured to perform article-manufacturing process 100 as suggested in FIG. 3. The system 11 shown is a thermoforming system 11. The system 11 includes an extruder 12, a conditioning roller 14, rotary thermoformer 16, and at least one of cutter 18, 20 as shown in FIGS. 3-13A and 19-22. In some embodiments, system 11 further includes one or more sheet-movement controllers 24 as shown in FIG. 8. In some embodiments, system 11 further includes a splitter 25 as shown in FIG. 4. In some embodiments, system 11 further includes one or more of a pinch belt 71, a stacker 26, and a bagger as suggested in FIGS. 23-26. In some embodiments, extruder 12 is omitted and a sheet of polymeric material is provided to process 100. In such embodiments, a heating stage may occur before conditioning stage 104 or thermoforming stage 106. Sheet of polymeric material could be provided by a third part in some embodiments. In some embodiments, conditioning roller 14 is omitted and the sheet of polymeric material is applied to a thermoformer without being first applied to a conditioning roller.

Extrusion stage 102 of article-manufacturing process 100 uses extruder 12 to melt polymeric materials as shown in FIGS. 3-6. The melted polymeric materials are urged through a die 13 to form sheet 30. Sheet 30 leaves extruder 12 and die 13 in a molten state. In some embodiments, sheet 30 leaves extruder 12 and die 13 at between about 300 degrees Fahrenheit and about 700 degrees Fahrenheit. In some embodiments, sheet 30 leaves extruder 12 and die 13 at between about 300 degrees Fahrenheit and about 500 degrees Fahrenheit. In illustrative embodiments, sheet 30 leaves extruder 12 and die 13 at between about 500 degrees Fahrenheit and about 700 degrees Fahrenheit. In some embodiments, sheet 30 leaves extruder 12 and die 13 at between about 400 degrees Fahrenheit and about 450 degrees Fahrenheit. In some embodiments, extrusion stage 102 is omitted and sheet 30 is provided from another source. As one example, sheet 30 is purchased from a supplier. In some embodiments, extrusion stage 102 is omitted and another sheet of material such as, for example, a paper sheet is provided and supplied to process 100. Process 100 may further include a stage of heating sheet 30 before conditioning stage 104 for example, if sheet 30 is provided by a third party or extruded and stored before forming into article 10.

Figure 5:
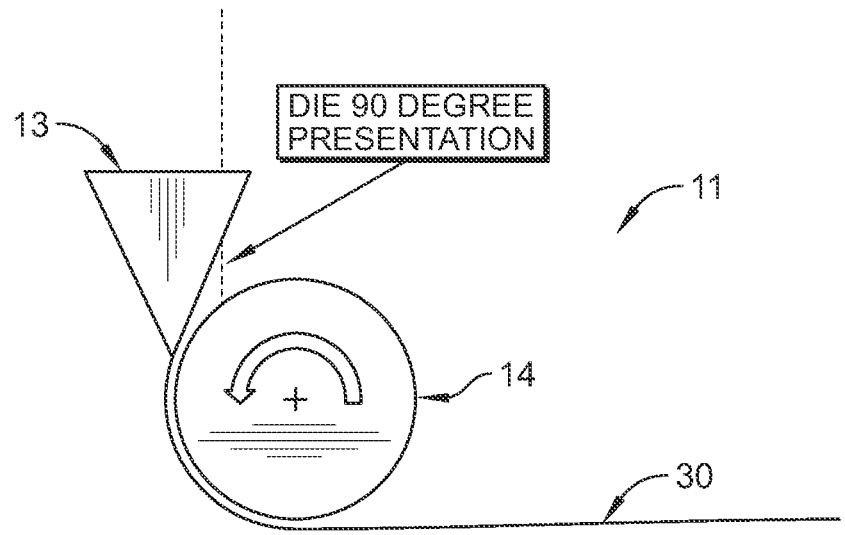
FIG. 5 is a diagrammatic view of the die and the conditioning roller showing that the die has about a 90 degree presentation angle relative to the conditioning roller and suggesting that the presentation angle may be varied during operation.
Figure 6:
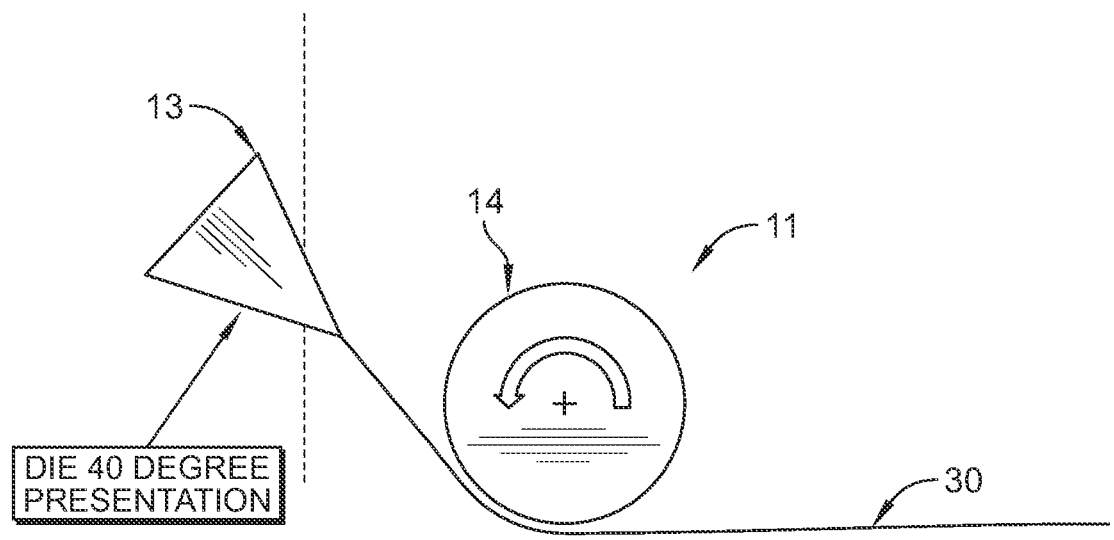
FIG. 6 is a diagrammatic view of the die and the conditioning roller showing that the die has about a 40 degree presentation angle relative to the conditioning roller.

Die 13 is presented at an angle relative to conditioning roller 14 used in conditioning stage 104 as shown in FIGS. 5 and 6. In some embodiments, die 13 has a variable presentation angle relative to conditioning roller 14 between about 40 degrees as shown in FIG. 5 and about 90 degrees as shown in FIG. 6. The presentation angle may be adjusted on the fly during process 100.

Figure 7:
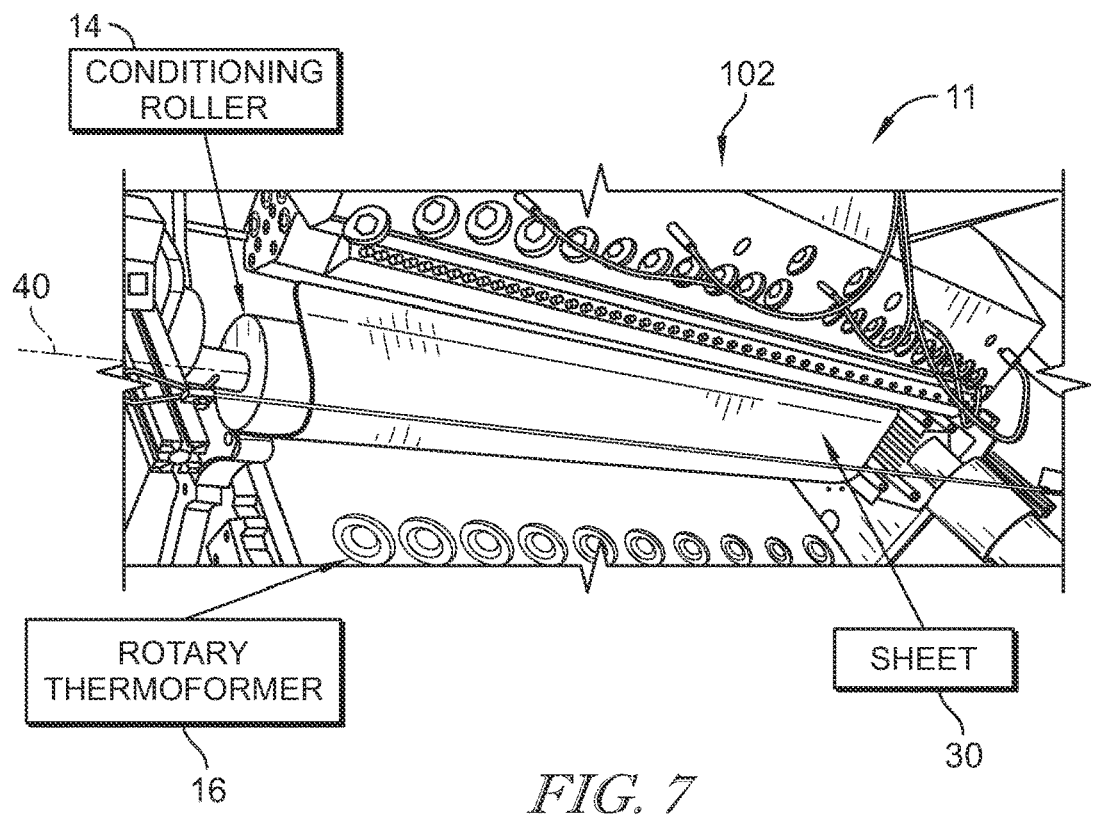
FIG. 7 is a perspective and diagrammatic view of the conditioning stage of the article-manufacturing process of FIG. 3 showing that the conditioning stage includes directing the sheet from the extruder toward the temperature controlled conditioning roller and applying the sheet to the conditioning roller to provide a desired surface finish on the sheet such as a transparency of the sheet, to regulate a feed rate of the process, and to control a temperature of the sheet.
Figure 8:
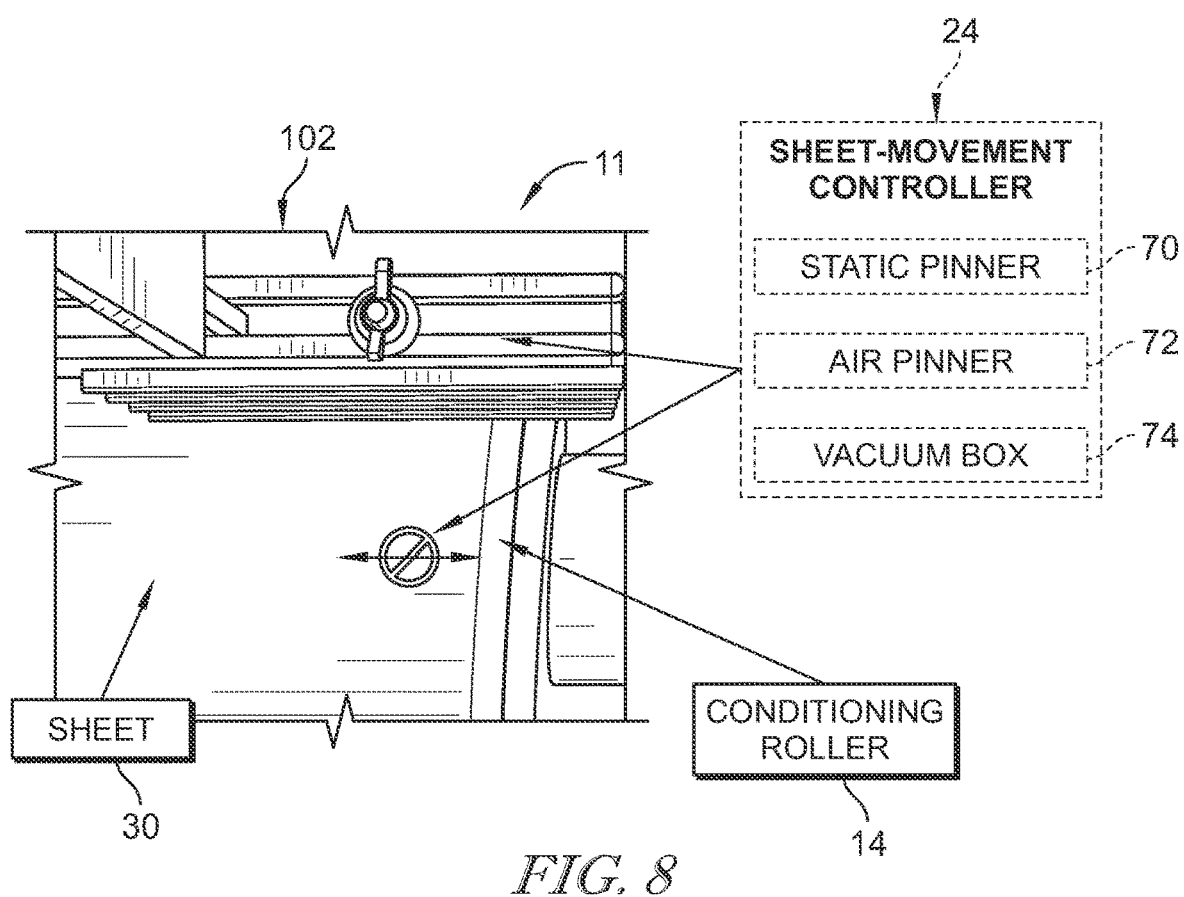
FIG. 8 is another perspective and diagrammatic view of the conditioning stage of the article-manufacturing process of FIG. 3 showing that the conditioning roller has an outer surface with a predetermined surface roughness to provide a desired transparency of the sheet; to regulate a feed rate of the sheet, and to control a temperature of the sheet and further suggesting that the conditioning stage may include the step of blocking the sheet from moving axially relative to the conditioning roller and for controlling the machine direction feed rate of the sheet, for example, by using a static pinner, an air pinner, and/or a vacuum box.

Conditioning stage 104 uses conditioning roller 14 to condition sheet 30 as suggested in FIGS. 7 and 8. During conditioning stage 104, sheet 30 is directed from extruder 12 toward conditioning roller 14. Sheet 30 is applied partway around an outer surface 42 of conditioning roller 14 to provide a desired surface finish on sheet 30, to regulate a feed rate of article-manufacturing process 100, and to help control the temperature of sheet 30. In the illustrative embodiment, the desired surface finish applied to sheet 30 is a transparency of sheet 30 and article 10 made from sheet 30. In some embodiments, sheet 30 is applied to conditioning roller 14 such that sheet 30 is wrapped around one-hundred degrees around conditioning roller 14.

Conditioning roller 14 may be temperature controlled such that sheet 30 is in its plastic form on conditioning roller 14. Sheet 30 has a temperature of about 300 degrees Fahrenheit to about 350 degrees Fahrenheit after being cooled by conditioning roller 14 in some embodiments. In some embodiments, conditioning roller 14 is cooled with fluid at between about 60 degrees and about 90 degrees Fahrenheit. In some embodiments, conditioning roller is cooled with fluid at about 70 degrees Fahrenheit. In some embodiments, conditioning roller is conditioned with fluid at about 230 degrees Fahrenheit. The fluid may be water, oil, propylene glycol, or any other suitable alternative. In illustrative embodiments, conditioning roller 14 is maintained at a temperature of between about 40 degrees Fahrenheit and about 250 degrees Fahrenheit. In some embodiments, conditioning roller 14 is maintained at a temperature of between about 60 degrees Fahrenheit and about 100 degrees Fahrenheit.

Figure 9:
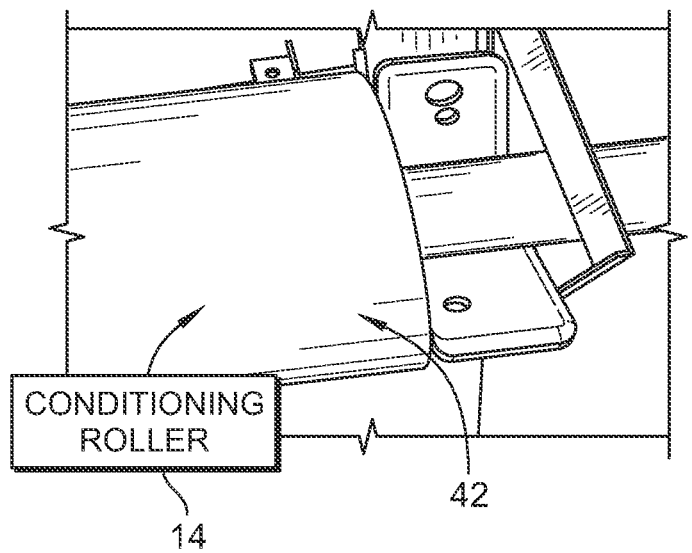
FIG. 9 is a perspective and diagrammatic view of one embodiment of a conditioning roller having a first surface roughness for use with the article-manufacturing process of FIG. 1.
Figure 10:
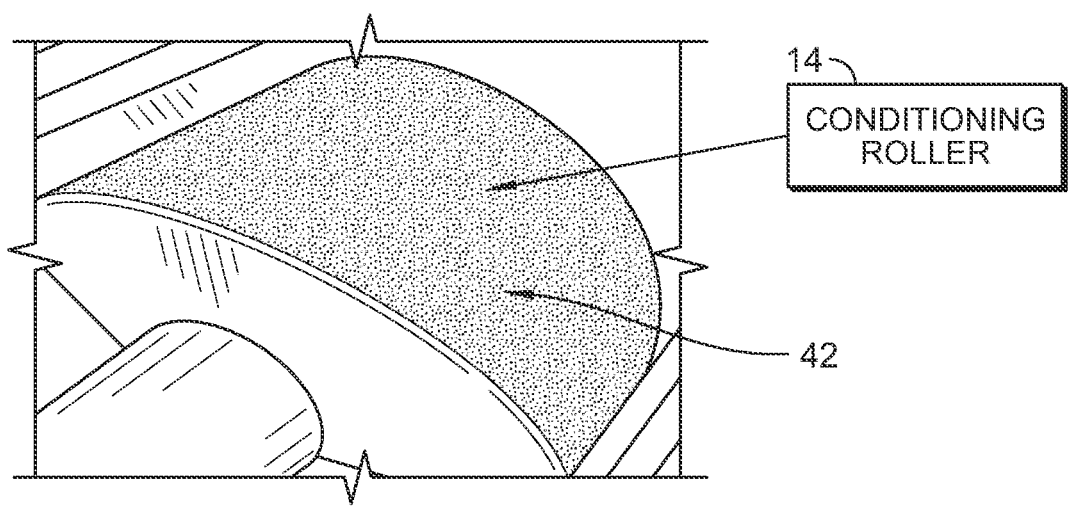
FIG. 10 is a perspective and diagrammatic view of another embodiment of a conditioning roller having a second surface roughness for use with the article-manufacturing process of FIG. 1.
Figure 11:
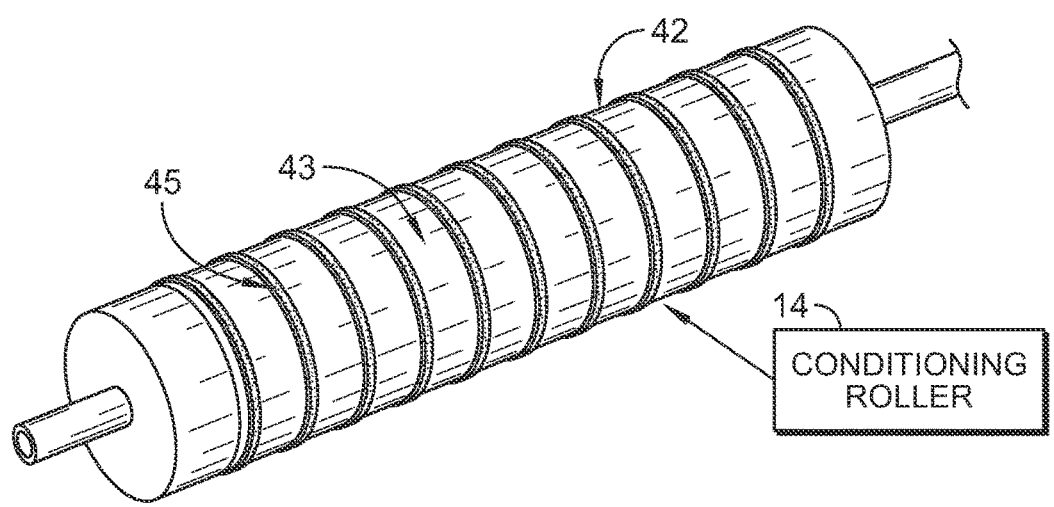
FIG. 11 is a perspective and diagrammatic view of another embodiment of a conditioning roller for use with the article-manufacturing process of FIG. 1, the conditioning roller having an outer surface that includes stripes having a first surface roughness and stripes having a second surface roughness positioned between the stripes with the first surface roughness.
Figure 12:
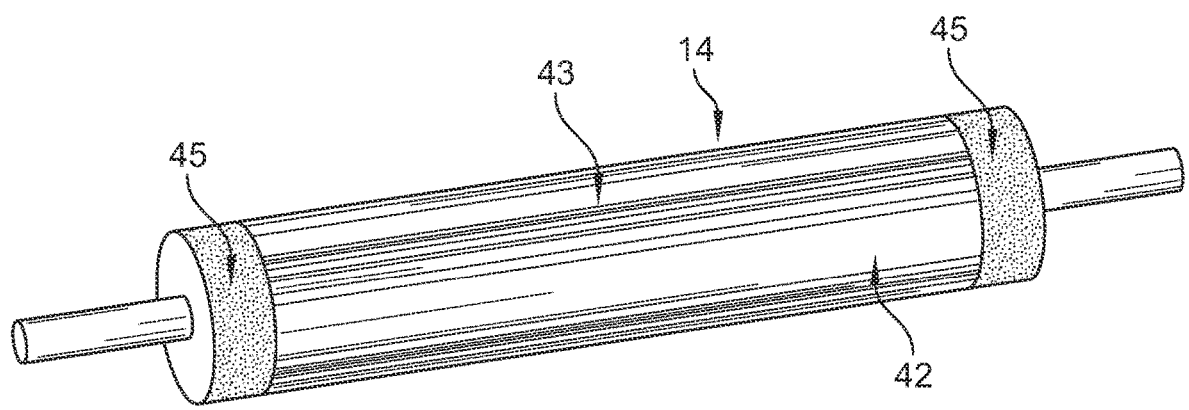
FIG. 12 is a perspective and diagrammatic view of another embodiment of a conditioning roller for use with the article-manufacturing process of FIG. 1, the conditioning roller having an outer surface with a central area having a first surface roughness and end stripes having a second surface roughness.

Conditioning roller 14 is mounted to rotate about a longitudinal axis 40 that extends through conditioning roller 14 as suggested in FIGS. 7 and 8. Conditioning roller 14 may have a circular cross-section when viewed along longitudinal axis 40. Conditioning roller 14 includes an outer surface 42 that contacts sheet 30 and has a texture configured to establish a desired surface finish (sometimes called surface texture) on sheet 30. In illustrative embodiments, outer surface 42 is textured to achieve article 10 having one or more of a desired thickness, surface finish, transparency, levelness, and strength. In other embodiments, sheet 30 is applied to a surface different than outer surface 42 and may be, for example, an inner surface to condition sheet 30. Outer surface 42 is textured to block sheet 30 from moving axially relative to longitudinal axis 40 and to control the feed rate of sheet 30 between extruder 12 and rotary thermoformer 16 and, as a result, control the resulting thickness and/or weight of the formed article 10. In some embodiments, conditioning roller 14 includes an outer surface 42 which has a single texture (continuous surface roughness between ends of roller 14) as shown in FIGS. 9 and 10. In some embodiments, conditioning roller 14 includes an outer surface 42 which has a variable texture (sometimes called a striped conditioning roller or a non-continuous surface roughness) as shown in FIGS. 11 and 12.

Articles 10 illustratively have a surface roughness that is less than the surface roughness of textured outer surface 42. In some embodiments, outer surface 42 is smooth or not textured (about 5 Ra microinches or less) and may have a surface roughness that is less than the surface roughness of articles 10. When outer surface 42 is smooth, other sheet control means may be used to maintain desired characteristics of articles 10 such as thickness, transparency, levelness, and strength. Sheet control means may include one or more of sheet-movement controllers 24 as described below.

Outer surface 42 has a surface roughness to provide desired control and feed rate of sheet 30 while providing a desired transparency and surface finish of articles 10. Outer surface 42 has a roughness of between about 5 Ra (microinches) and about 400 Ra (microinches) in some embodiments. In some embodiments, outer surface 42 has a roughness of between about 8 Ra (microinches) and about 400 Ra (microinches). In some embodiments, outer surface 42 has a roughness of less than about 400 Ra (microinches). In some embodiments, outer surface 42 has a roughness of greater than about 400 Ra (microinches). Outer surface 42 may have any surface roughness as disclosed herein when process 100 includes rotary thermoforming sheet 30 or other thermoforming processes such as flatbed thermoforming, blow molding, casting, etc. because controlling feed rate and location of sheet 30 with conditioning roller 14 may be helpful with many types of molding and forming processes.

The surface roughness of outer surface 42 may be increased as line speed of process 100 increases. For example, outer surface 42 may have a portion with a first surface roughness for a first line speed and the portion may have a second surface roughness for a second line speed, the second line speed being greater than the first line speed and the second surface roughness being greater than the second surface roughness. Increasing the surface roughness of outer surface 42 for increasing line speed may not affect a surface roughness of articles 10 because sheet 30 is applied to conditioning roller for less time at higher line speeds and the molds on the thermoformer may have a greater effect on article 10 surface roughness than conditioning roller surface roughness regardless of line speed.

In one example, outer surface 42 has a roughness of between about 100 Ra (microinches) and about 240 Ra (microinches). Outer surface 42 has a roughness of between about 140 Ra (microinches) and about 220 Ra (microinches) in some embodiments. Outer surface 42 has a roughness of between about 140 Ra (microinches) and about 160 Ra (microinches) in some embodiments. Outer surface 42 has a roughness of between about 180 Ra (microinches) and about 220 Ra (microinches) in some embodiments. Outer surface 42 has a roughness of between about 180 Ra (microinches) and about 200 Ra (microinches) in some embodiments.

In another example, outer surface 42 has a roughness of between about 100 Ra (microinches) and about 350 Ra (microinches). Outer surface 42 has a roughness of between about 180 Ra (microinches) and about 340 Ra (microinches) in some embodiments. Outer surface 42 has a roughness of between about 300 Ra (microinches) and about 350 Ra (microinches) in some embodiments. Outer surface 42 has a roughness of between about 200 Ra (microinches) and about 300 Ra (microinches) in some embodiments. Outer surface 42 has a roughness of between about 50 Ra (microinches) and about 220 Ra (microinches) in some embodiments. Outer surface 42 has a roughness of between about 70 Ra (microinches) and about 220 Ra (microinches) in some embodiments. Outer surface 42 has a roughness of between about 80 Ra (microinches) and about 220 Ra (microinches) in some embodiments. Outer surface 42 has a roughness of between about 90 Ra (microinches) and about 220 Ra (microinches) in some embodiments. Outer surface 42 has a roughness of between about 80 Ra (microinches) and about 380 Ra (microinches) in some embodiments.

Outer surface 42 has a roughness of between about 200 Ra (microinches) and about 275 Ra (microinches) in some embodiments. Outer surface 42 has a roughness of between about 280 Ra (microinches) and about 340 Ra (microinches) in some embodiments. Outer surface 42 has a roughness of between about 290 Ra (microinches) and about 330 Ra (microinches) in some embodiments. Outer surface 42 has a roughness of between about 300 Ra (microinches) and about 320 Ra (microinches) in some embodiments. Outer surface 42 has a roughness of between about 280 Ra (microinches) and about 320 Ra (microinches) in some embodiments. Outer surface 42 has a roughness of between about 270 Ra (microinches) and about 330 Ra (microinches) in some embodiments. Outer surface 42 has a roughness of between about 290 Ra (microinches) and about 310 Ra (microinches) in some embodiments. Outer surface 42 has a roughness of between about 300 Ra (microinches) and about 340 Ra (microinches) in some embodiments. Outer surface 42 has a roughness of between about 300 Ra (microinches) and about 330 Ra (microinches) in some embodiments. Outer surface 42 has a roughness of between about 300 Ra (microinches) and about 320 Ra (microinches) in some embodiments. Outer surface 42 has a roughness of between about 260 Ra (microinches) and about 330 Ra (microinches) in some embodiments. Outer surface 42 has a roughness of between about 270 Ra (microinches) and about 320 Ra (microinches) in some embodiments. Outer surface 42 has a roughness of between about 280 Ra (microinches) and about 310 Ra (microinches) in some embodiments. Outer surface 42 has a roughness of between about 250 Ra (microinches) and about 350 Ra (microinches) in some embodiments. Outer surface 42 has a roughness of between about 250 Ra (microinches) and about 330 Ra (microinches) in some embodiments. Outer surface 42 has a roughness of between about 295 Ra (microinches) and about 305 Ra (microinches) in some embodiments. Outer surface 42 has a roughness of between about 295 Ra (microinches) and about 315 Ra (microinches) in some embodiments. Outer surface 42 has a roughness of between about 285 Ra (microinches) and about 315 Ra (microinches) in some embodiments.

In some embodiments, outer surface 42 is made from chrome and has a roughness of about 8 Ra (microinches) as shown in FIG. 9. In other embodiments, outer surface has a greater roughness as suggested in FIG. 10. Outer surface 42 has a roughness of about 100 Ra (microinches) in some embodiments. Outer surface 42 has a roughness of about 140 Ra (microinches) in some embodiments. Outer surface 42 has a roughness of about 160 Ra (microinches) in some embodiments. Outer surface 42 has a roughness of about 180 Ra (microinches) in some embodiments. Outer surface 42 has a roughness of about 200 Ra (microinches) in some embodiments. Outer surface 42 has a roughness of about 220 Ra (microinches) in some embodiments. Outer surface 42 has a roughness of about 240 Ra (microinches) in some embodiments.

Outer surface 42 has a roughness of greater than about 200 Ra (microinches) and less than about 400 Ra (microinches) in some embodiments. Outer surface 42 has a roughness of about 250 Ra (microinches) in some embodiments. Outer surface 42 has a roughness of about 275 Ra (microinches) in some embodiments. Outer surface 42 has a roughness of about 300 Ra (microinches) in some embodiments. Outer surface 42 has a roughness of about 310 Ra (microinches) in some embodiments. Outer surface 42 has a roughness of about 320 Ra (microinches) in some embodiments. Outer surface 42 has a roughness of about 330 Ra (microinches) in some embodiments. Outer surface 42 has a roughness of about 340 Ra (microinches) in some embodiments. Outer surface 42 has a roughness of about 350 Ra (microinches) in some embodiments.

In embodiments where outer surface 42 is a variable texture surface (as shown in FIGS. 11 and 12 for example), a first portion 43 (sometimes called a stripe) of outer surface 42 has a first roughness and a second portion 45 (sometimes called a stripe) of outer surface 42 has a second roughness different than first portion 43. In some embodiments, first and second portions 43, 45 repeat about roller 14 along axis 40 as shown in FIG. 11. In some embodiments, second portions 45 are located only on the ends of conditioning roller 14 and first portion 43 extends between second portions 45 as shown in FIG. 12.

First portion 43 extends circumferentially around roller 14 and each second portion 45 extends circumferentially around roller 14. First portion 43 may be sized to fit article blanks 38 in a footprint of first portion 43 as suggested in FIG. 11. Second portion 45 may be sized to fit between article blanks 38 as shown in FIG. 11 and/or outside article blanks 38 as shown in FIG. 12. First portion 43 may have a roughness that is less than a roughness of second portion 45. Second portion 45 may be raised radially outward relative to first portion 43.

In some embodiments, first portion 43 has a roughness of about or less than about 400 Ra (microinches). First portion 43 has a roughness of between about 100 Ra (microinches) and about 240 Ra (microinches) in some embodiments. First portion 43 has a roughness of between about 140 Ra (microinches) and about 220 Ra (microinches) in some embodiments. First portion 43 has a roughness of between about 140 Ra (microinches) and about 160 Ra (microinches) in some embodiments. First portion 43 has a roughness of between about 180 Ra (microinches) and about 220 Ra (microinches) in some embodiments. First portion 43 has a roughness of between about 180 Ra (microinches) and about 200 Ra (microinches) in some embodiments.

First portion 43 has a roughness of about 100 Ra (microinches) in some embodiments. First portion 43 has a roughness of about 140 Ra (microinches) in some embodiments. First portion 43 has a roughness of about 160 Ra (microinches) in some embodiments. First portion 43 has a roughness of about 180 Ra (microinches) in some embodiments. First portion 43 has a roughness of about 200 Ra (microinches) in some embodiments.

Second portion 45 has a roughness greater than first portion 43. The roughness of second portion 45 is about 400 Ra (microinches) in some embodiments. The roughness of second portion 45 is greater than about 240 Ra (microinches) in some embodiments. Second portion 45 is located axially outside article blanks 38.

First portions 43 each have a width of about 4 inches and second portion 45 has a width of about 0.5 inches in the embodiment shown in FIG. 11. First and second portions 43, 45 alternate along longitudinal axis 40 of the conditioning roller 14 as shown in FIG. 11. Second portions 45 may each have a width of about 4.5 inches in the embodiment shown in FIG. 12 and first portion extends entirely between the second portions 45. Second portions 45 are located at a first end and a second end of roller 14 and first portion 43 extends entirely between the second portions 45.

Conditioning stage 104 may include a step of blocking sheet 30 from moving axially and circumferentially along longitudinal axis 40 relative to conditioning roller 14 as suggested in FIG. 8. In embodiments in which conditioning roller 14 has a low roughness, for example, sheet 30 may move axially relative to longitudinal axis 40 during conditioning stage 104. Sheet 30 may slip on relatively smooth conditioning rollers 14 which may cause the feed rate and thickness of sheet 30 to vary. Conditioning stage 104 may optionally include a sheet-movement controller 24 to block sheet 30 from moving axially and circumferentially relative to longitudinal axis 40.

Where outer surface 42 of roller 14 has a roughness of about or greater than about 100 Ra (microinches), outer surface 42 provides a desired control and feed rate of sheet 30 such that sheet-movement controller 24 may not be used and the blocking step is achieved by outer surface 42. In other embodiments, one or more sheet-movement controller 24 is used when outer surface 42 has a surface roughness of about 100 Ra (microinches) or less. In some embodiments, one or more sheet-movement controller 24 is used when outer surface 42 has a surface roughness of about 8 Ra (microinches) or less.

Sheet-movement controller 24 urges sheet 30 toward conditioning roller 14 to pin sheet 30 on conditioning roller 14 as suggested in FIG. 8. Pinning sheet 30 onto conditioning roller 14 increases friction between sheet 30 and conditioning roller 14. The increased friction blocks axial movement of sheet 30 relative to conditioning roller 14 and blocks sheet 30 from slipping circumferentially on conditioning roller 14. Blocking sheet 30 from slipping may improve control of sheet 30 in the machine direction which may improve control over gram weight variation of sheet 30.

Sheet-movement controller 24 includes one or more of a static pinner 70, an air pinner 72, and a vacuum box 74, combinations thereof, or any other suitable alternative. Static pinner 70 electrically charges sheet 30 to urge sheet 30 toward conditioning roller 14. Air pinner 72 directs air toward sheet 30 to urge sheet 30 toward conditioning roller 14. Vacuum box 74 applies a vacuum to conditioning roller 14 which urges sheet 30 toward outer surface 42 included in conditioning roller 14. In some embodiments, static pinner 70 and air pinner 72 are spaced apart from conditioning roller 14.

Figure 6A:
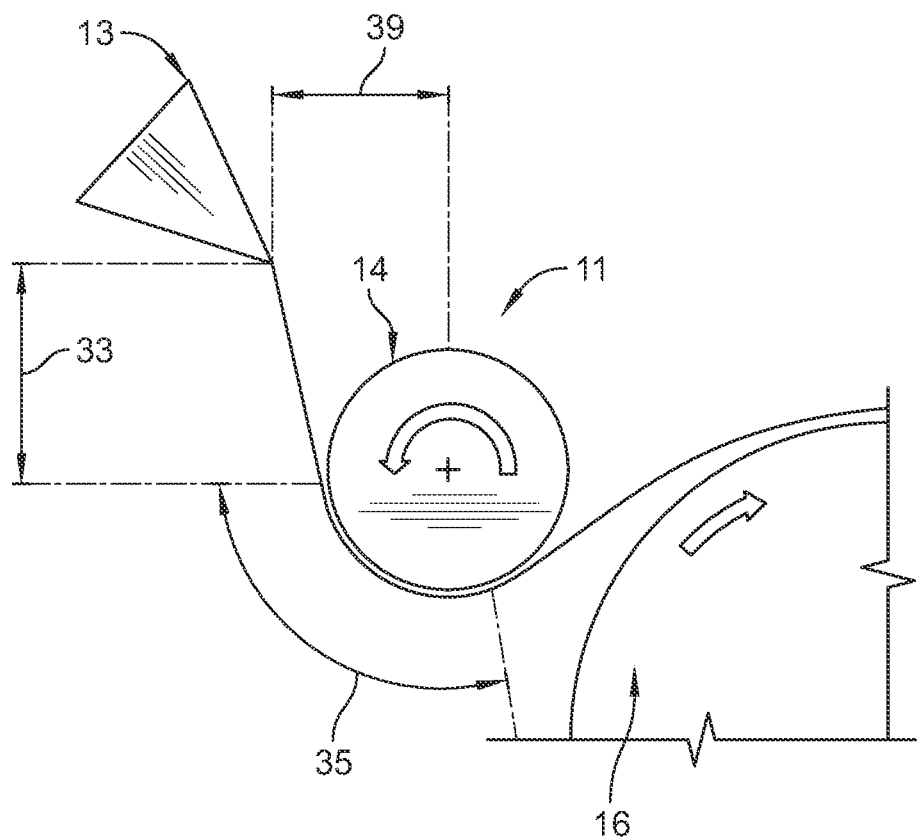
FIG. 6A is a diagrammatic view of the die, conditioning roller, and a portion of the rotary thermoformer suggesting that the location of the conditioning roller is adjustable relative to the die and the location of the rotary thermoformer is adjustable relative to the conditioning roller to vary a temperature of the sheet as it is applied to the conditioning roller and the degrees the sheet is wrapped around the conditioning roller before being applied to the rotary thermoformer.

A distance between conditioning roller 14 and die 13 may be adjusted as suggested in FIG. 6A. A distance between conditioning roller 14 and rotor 44 may be adjusted. A vertical distance between conditioning roller 14 and die 13 is indicated as a distance 33. A horizontal distance between conditioning roller 14 and die is indicated as a distance 39. The degrees of wrap 35 that sheet 30 is applied to conditioning roller and the tangential points where sheet 30 meets and exits conditioning roller 14 may be adjusted based on the location of conditioning roller 14 relative to die 13 and rotor 44.

The distance between conditioning roller 14 and die 13 has an effect on transparency of sheet 30 and articles 10 in some embodiments as suggested in FIG. 6A. A vertical distance 33 from a lip of die 13 to a tangential point of sheet 30 first touching conditioning roller 14 may affect transparency values of article 10. This may be due to a temperature of sheet 30 when it contacts conditioning roller 14. The greater the vertical distance 33 up to a point, the longer the melt stream is exposed to relatively cooler ambient air such that the polymeric material is cooled and may take on less of a texture of the conditioning roller 14 such that articles 10 have improved transparency, improved transparency being at least one of higher clarity values and lower haze values. In some embodiments, polymeric material held at a lower melt point in extruder 12 has a lower temperature at conditioning roller 14 and produces articles with improved transparency. Some embodiments of process 100 include increasing a vertical height between conditioning roller and die 13 to increase clarity and/or reduce haze of articles 10.

Process 100 includes varying a temperature of polymeric materials before they contact conditioning roller 14 to vary a transparency of article 10 in some embodiments. In some embodiments, varying the temperature of polymeric materials before they contact conditioning roller 14 includes varying a distance between conditioning roller 14 and die 13. In some embodiments, varying the temperature of polymeric materials before they contact conditioning roller 14 includes varying a distance the polymeric materials exiting die 13 and the polymeric materials contacting a first stage such as conditioning rollers 14. In some embodiments, varying the temperature of polymeric materials before they contact conditioning roller 14 includes varying a temperature of the polymeric materials in extruder 12.

Figure 13:
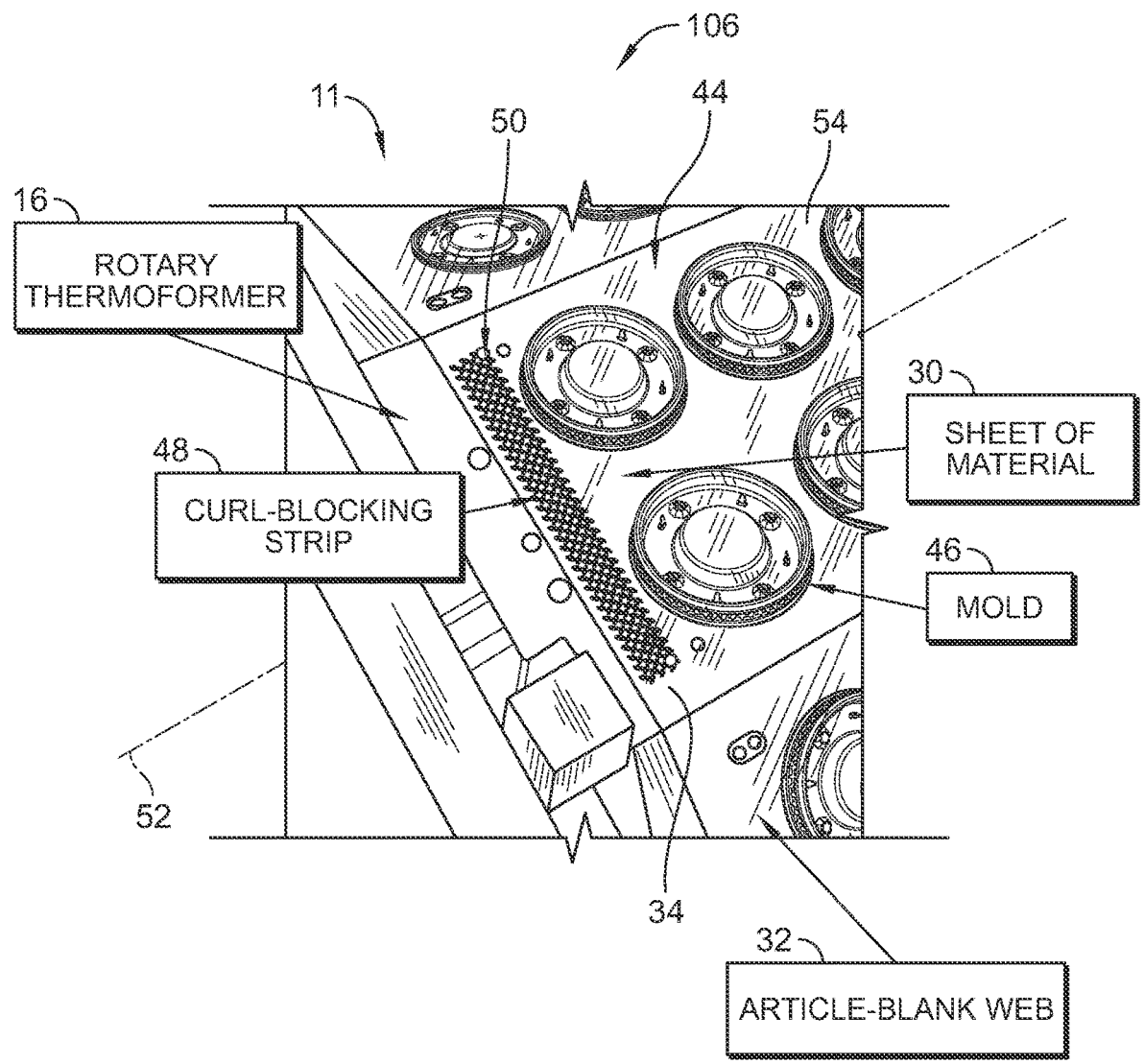
FIG. 13 is a perspective and diagrammatic view of the rotary thermoforming stage of the article-manufacturing process of FIG. 3 suggesting that the rotary thermoforming stage includes applying the sheet to a rotary thermoformer, the rotary thermoformer including a rotor mounted to rotate about a rotation axis, a plurality of article molds coupled to the rotor, and optional curl-blocking strips that extend radially outward away from the rotor toward edges of the sheet, and suggesting that the sheet thermoforms to the article molds to form article blanks and to the curl-blocking strips to block the sheet from curling away from the rotor during the rotary thermoforming step.

Rotary thermoforming stage 106 uses rotary thermoformer 16 to form continuously article-blank web 32 from sheet 30 as suggested in FIG. 13. Article-blank web 32 includes a plurality of article blanks 38 that can be cut using cutting stage 108 to form articles 10 as suggested in FIGS. 19-22. Article blanks 38 are illustratively lid blanks for forming lids 210. Other thermoforming stages may be used in place of rotary thermoforming stage 106 in some embodiments.

In rotary thermoforming stage 106, sheet 30 is applied to a rotary thermoformer 16 that includes a rotor 44 and a plurality of article molds 46 coupled to rotor 44 to provide an article-blank web 32 having a plurality of article blanks 38 formed therein as suggested in FIGS. 4 and 13. Rotor 44 is configured to rotate clockwise in the illustrative embodiment. In other embodiments, a female sheet path is used and/or rotor 44 rotates counter-clockwise and sheet 30 is applied to move counter-clockwise with rotor 44.

Rotary thermoformer 16 includes rotor 44 mounted to rotate about a rotation axis 52 and the plurality of article molds 46 coupled to rotor 44 as shown in FIG. 4. Molds 46 may have a greater surface roughness than articles 10 and may have a surface roughness that is less than the surface roughness of roller 14. In some embodiments, molds 46 have a surface roughness of between about 50 and about 70 Ra (microinches). In some embodiments, molds 46 have a surface roughness of between about 55 and about 65 Ra (microinches).

Sheet 30 is applied to rotor at a first circumferential position 94 and is wrapped around rotor 44 for a predetermined number of degrees and then separates from rotor 44 at a second circumferential position 96 to continue downstream to splitting stage 107 and/or cutting stage 108 as suggested in FIG. 4. First and second circumferential positions 94, 96 can be adjusted by varying the special relationships between roller 14, rotor 46, and the component directly downstream of rotor 46 such as, for example, splitter 25, cutter 18, 20, or one or more bicycle wheels or rotors adapted to strip sheet 30 off of rotor 46.

An angle alpha α is defined between first circumferential position 94 and second circumferential position 96 as shown in FIG. 4. Angle alpha α may be varied so that sheet 30 remains applied to rotor 44 for a desired period of time before separating from rotor 44. For example, sheet 30 remains applied to rotor 44 for a first angle alpha α and, thus, for a first amount of time for a first line speed. If the line speed is varied to a second line speed, alpha α may be varied so that sheet 30 remains applied to rotor 44 for a desired period of time before separating from rotor 44. As an example, if the second line speed is greater than the first line speed, alpha α may be increased so that sheet 30 remains applied to rotor 44 for the same amount of time for both the first line speed and the second line speed.

In some embodiments, angle alpha α is between about 40 degrees and about 340 degrees. In some embodiments, angle alpha α is between about 190 degrees and about 240 degrees. In some embodiments, angle alpha α is between about 200 degrees and about 235 degrees. In some embodiments, angle alpha α is between about 90 degrees and about 140 degrees. In some embodiments, angle alpha α is between about 100 degrees and about 120 degrees. In some embodiments, angle alpha α is between about 90 degrees and about 320 degrees. In some embodiments, angle alpha α is between about 150 degrees and about 250 degrees. In the illustrative embodiment, angle alpha α is about 235 degrees.

Rotary thermoformer 16 optionally includes curl-blocking strips 48 that extend radially outward away from rotor 44 toward sheet 30. Rotor 44 is mounted to rotate about rotation axis 52 of rotary thermoformer 16. Article molds 46 are coupled to rotor 44 for rotation therewith. Curl-blocking strips 48 include a plurality of protrusions 50 that extend radially outward away from rotor 44 toward sheet 30 to engage and block sheet 30 from curling away from rotor 44 during the rotary thermoforming stage 106.

Figure 13A:
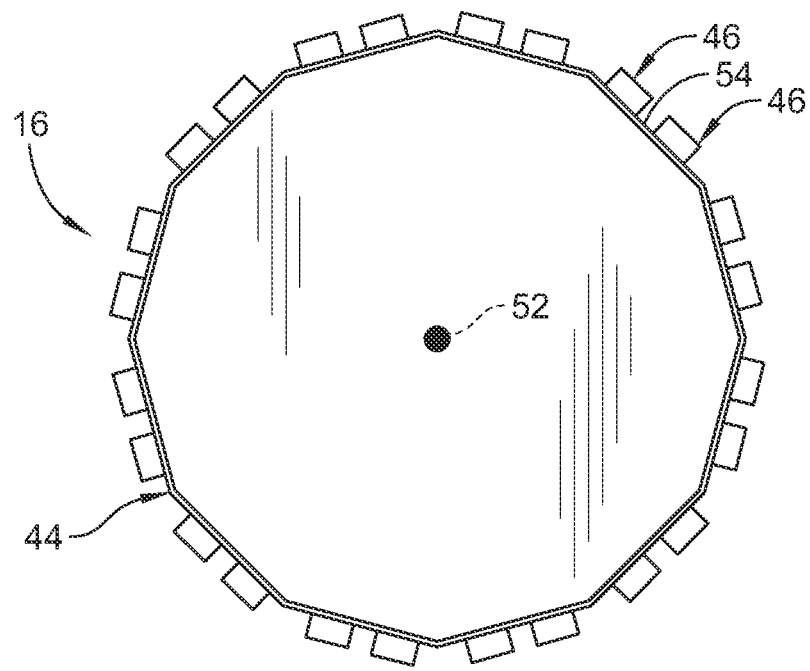
FIG. 13A is a diagrammatic view of the rotary thermoformer of FIG. 13 showing that the rotor includes two columns of article molds coupled to each side of the rotor.
Figure 13B:
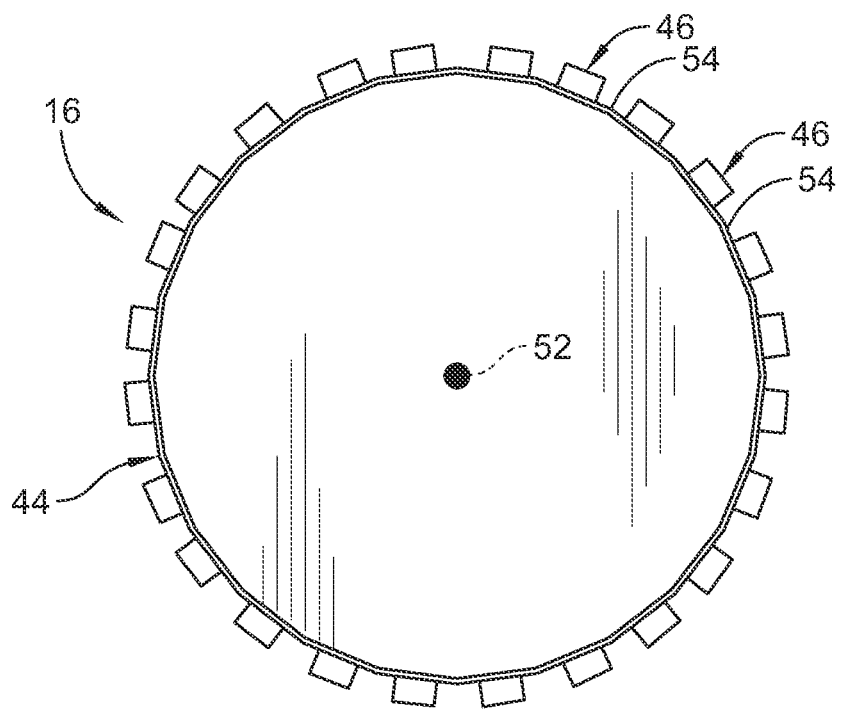
FIG. 13B is a diagrammatic view of another rotary thermoformer showing that the rotor includes one column of article molds coupled to each side of the rotor.

Rotor 44 includes a plurality of faces 54 (sometimes called sides or bands) angled relative to one another about rotation axis 52 and article molds 46 are coupled to faces 54. Each article mold 46 may have any desired shape and each article mold 46 may be uncoupled from rotor 44 and replaced with a different shaped article mold 46. In some embodiments, at least two axially extending columns of article molds 46 are coupled to each of the plurality of faces 54 included in rotor 44 as shown in FIGS. 13 and 13A. In some embodiments, only one axially extending column of article molds 46 is coupled to each of the plurality of faces 54 included in rotor 44 as shown in FIG. 13B.

Some polymeric materials such as, for example, polypropylene are prone to curl at the edge during rotary thermoforming. The curled edges may result in article-blank webs and articles being out of desired dimensional tolerance. For example, the articles may be rejected for not being level. Additionally, a sheet having curled edges may be more difficult to convey through the manufacturing process, may be more difficult to handle by hand or machine, and/or may cause issues in downstream operations such as, for example, in the cutting operation.

In one example, an inner side of a sheet 30 made from polypropylene is cooled by rotor 44 and an outer side of sheet 30 is exposed to room temperature air. The temperature difference may be one factor that causes edges 34, 36 of sheet to curl up. Other polymeric materials such as, for example, polystyrene may not exhibit this severity of shrinkage and curl behavior.

Shrinkage rate of the polymeric material may also factor the severity of edge curl of sheet 30. The amount of total shrinkage increases as a width of sheet 30 increases. Polypropylene may have a shrinkage rate of 3-4 times that of polystyrene and/or polyethylene terephthalate. Polypropylene may shrink at a rate of about 0.015 inches to about 0.018 inches per inch. Polystyrene may shrink at a rate of about 0.004 to about 0.007 inches per inch. Polyethylene terephthalate may shrink at a rate of about 0.003 inches to about 0.005 inches per inch. Curl-blocking strips 48 may reduce or eliminate edge curl of polypropylene sheets or sheets of other polymeric materials having a higher shrinkage rate than polystyrene, for example, to allow the edge curl to be minimized and sufficient for processing and for providing articles with desired characteristics such as levelness.

The shrinkage rate of a polymeric material may be one factor associated with its tendency to experience edge curl. As an example, polymeric materials having a shrinkage rate of greater than about 0.007 inches per 1 inch may be more likely to experience edge curl during rotary thermoforming. As another example, polymeric materials having a shrinkage rate of between about 0.007 inches per 1 inch and about 0.020 inches per one inch may be more likely to experience edge curl during rotary thermoforming. As another example, polymeric materials having a shrinkage rate of between about 0.008 inches per 1 inch and about 0.020 inches per one inch may be more likely to experience edge curl during rotary thermoforming. As another example, polymeric materials having a shrinkage rate of between about 0.007 inches per 1 inch and about 0.018 inches per one inch may be more likely to experience edge curl during rotary thermoforming. As another example, polymeric materials having a shrinkage rate of between about 0.008 inches per 1 inch and about 0.018 inches per one inch may be more likely to experience edge curl during rotary thermoforming. As another example, polymeric materials having a shrinkage rate of between about 0.016 inches per 1 inch and about 0.018 inches per one inch may be more likely to experience edge curl during rotary thermoforming.

Curl-blocking strips 48 may be used with other thermoforming methods such as, for example, flatbed thermoforming. Curl-blocking strips 48 block edge curl of sheet 30 which may be experienced with other thermoforming methods besides rotary thermoforming. Curl-blocking strips 48 may be useful for thermoforming polymeric materials with relatively high shrinkage rates such as, for example, polypropylene.

Figure 14:
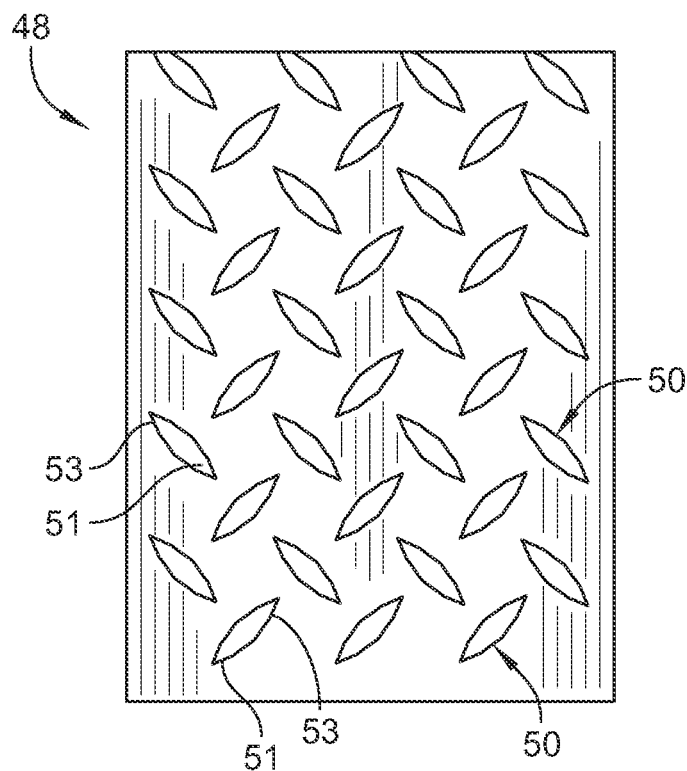
FIG. 14 is a top elevation view of one of the curl-blocking strips showing that the curl-blocking strip includes rows of protrusions arranged in an alternating pointing pattern to block a sheet molded to the curl-blocking strip from releasing from the curl-blocking strip if the sheet moves laterally relative to the protrusions while also allowing the sheet to release from the curl-blocking strip when the sheet moves perpendicularly away from the protrusions.
Figure 15:
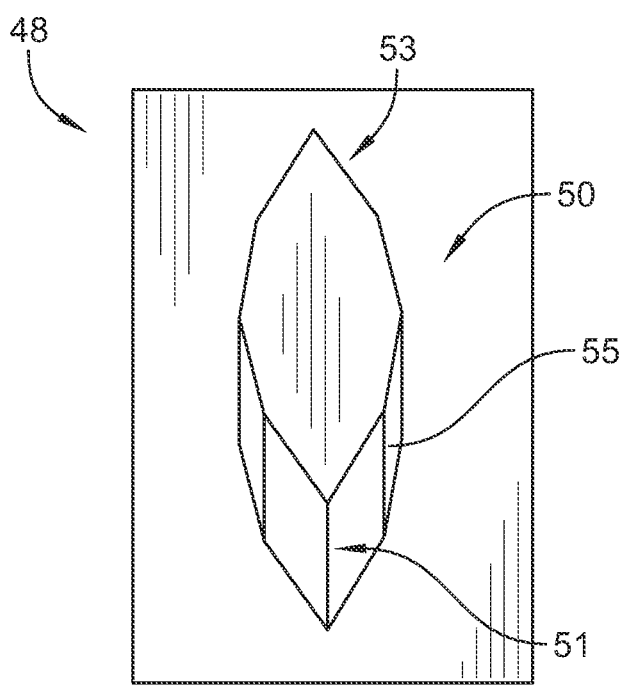
FIG. 15 is a perspective view of one of the protrusions included in the curl-blocking strip of FIG. 14 showing that the protrusion has a generally ellipse shape with converging pointed ends and that the protrusion has a steep inclined surface to block the sheet molded to the curl-blocking strip from easily releasing from the curl-blocking strip in a lateral direction.

Rotary thermoformer 16 of the present disclosure further includes a curl-blocking strip 48 that blocks edge curl of the sheet 30 during rotary thermoforming process 106 as shown in FIG. 13. Curl-blocking strip 48 is defined by a plurality of protrusions 50 that extend radially outward away from rotor 44 toward sheet 30 to engage and block edges 34, 36 of sheet 30 from curling away from rotor 44 during rotary thermoforming stage 106 as shown in FIGS. 14 and 15. Because edges 34, 36 of sheet 30 are blocked from curling, article blanks 38 located adjacent edges 34, 36 of article-blank web 32 are substantially level and within desired dimensional tolerances. As a result, the potential for article blanks 38 and articles 10 being rejected for being out of dimensional tolerance is reduced.

Curl-blocking strips 48 may help provide structure (rigidity) at an outside end of sheet 30 to help with transport, indexing of webs, and give greater control of sheet 30 for pushing through reciprocating press cutter. As discussed elsewhere, curl-blocking strips 48 can be used with thermoforming processes other than rotary thermoforming and for polymeric materials other than polypropylene such as, for example, polystyrene, to provide such benefits. In some embodiments, curl-blocking strips 48 are not used and outside edges of sheet 30 are slit and separated from a center portion of sheet 30 before cutting stage 108. In some embodiments, cutters 18, 20 are sized to accept curled edges of sheet 30. In some embodiments, nip rollers are used to flatten curled edges of sheet 30. In some embodiments, a reverse curl is applied to the sheet 30 to compensate for edge curl. In some embodiments, the edges are chilled before thermoforming.

Rotor 44 includes a first end and an opposite second end as shown in FIG. 13. A curl-blocking strip 48 is located adjacent each of the first end and the second end on one more of faces 54. In illustrative embodiments, curl-blocking strips 48 are coupled to each face 54. Article molds 46 are located axially between curl-blocking strips 48. In the illustrative embodiment, a curl-blocking strip 48 is located adjacent each of the first end and the second end and article molds 46 are located axially between the pair of curl-blocking strips 48. In other embodiments, curl-blocking strips 48 are formed as protrusions that extend axially away from the ends of rotor 44 and sheet 30 is wrapped at least partway over the ends and axially extending protrusions. In some embodiments, curl-blocking strips 48 are formed as cavities that extend radially into rotor 44. In some embodiments, curl-block strips 48 are not used and a female die or clamps are used to block edge curl.

Curl-blocking strips 48 are shown as discrete strips. In other embodiments, curl-blocking strips 48 are continuous and form full hoop ring around rotor 44. In other embodiments, curl-blocking strips 48 extend about 50% or more of a length of a facet of rotor 44. In some embodiments, curl-blocking strips 48 and/or curl-blocking protrusions are integrally formed with rotor 44.

One embodiment of curl-blocking strip 48 includes a pattern of diamond shaped protrusions 50 as shown in FIG. 14. As sheet 30 is applied to rotor 44 of rotary thermoformer 16, edges 34, 36 of sheet 30 mold onto diamond shaped protrusions 50 which block edges 34, 36 from curling. In other embodiments, protrusions 50 may be any other shape or combination of shapes that block edges 34, 36 from curling.

Curl-blocking strips 48 are defined by the plurality of protrusions 50 as shown in FIG. 13-15. Protrusions 50 form a pattern and are integrally formed with rotor 44 in some embodiments. In other embodiments, curl-blocking strips 48 may be uncoupled from rotor 44 and replaced with different curl-blocking strips 48. In the illustrative embodiments, protrusions 50 are raised diamond shaped. Each curl-blocking strip 48 is located axially between an edge 34, 36 and an outermost lid blank 38. Because curl-blocking strips 48 are optional, curl-blocking strips 48 may be uncoupled from or not formed in rotor 44 in some embodiments.

As shown in FIG. 14, each curl-blocking strip 48 includes a plurality of rows of protrusions 50. Illustratively, curl-blocking strip 48 includes seven rows of protrusions 50. In other embodiments, curl-blocking strip 48 includes one or more rows of protrusions 50. Each protrusion is generally ellipse shaped with pointed ends 51, 53. Protrusions in a given row are oriented with their ends 51, 53 aligned in a first direction. Protrusions in adjacent rows are oriented with their ends 51, 53 aligned in a second direction. In the illustrative embodiment, the second direction is different than the first direction. As shown in FIG. 14, the second direction is offset from the first direction by about 90 degrees. The alternating first and second direction alignments block sheet 30 from pulling/curling off in any direction.

Each protrusion has a steep side surface 55 such that side surface 55 has no draft or little draft). In some embodiments, side surface 55 extends away from face 54 of rotor 44 by about 90 degrees. Having no or little draft on side surface 55 blocks sheet 30 from easily releasing from curl-blocking strip 48 until sheet 30 moves perpendicularly away from curl-blocking strip 48. Side surface 55 and pointed ends 51, 53 may cooperate to block sheet 30 from releasing from curl-blocking strip 48 in a lateral direction. As a result, sheet 30 may release from curl-blocking strip 48 when sheet 30 moves away from curl-blocking strip 48 in about a perpendicular direction. Side surface 55 has a height of about 0.060 inches in the illustrative embodiment. In other embodiments, side surface 55 has a height of about 0.030 to about 0.080 inches.

During rotary thermoforming stage 106, sheet 30 is wrapped at least partway about rotary thermoformer 16 to cause sheet 30 to thermoform to article mold 46 and curl-blocking strip 48 (if present) and form article-blank web 32 as suggested in FIG. 13. A portion of sheet 30 engages faces 54 and article molds 46 as rotor 44 rotates about axis 52. Rotation of rotor 44 causes the edge of each face 54 and article molds 46 to stretch sheet 30 away from roller 14. Rotation of rotor 44 causes sheet 30 to mold to face 54 and article molds 46.

Figure 18:
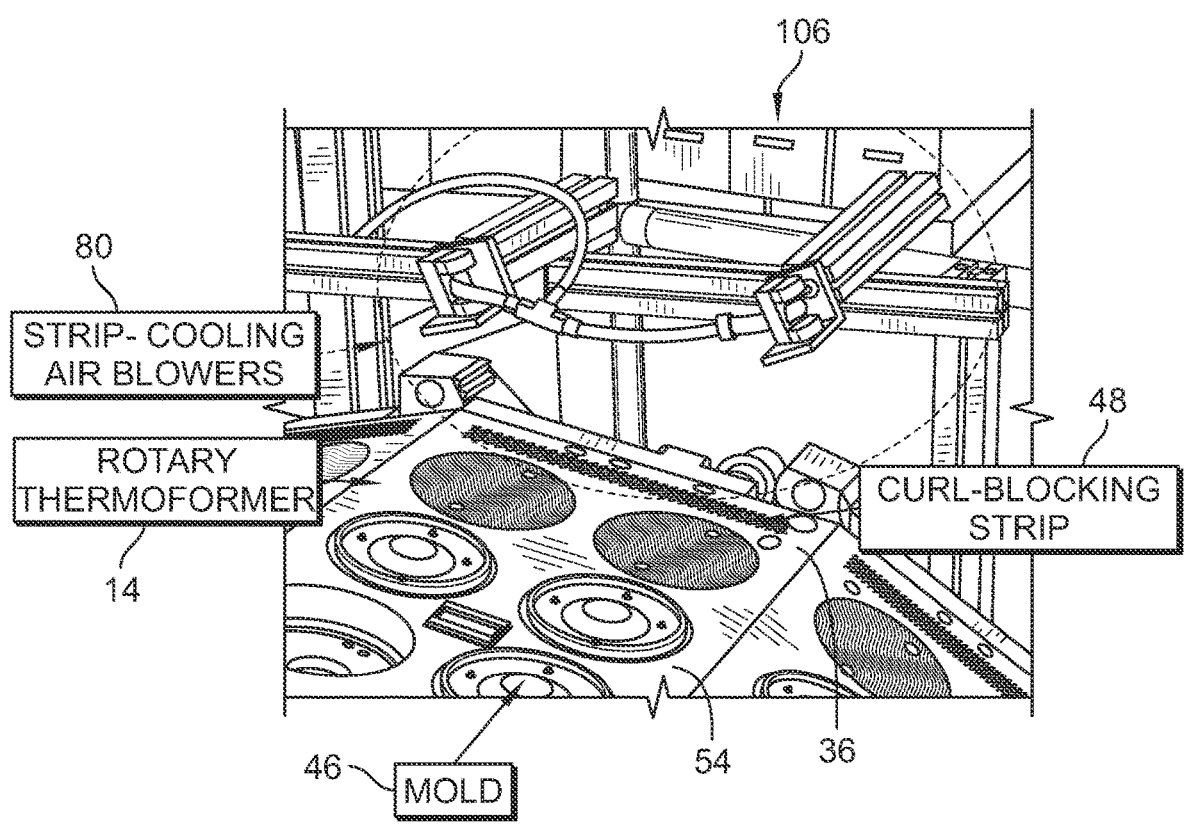
FIG. 18 is a perspective and diagrammatic view of the rotary thermoforming stage showing that the rotary thermoforming stage optionally includes a cooling step in which relatively cool fluid is directed toward the sheet and curl-blocking strips to reduce or eliminate edge-curl of the article-blank web.

As shown in FIGS. 4 and 18, rotary thermoforming stage 106 of the present disclosure is performed without plug assist or positive pressure being applied on one side of sheet 30 to form article-blank web 32. That is, no clam shell, plug, male mating mold, or female mating mold is urged toward rotor 44 to apply pressure to an outer face of sheet 30. Illustratively, rotor 44 is a one sided tooling (no external mating mold(s)). In some embodiments, a vacuum is applied to rotor 44 to urge sheet 30 onto rotor 44. In some embodiments, the molds on rotor 44 are male. In some embodiments, the molds on rotor 44 are female.

The circumferential width of each face 54 may have an effect on controlling sheet 30 and the thickness uniformity of sheet 30 and article-blank web 32. To fit two or more columns of molds 46 onto a single face 54 may result in faces 54 with relatively large widths. Faces with too large of widths may result in article-blank webs 32 that have non-uniform thicknesses due to the stretching of sheet 30 caused by rotation of the faces. As such, some embodiments include faces 54 with a single columns of molds 46 as shown in FIG. 13B.

In some embodiments, a vacuum is applied to rotor 44. In some embodiments, the vacuum is between about one and about thirty inches of mercury. In some embodiments, the vacuum is between about ten and about thirty inches of mercury. In some embodiments, the vacuum is between about ten and about twenty inches of mercury. In some embodiments, the vacuum is between about fifteen and about twenty inches of mercury. In some embodiments, the vacuum is about one to 30 inches of mercury. In some embodiments, the vacuum is about fifteen inches of mercury.

Rotary thermoformer 16 may be temperature controlled by flowing fluid through rotary thermoformer 16 for example. In some embodiments, rotary thermoformer 16 is cooled with fluid at between about 60 degrees and about 90 degrees Fahrenheit. In some embodiments, rotary thermoformer 16 is cooled with fluid at about 70 degrees Fahrenheit. In illustrative embodiments, rotary thermoformer 16 has a temperature of between about 30 degrees Fahrenheit and about 150 degrees Fahrenheit. In some embodiments, rotary thermoformer 16 has a temperature of between about 60 degrees Fahrenheit and about 100 degrees Fahrenheit.

Figure 16:
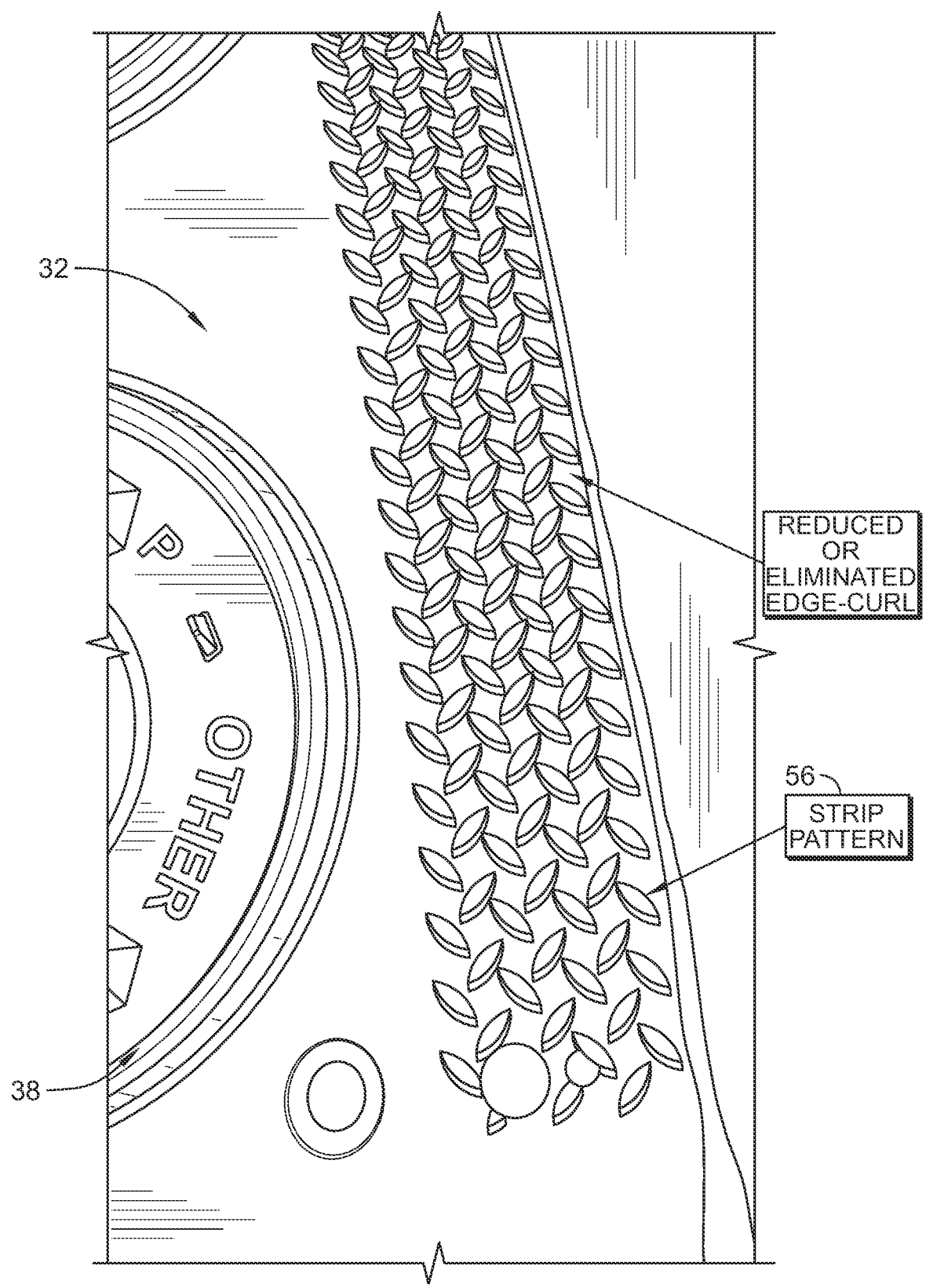
FIG. 16 is a perspective and diagrammatic view of the article-blank web formed during the rotary thermoforming stage showing that the article-blank web includes a strip pattern formed along an edge of the web by the curl-blocking strip to block edge curl of the sheet during the rotary thermoforming stage and suggesting that the strip pattern stiffens the edge of the sheet to facilitate handling of the sheet.

Rotary thermoforming sheet 30 forms article-blank web 32 as suggested in FIG. 13. Article-blank web 32 is moved away from rotor 44 as rotary thermoformer 16 continues to rotate about rotation axis 52. Article-blank web 32 includes article blanks 38 formed by article molds 46 as shown in FIG. 16. In the illustrative embodiment, article blanks 38 are lid blanks. Article blanks 38 are cut downstream to provide articles 10 and, in the illustrative embodiment, lids 210.

Figure 17:
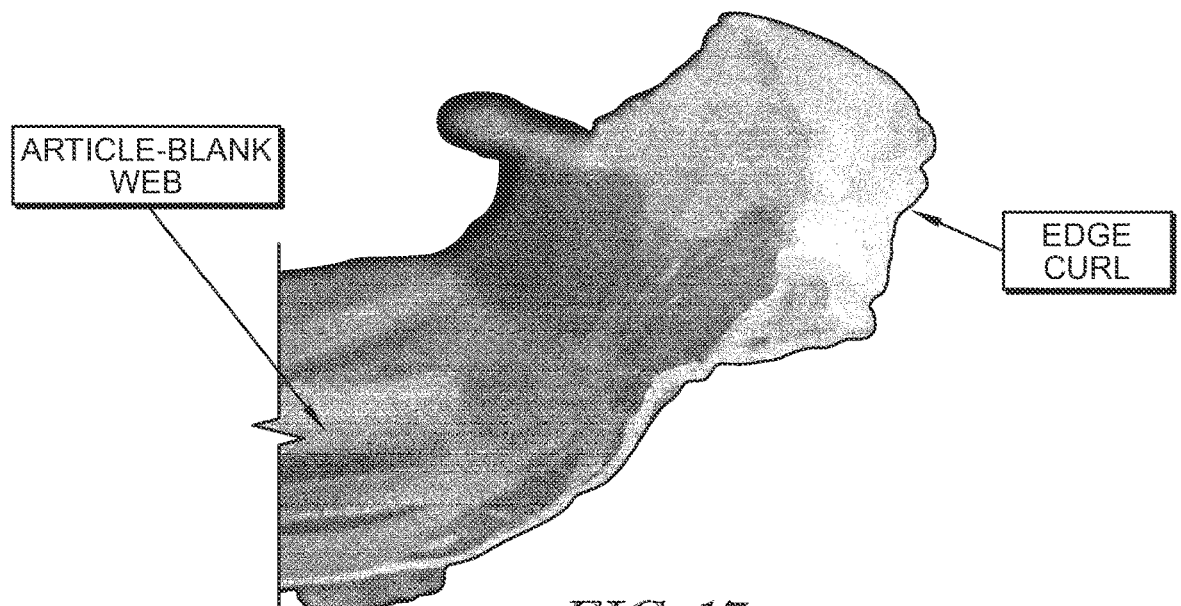
FIG. 17 is a perspective and diagrammatic view of a prior art article-blank web formed by a rotary thermoforming process without the curl-blocking strip of the present disclosure such that a strip pattern was not formed in the web and showing that the prior art article-blank web has undesired edge curl.

In embodiments that use curl-blocking strips 48, a strip pattern 56 is formed in article-blank web 32 by curl-blocking strips 48 as shown in FIG. 16. Strip pattern 56 is located between an edge 34, 36 and an article blank 38. Strip pattern 56 is thermoformed to curl-blocking strip 48 during rotary thermoforming stage 106 which blocks edges 34, 36 of article-blank web 32 from curling. In contrast, a prior art article-blank web comprising certain polymeric materials and formed in a rotary thermoforming stage without curl-blocking strip 48 is shown in FIG. 17 and the edges of the article-blank web are curled outward. Strip pattern 56 also provides additional structure to edges 34, 36 which may improve handling of article-blank web 32 in downstream stages of article-manufacturing process 100.

Rotary thermoforming stage 106 includes an optional strip cooling step in some embodiments as shown in FIG. 18. The cooling step uses strip-cooling air blowers 80 to direct relatively cool fluid toward sheet 30 and curl-blocking strips 48. The cooling step comprises directing forced fluid toward rotor 44 at a location aligned axially with curl-blocking strips 48. In other words, air blowers 80 may direct forced fluid toward sheet 30 and curl-blocking strips 48. The cooling step may increase the speed of thermoforming sheet 30 to curl-blocking strips 48 which may decrease edge curl experienced by sheet 30. In other embodiments, fluids other than air may be directed toward sheet 30 using air blowers 80. Illustratively, a first and second air blower are arranged to blow air toward curl-blocking strips 48 located at each end of rotor 44 at a first pressure and a third blower is arranged to blow air at sheet 30 axially between curl-blocking strips 48 at a second pressure that is less than the first pressure.

Outlets of air blowers 80 are positioned up to about 48 inches away from sheet 30 in some embodiments. In one embodiment, for example, an outlet of an air blower 80 is positioned about 5 inches away from sheet 30. Blown or compressed air may be directed toward sheet 30. In some embodiments, air blowers 80 direct compressed air at between about 1 and about 40 psi toward sheet 30. Air directed toward sheet 30 from air blowers 80 has a relatively lower temperature than a temperature of sheet 30 located just prior to air blowers 80. Air blown by blowers 80 has a temperature of below about 350 degrees Fahrenheit in some embodiments. In some embodiments, air blown by blowers 80 has a temperature of below about 200 degrees Fahrenheit. In other examples, the air blown by blowers 80 has a temperature lower than a temperature of sheet 30.

In some embodiments, a sheet 30 of polymeric material of a first formula is extruded and conditioned and smaller sheets of polymeric material of a second formula are located in or on molds of the thermoformer. The sheet 30 is over molded onto the smaller sheets so that article 10 has a portion with a desired second formula without forming the entire article 10 from the first formula. This may be desirable for example if the second formula is more expensive than the first formula. In some embodiments, ink films are located in or on molds to apply an ink layer to sheet 30.

In some embodiments, article-blank web 32 is moved to splitting stage 107 after rotary thermoforming stage 106 as shown in FIG. 3. In other embodiments, splitting stage 107 is performed at any point downstream of providing sheet 30 and may be performed between any other stages. During splitting stage 107, article-blank web 32 is conducted through splitter 25 to separate article-blank web 32 into two or more strips 47 in the machine direction as suggested in FIG. 4. Splitting stage 107 may be desired when sheet 30 comprises high shrinkage polymers like polypropylene or other polymers having a shrinkage rate of about 0.008 inches per inch or greater. By splitting sheet 30 into two or more strips, the magnitude of shrinkage of each strip is less than the shrinkage of the entire sheet 30. For example, a 30 inch sheet may experience 0.48 inches of shrinkage while two strips of 15 inches may each experience 0.24 inches of shrinkage. As a result, aligning the strips with cutter in the transverse direction (axially relative to rotor rotation axes) may be easier and more accurate than aligning an entire sheet 30 with the greater shrinkage across the sheet.

The splitter 25 may include a plurality of rotor blades configured to cut through article-blank web 32 as it is conducted from thermoforming stage 106 to cutting stage 108. The rotor blades may be moved relative to the sheet to engage or disengage the sheet as desired. For example, the blades could be moved to a disengaged position to not split sheet 30 in some embodiments.

Splitting article-blank web 32 into multiple strips 47 may improve handling and control of article-blank web 32 during cutting stage 108. For example, a transverse position of each strip 47 may be independently adjusted as each strip 47 is conducted to cutting stage 108 to allow for variation in each row of article blanks 38 included in article-blank web 32. In contrast, adjustment of a transverse position of a whole (un-split) article-blank web 32 may be limited because the adjustment would affect all rows of article blanks 38.

In some embodiments, article-blank web 32 is split in a middle of article-blank web 32 to form two strips 47 of about equal width. In some embodiments, article-blank web 32 is split to separate each row of article blanks 38 into its own strip 47. In some embodiments, splitting stage 107 is used when rotary cutter 20 has fixed position dies that are not adjustable. In some embodiments, rotary cutter 20 includes the adjustable position dies and splitting state 107 is omitted.

Article-blank web 32 is moved to cutting stage 108 after rotary thermoforming stage 106 or optionally after splitting stage 107 as shown in FIG. 3. In illustrative embodiments, cutting stage 108 uses either reciprocating cutter 18 or rotary cutter 20 to cut articles 10 from article blanks 38 formed in article-blank web 32 as suggested in FIGS. 19-22. In other embodiments, article-blank web 32 is cut using laser or water jet cutters.

Cutting stage 108 makes incisions in article-blank web 32 to form a carrier web and preformed articles coupled with carrier web in illustrative embodiments. The preformed articles are coupled with carrier web at one or more discrete joints that are configured to be broken (punched out) in response to a force being applied to the preforms in a separating step to provide articles 10 while leaving minimal or no traces of the discrete joints on articles 10. In other embodiments, cutting stage 108 incorporates separating stage and cutting stage 108 makes incisions in article-blank web 32 to fully cut and separate articles 10 from article-blank web 32.

Forming preform articles coupled with the carrier web may provide improved handling and collection of articles 10 after cutting stage 107 because the preforms can be separated from the carrier web while being grasped by a machine such as a conveyer belt and then continue downstream to stacking stage 110 or bagging stage 112. In other embodiments, articles 10 are fully cut and separated from article-blank web 32 simultaneously which may result in a plurality of loose articles 10.

Figure 19:
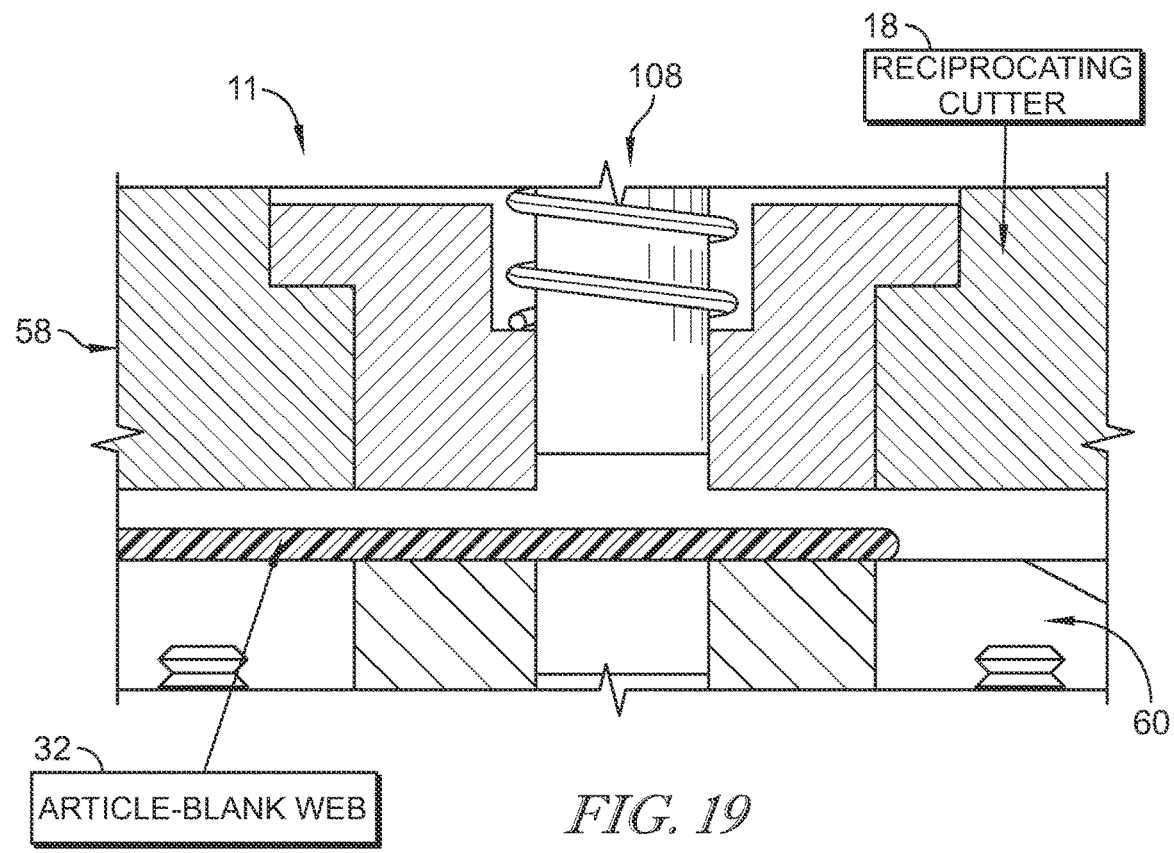
FIG. 19 is a perspective and diagrammatic view of one embodiment of the cutting stage of the article-manufacturing process of FIG. 3 showing that in some embodiments, the article-blank web is moved between an upper-press die and a lower-press die of a reciprocating cutter that cuts the article-blank web to provide one or more articles article and suggesting that movement of the article-blank web is temporarily stopped while the upper-press die and the lower-press die move relative to one another.
Figure 20:
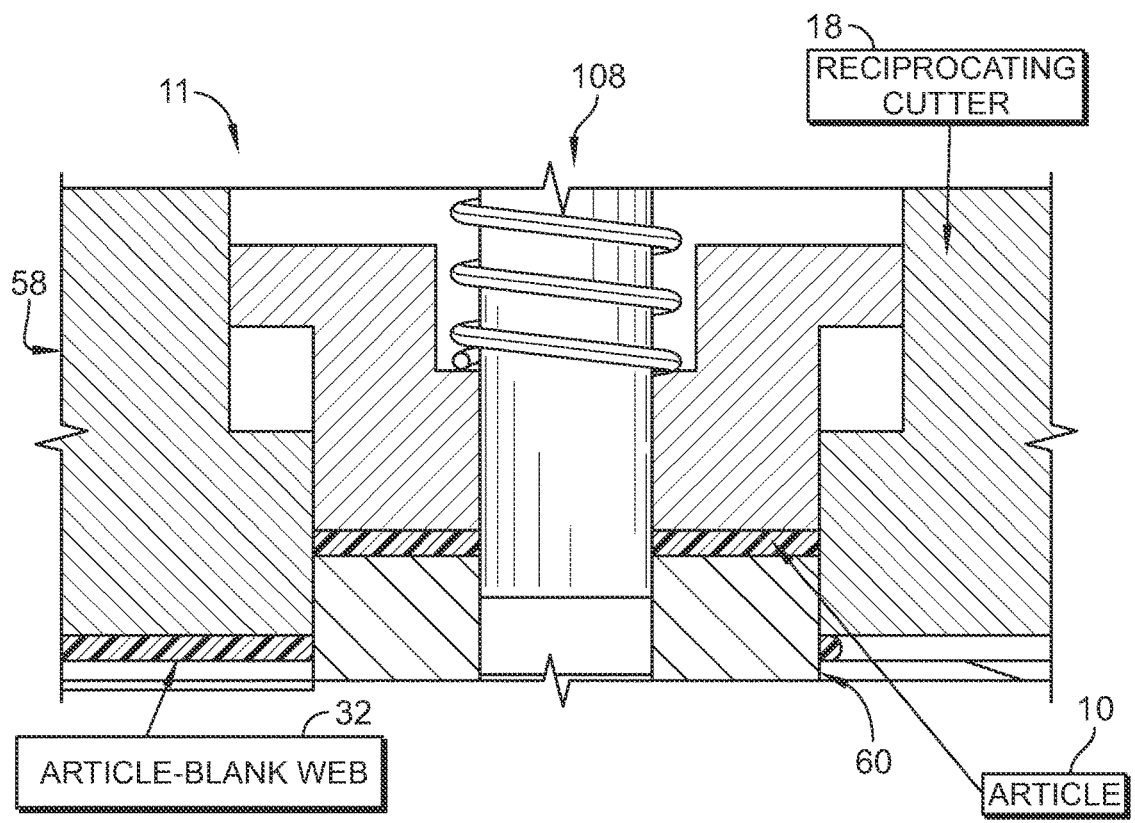
FIG. 20 is a perspective and diagrammatic view of the cutting stage of FIG. 19 showing that the upper-press die and the lower-press die included in the reciprocating cutter move relative to one another to cut the article-blank web and provide one or more articles and suggesting that movement of the article-blank web is temporarily stopped while the article-blank web is being cut.

In some embodiments, cutting stage 108 includes reciprocating cutter 18 as shown in FIGS. 19 and 20. Article-blank web 32 is moved between an upper-press die 58 and a lower-press die 60 included in reciprocating cutter 18.

Upper-press die 58 and lower-press die 60 are moved toward one another and crush cut article-blank web 32 to provide article 10. During the cutting, movement of article-blank web 32 is temporarily stopped while upper-press die 58 and the lower-press die 60 move relative to one another. Portions of article-blank web 32 may be cut from the continuously formed web 32 into panels before cutting stage 108 for cutting using reciprocating cutter 18 because of the start and stop characteristics of reciprocating cutter 18.

In some embodiments, articles 10 are lids 210 that are cut using reciprocating cutter 18. Sheet 30 may have a thickness (sometimes called the gauge of the sheet) of about twelve thousandths of an inch or greater when using reciprocating cutter 18.

Figure 21:
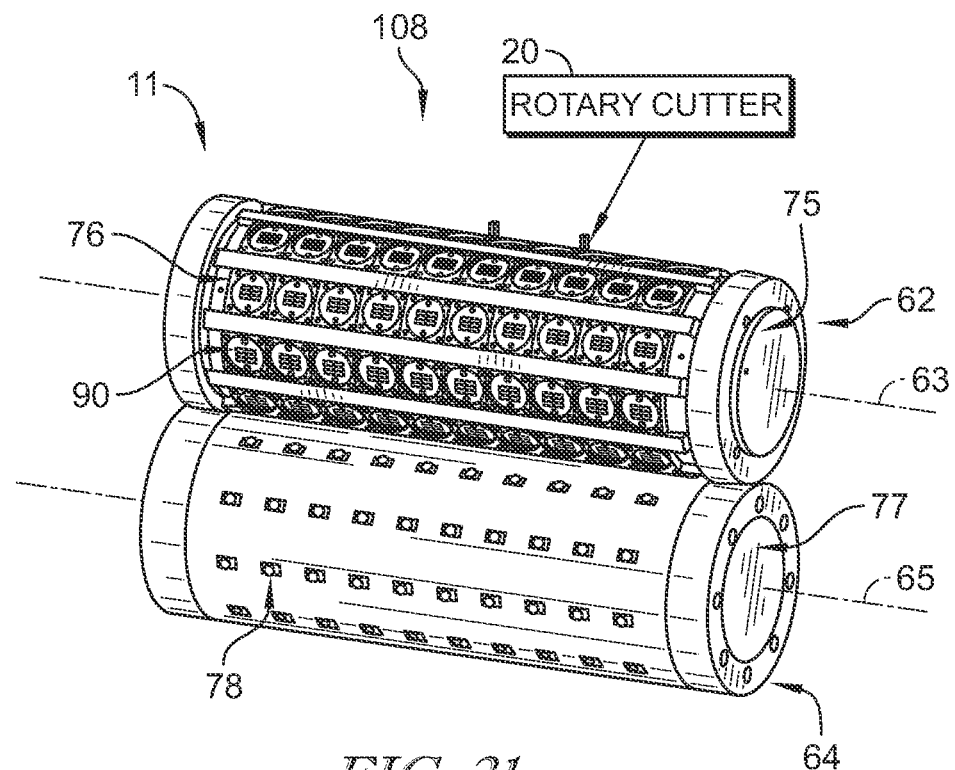
FIG. 21 is a perspective and diagrammatic view of another embodiment of the cutting stage of the article-manufacturing process of FIG. 3 showing that in some embodiments, the article-blank web is moved between an upper-rotor die and a lower-rotor die included in a rotary cutter that cuts the article-blank web to provide one or more articles and suggesting that the article-blank web is moved continuously through the rotary cutter during the cutting stage.
Figure 22:
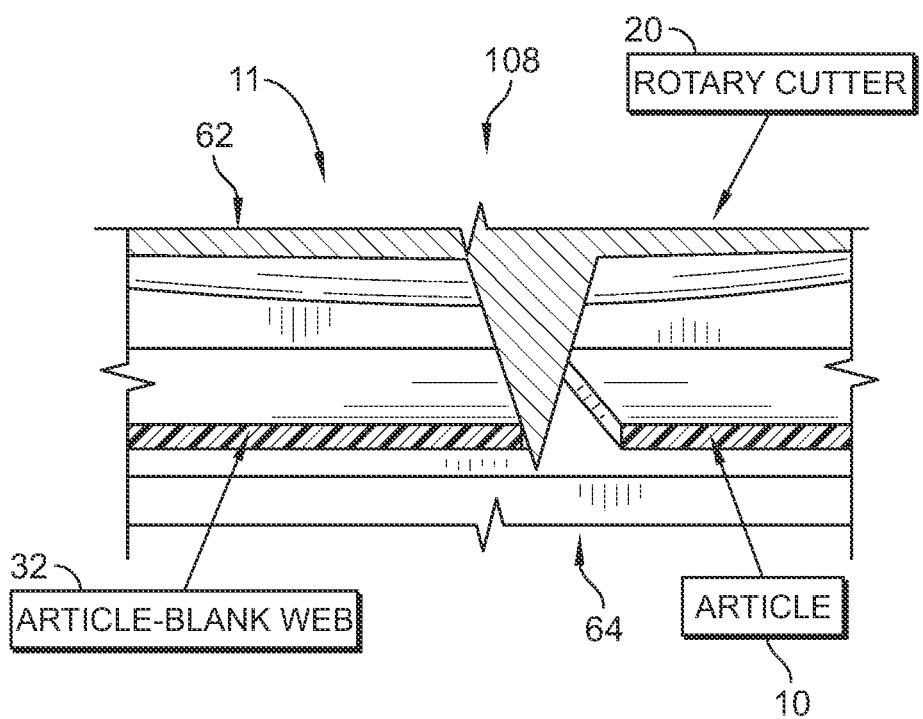
FIG. 22 is a perspective and diagrammatic view of the cutting stage of in FIG. 21 showing that the upper-rotor die and the lower-rotor die included in the rotary cutter rotate relative to each other to cut the article-blank web and provide the one or more articles and suggesting that movement of the article-blank web is continuous while the article-blank web is being cut.

In some embodiments, cutting stage 108 includes rotary cutter 20 as shown in FIGS. 21 and 22. Article-blank web 32 is moved between an upper-rotor die 62 and a lower-rotor die 64 included in rotary cutter 20. Upper-rotor die 62 and lower-rotor die 64 each rotate about a corresponding rotation axis 63, 65 relative to one another. Article-blank web 32 is moved continuously through rotary cutter 20 during the cutting stage.

Upper-rotor die 62 includes a rotor 75 and a plurality of upper dies 76 coupled with rotor 75 for movement therewith as shown in FIG. 21. The plurality of upper dies 76 are arranged in axially extending columns and the columns are spaced apart circumferentially around rotor 75. Each upper die 76 is formed to include an article-receiver aperture 90 shaped to receive article 10. Edges of each upper die 76 are arranged to cut a perimeter and other desired features of article blanks 38.

Each upper die 76 is individually movable axially, radially via shims for example, and/or circumferentially relative to rotor 75. Each column of upper dies 76 may be movable axially, radially, and/or circumferentially relative to rotor 75 to adjust a position of upper dies 76. Illustratively, upper dies 76 and columns of upper dies 76 are slidable relative to rotor 75. Each upper die 76 and column of upper dies 76 are fixed in selected positions with fasteners, clamps, or any other suitable alternative method. Each individual upper die 76 and column of upper dies 76 are fixed in their selected positions before manufacturing process 100 begins and remain fixed in their selected positions during manufacturing process 100.

Lower-rotor die 64 includes a rotor 77 and a plurality of lower dies 78 coupled with rotor 77 for movement therewith as shown in FIG. 21. The plurality of lower dies 78 are arranged in axially extending columns and the columns are spaced apart circumferentially around rotor 77. Edges of each lower die 78 are arranged to cut a desired feature of article blanks 38 such as a straw slot 88 for example.

Each lower die 78 is individually movable axially, radially, and/or circumferentially relative to rotor 77. Each column of lower dies 78 may be movable axially, radially, and/or circumferentially relative to rotor 77 to adjust a position of lower dies 78. Illustratively, lower dies 78 and columns of lower dies 78 are slidable relative to rotor 75. Each lower die 78 and column of lower dies 78 are fixed in selected positions with fasteners, clamps, or any other suitable alternative method. Each individual lower die 78 and column of lower dies 78 are fixed in their selected positions before manufacturing process 100 begins and remain fixed in their selected positions during manufacturing process 100.

A rotational speed of upper-rotor die 62 and/or lower-rotor die 64 may be adjusted during cutting stage 108 in real time so that dies 66, 88 are more accurately aligned with each axial column of article blanks 38 when cutting the axial column of article blanks 38 as suggested in FIGS. 4 and 21. In some embodiments, a sensor 92 detects a position of article blanks 38 upstream of rotary cutter 20 as suggested in FIG. 4. The rotational speed of upper-rotor die 62 and/or lower-rotor die 64 are adjusted based on the sensed position of article blanks 38 so that dies 76, 78 align with and cut article blanks 38 more accurately when the sensed article blanks 38 are received by rotary cutter 20. The upper rotor die 62 and the lower rotor die 64 are geared together in the illustrative embodiment and rotate at the same speed. In some embodiments, dies 62, 64 rotate at a fixed speed to match a shrinkage rate of sheet 30.

Sensor 92 may be configured to detect the position of multiple article blanks 38, for example, when splitter 25 is used to split article-blank web 32 into several strips. In some embodiments, the transverse position of article-blank web 32 or strips 47 of article-blank web 32 may be adjusted as they are fed to rotary cutter 20 to more accurately position article blanks 38 relative to dies 76, 78 included in rotary cutter 20. Sensor 92 is illustratively sends a light beam horizontally toward sheet 30 and captures portions of the beam reflected to sensor 92. Sensor 92 may detect a locating feature included with sheet 30 and the measurement of the location of the feature relative to the dies 62, 64 is used to vary the rotational speed of the dies 62, 64. Multiple sensors 92 may be used if sheet 30 is split at splitting stage 107.

In some embodiments, mechanical locating features such as a tread of molds are used to locate article blanks 38 relative to dies 76, 78. In some embodiments, sheet 30 is moved relative to dies 62, 64. In some embodiments, articles 10 are measured after cutting stage 108 and the rotational speed of dies 76, 78 is adjusted based on the measured articles.

In some embodiments, articles 10 are lids 210 and are cut using rotary cutter 20. In such embodiments using rotary cutter 20, sheet 30 may have an average thickness of between about one and about fifty-five thousandths of an inch. In some embodiments, sheet 30 has an average thickness of between about one and about nine thousandths of an inch when rotary cutter 20 is used for the cutting stage. In some embodiments, sheet 30 has an average thickness of about six thousandths of an inch when rotary cutter 20 is used for the cutting stage. In some embodiments, sheet 30 has an average thickness of about nine thousandths of an inch when rotary cutter 20 is used for the cutting stage. In some embodiments, sheet 30 has an average thickness of between about eight and about nine thousandths of an inch when rotary cutter 20 is used for the cutting stage. In some embodiments, sheet 30 has an average thickness of between about six and about ten thousandths of an inch when rotary cutter 20 is used for the cutting stage. In some embodiments, sheet 30 has an average thickness of between about eight and about twelve thousandths of an inch when rotary cutter 20 is used for the cutting stage. In some embodiments, sheet 30 has an average thickness of about twelve thousandths of an inch when rotary cutter 20 is used for the cutting stage. In some embodiments, sheet 30 has an average thickness of less than about twelve thousandths of an inch when rotary cutter 20 is used for the cutting stage. In some embodiments, sheet 30 has an average thickness of about eleven thousandths of an inch when rotary cutter 20 is used for the cutting stage. In some embodiments, sheet 30 has thickness of about ten thousandths of an inch when rotary cutter 20 is used for the cutting stage. Other articles 10 such as, for example, trays, bowls, containers, etc. may be formed by sheet 30 having similar thicknesses when rotary cutter 20 is used for the cutting stage.

In some embodiments, rotary cutter 20 is maintained at about 70 degrees Fahrenheit. Using rotary cutter 20 with rotary thermoformer 16 may allow for the production of articles 10 having a desired transparency and sheet thickness. As an example, rotary thermoformer 16 may allow for lids 210 with a desired transparency and rotary cutter 20 may allow for lids 210 to have an average thickness of between about six and about ten thousandths of an inch.

Sheet 30 has a width greater than about 30 inches in illustrative embodiment. In some embodiments, the width of sheet 30 is between about 30 inches and about 100 inches. In some embodiments, the width of sheet 30 is between about 30 inches and about 80 inches. In some embodiments, the width of sheet 30 is between about 50 inches and about 80 inches. In some embodiments, the width of sheet 30 is between about 50 inches and about 70 inches. In some embodiments, the width of sheet 30 is between about 50 inches and about 60 inches. In some embodiments, the width of sheet 30 is between about 55 inches and about 60 inches.

The present disclosure provides methods and apparatus for manufacturing continuously a plurality of articles 10 from a sheet having a width of greater than about 30 inches. Edge curl of sheet 30 increases at least as a function of the width of sheet 30. In conventional processes, the edge curl is too great for sheets having a width of 30 inches or greater. Shrinkage rate of sheet 30 is at least one factor that affects edge curl on the sheet. The shrinkage rate of a sheet is applied per inch width such that as the width of the sheet increases, the shrinkage of the sheet and, therefore, edge curl of the sheet increases. According to the present disclosure, curl-blocking strips 48 and optionally air blowers 80 minimize edge curl of sheet 30 and allow for sheet 30 to have a relatively large width. Splitter 25 and/or varying rotational speed of the cutter 20, and/or temperature of the rotor tool 44 and cooling air may minimize the effects of sheet 30 shrinking. In some embodiments, the edges of sheet 30 are separated from the web with or without using edge curl-blocking strips 48 after thermoforming and before cutting so that the curled edges are removed before sheet 30 is provided to cutter 18, 20.

The gram weight standard deviation for a given model of article 10 can indicate the consistency of the thickness of articles 10. Low variation in thickness between articles 10 of the same model may provide products with higher consistency. Process 100 is configured to produce transparent polypropylene articles on a rotary thermoformer with about equal or less standard deviation as compared to polypropylene articles i) formed on a flatbed thermoformer and ii) having greater thicknesses than polypropylene articles 10. A smaller thickness being desired for articles such as lids. Polymeric materials such as polypropylene formed on a flatbed thermoformer may be subject to forces that orient the material and make it more difficult to form articles from the material. Flatbed thermoforming such materials may have a limit on a thickness of the sheets because of the orienting result of the forces applied to the sheet. In contrast, those same materials may be used to form articles 10 having smaller wall thickness using rotary thermoformer 16.

Process 100 is configured to produce polypropylene articles 10 on a rotary thermoformer with about equivalent standard deviation as compared to polystyrene articles i) formed on a flatbed thermoformer and ii) having similar thickness to that of polypropylene articles 10. Process 100 is configured to produce polypropylene articles 10 on a rotary thermoformer with about equivalent to or less standard deviation as compared to polystyrene articles i) formed on a rotary thermoform and ii) having similar thickness to that of polypropylene articles 10.

The following gram weight standard deviations apply to articles 10 formed from outermost rows of blanks 38 in article-blank web 32 and may have the worst standard deviation of the article-blank web due to potential sheet shrinkage and/or edge curl. In some embodiments, the gram weight standard deviation of a plurality of articles 10 of the same model is between about 0.040 and about 0.180 using rotary thermoforming stage 106. In some embodiments, the gram weight standard deviation of articles 10 is between about 0.050 and about 0.170 using rotary thermoforming stage 106. In some embodiments, the gram weight standard deviation of articles 10 is between about 0.050 and 0.110 using rotary thermoforming stage 106. In some embodiments, the gram weight standard deviation of articles 10 is between about 0.085 and 0.090 using rotary thermoforming stage 106. In some embodiments, the gram weight standard deviation of articles 10 is between about 0.050 and 0.080 using rotary thermoforming stage 106. In some embodiments, the gram weight standard deviation of articles 10 is between about 0.050 and 0.090 using rotary thermoforming stage 106. In some embodiments, the gram weight standard deviation of articles 10 is between about 0.060 and 0.10 using rotary thermoforming stage 106. In some embodiments, the gram weight standard deviation of articles 10 is about 0.050 using rotary thermoforming stage 106. In some embodiments, the gram weight standard deviation of articles 10 is no greater than about 0.050 using rotary thermoforming stage 106. In some embodiments, the gram weight standard deviation of articles 10 is no greater than about 0.060 using rotary thermoforming stage 106. In some embodiments, the gram weight standard deviation of articles 10 is no greater than about 0.10 using rotary thermoforming stage 106. In some embodiments, the gram weight standard deviation of articles 10 is about 0.14 using rotary thermoforming stage 106.

The gram weight standard deviation of articles 10 is less than about 8 percent of the total gram weight of article 10 in some embodiments using rotary thermoforming stage 106. The gram weight standard deviation of articles 10 is less than about 4 percent of the total gram weight of article 10 in some embodiments using rotary thermoforming stage 106. The gram weight standard deviation of articles 10 is about or less than about 2 percent of the total gram weight of article 10 in some embodiments using rotary thermoforming stage 106. As one example, lid 210 has a target total gram weight of 2.5 grams and the standard deviation is about 0.050. The gram weight range of a plurality of articles 10 of the same model may be described in terms of a number of sigma. In one example, the range may be plus and minus three sigma or three standard deviations.

In one example, the polymeric material includes a polypropylene impact copolymer, walls of article 10 have a thickness of about 0.010 inches, article 10 is formed on a rotary thermoformer, and the standard deviation is about 0.10. In one example, the polymeric material includes a polypropylene impact copolymer, walls of article 10 have a thickness of about 0.012 inches, article 10 is formed on a rotary thermoformer, and the standard deviation is about 0.06.

In some embodiments, at least one of upper-rotor die 62 and lower-rotor die 64 includes the plurality of dies 76, 78 formed to include article-receiver apertures 90 as shown in FIG. 21. Article blanks 38 are moved into article-receiver apertures 90 which align article blanks 38 ahead of cutting. As a result, article blanks 38 may be more accurately cut to desired dimensional tolerances. In the illustrative embodiment, rotary cutter 20 further cuts an auxiliary cut 88 into article 10 at the same time as cutting article 10 from article blank 38 which may eliminate other cutting steps and machines. Auxiliary slot 88 is illustratively a straw slot formed in lid 210, but other auxiliary cuts are envisioned. In other embodiments, no auxiliary cut 88 is made in article 10.

Rotary cutter 20 dispenses cut articles 10 in a plurality of lines in some embodiments. Dispensing cut articles 10 in a line may help in inspecting, collecting, stacking, and bagging of cut articles 10.

Stacking stage 110 of article-manufacturing process 100 is optional and shown in FIGS. 23-26. Stacking stage 110 may be performed by manually stacking articles 10, pushing articles 10 into a stack, using a wheel stacker, or any other suitable alternative methods. As shown in FIGS. 23 and 24, stacking stage uses a pinch belt 71 and a star-wheel stacker 26 to stack articles 10 into a stack 66 of articles 10 in the illustrative embodiment. Illustratively, the articles 10 are lids 210 and are stacked using star-wheel stacker 26.

Star-wheel stacker 26 is mounted to rotate about a stacker axis and is formed to include a plurality of notches 27 that extend into star-wheel stacker 26 for receiving articles 10. Articles 10 are directed continuously into star-wheel stacker 26 which aligns each article 10 with a plurality of articles 10 to form stack 66 of articles 10. Pinch belts 71 may be used to provide streams of single rows of articles 10. The single rows of articles 10 may allow for better inspection of articles 10 and for diverting a single rejected article 10 or a row of rejected articles 10 out of process 100 and into a waste process.

Figure 26:
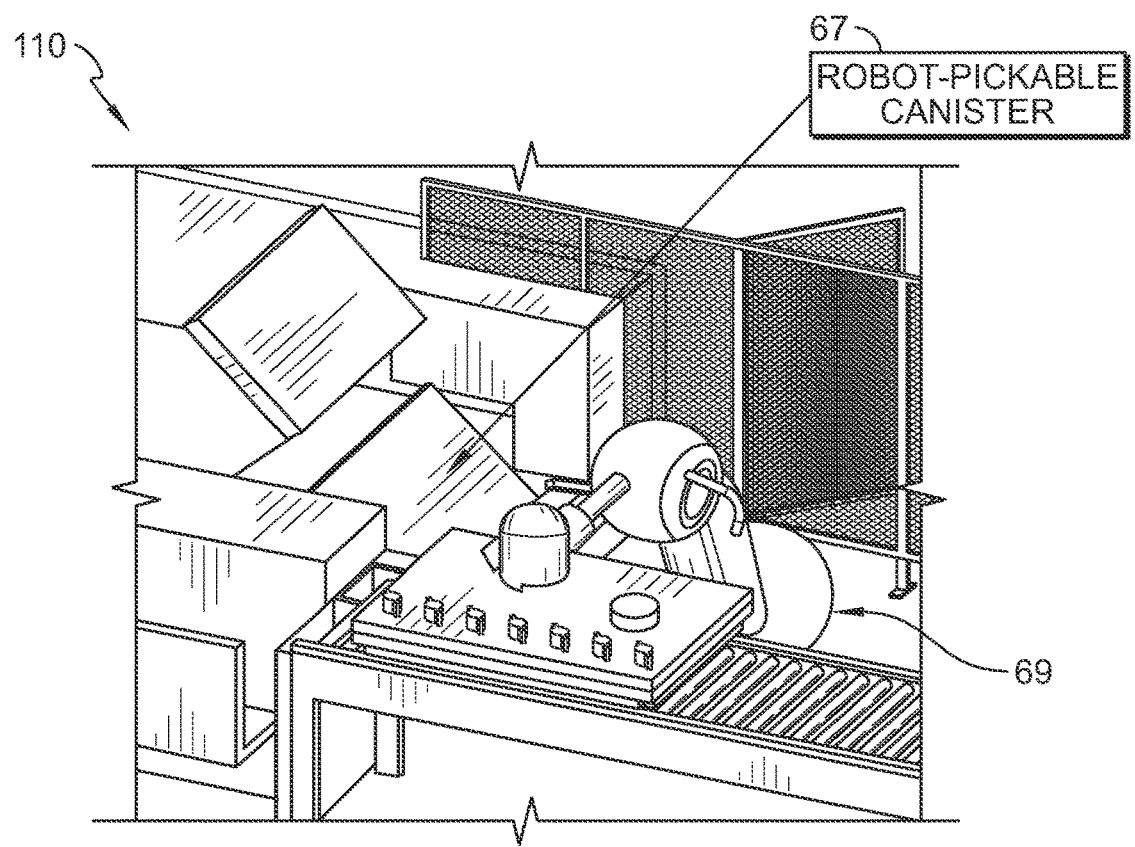
FIG. 26 is a perspective and diagrammatic view of the robot used in the stacking stage of the article-manufacturing process suggesting that the robot is configured to move the canisters of stacked articles to conveyer belt that moves the stacked articles to the bagging stage of the article-manufacturing process.

Stacking stage 110 further includes a canister 67 in some embodiments as shown in FIGS. 25 and 26. Canister 67 is arranged to receive a plurality of stacks 66 of articles 10. Canister 67 is configured to be pickable by a robot 69 during article-manufacturing process 100 as suggested in FIG. 26. Robot 69 is configured to move canisters 67 of stacked articles 10 to a conveyer belt that moves stacked articles 10 to an optional bagging stage 112. In bagging stage 112, articles 10 are bagged and transported and/or stored as suggested in FIG. 3.

Article 10 is a shallow draw article such as lid 10 in some embodiments. Shallow draw thermoformed articles 10 made using the article-manufacturing process 100 of the present disclosure may have a draw ratio of about 2.0 or less where the draw ratio is the height/diameter of article 10 (or height/width for non-round articles). In some embodiments, the draw ratio is between about 0.065 and about 2.0. In some embodiments, the draw ratio is between about 0.065 and about 0.11. In some embodiments, the draw ratio is between about 0.07 and about 0.1. In some embodiments, the draw ratio is between about 0.1 and about 0.6. In some embodiments, the draw ratio is about 2.05.

Shallow draw thermoformed articles 10 made using the article-manufacturing process 100 of the present disclosure may have a final height of up to about 5 inches. In other embodiments, articles 10 may have a final height greater than 5 inches depending on the draw ratio. In illustrative embodiments where article 10 is a drink cup lid 210, drink cup lid 210 has a height of between about 0.28 inches and about 0.33 inches. In other embodiments, shallow draw articles 10 may have a height of about 4.7 inches. In other embodiments, shallow draw articles 10 may have a height between about 0.7 inches and about 2.2 inches. In other embodiments, shallow draw articles 10 may have a height between about 0.3 inches and about 4.7 inches. In other embodiments, shallow draw articles 10 may have a height between about 1.0 inch and about 3.6 inches. In other embodiments, shallow draw articles 10 may have a height between about 0.3 inches and about 1 inch. In other embodiments, other thermoforming processes are used in place of shallow draw and the height may be greater than about 4.7 inches and the draw ratio is greater than about 2.

A method of making a thermoformed article may include a number of steps. The method may include extruding a sheet comprising polymeric materials, conditioning the sheet on a conditioning roller, rotary thermoforming the sheet to provide a web, and cutting the web to provide a thermoformed article. In some embodiments, the rotary thermoforming stage includes applying the sheet to a rotary thermoformer. The conditioning roller may have an outer surface having a surface roughness of between about 100 Ra (microinches) and about 240 Ra (microinches).

The rotary thermoformer includes a rotor mounted to rotate about a rotation axis of the rotary thermoformer and at least one article mold coupled to the rotor for rotation therewith. In some embodiments, the rotary thermoformer includes a curl-blocking strip including a plurality of protrusions that extend radially outward away from the rotor toward the sheet to engage and block the sheet from curling away from the rotor during the rotary thermoforming stage.

In illustrative embodiments, sheet 30 and, thus, thermoformed article 10 such as, for example, lid 210 is made with polymeric material. In some embodiments, the polymeric materials include one or more of polypropylene, ethylene, polyethylene, polylactic acid, polyactide, and polyethylene terephthalate. In some embodiments, polymeric materials include polystyrene. In some embodiments, polymeric materials include high impact polystyrene.

In some embodiments, sheet 30 and, thus, thermoformed article 10 is made from non-aromatic polymeric materials such that article 10 is free from polystyrene. In other words, article 10 is free from aromatic materials in some embodiments. As used herein, the term non-aromatic polymer refers to a polymer that is devoid of aromatic ring structures (e.g., phenyl groups) in its polymer chain. A non-aromatic polymeric material is a polymeric material free of aromatic polymers, styrenenic polymers, or polystyrene. In illustrative examples, the non-aromatic polymeric materials include polypropylene.

Aromatic molecules typically display enhanced hydrophobicity when compared to non-aromatic molecules. As a result, it would be expected that a polypropylene-based polymeric material instead of a polystyrene-based polymeric material would result in a change in hydrophobicity with a concomitant, but not necessarily predictable or desirable, change in surface adsorption properties of the resulting material. In addition, by virtue of the hydrocarbon chain in polystyrene, wherein alternating carbon centers are attached to phenyl groups, neighboring phenyl groups can engage in so-called pi-stacking, which is a mechanism contributing to the high intramolecular strength of polystyrene and other aromatic polymers. No similar mechanism is available for non-aromatic polymers such as polypropylene. Moreover, notwithstanding similar chemical reactivity and chemical resistance properties of polystyrene and polypropylene, polystyrene can be either thermosetting or thermoplastic when manufactured whereas polypropylene is exclusively thermoplastic. As a result, to the extent that surface adsorption properties, manufacturing options, and strength properties similar to those of polystyrene are sought, likely alternatives to polystyrene-based polymeric materials would be found in another aromatic polymer rather than in a non-aromatic polymer.

The use of non-aromatic materials may affect recyclability, insulation, microwavability, impact resistance, or other properties. At least one potential feature of an article formed of non-aromatic polymeric material according to various aspects of the present disclosure is that the article can be recycled. Recyclable means that a material can be added (such as regrind) back into an extrusion or other formation process without segregation of components of the material, i.e., an article formed of the material does not have to be manipulated to remove one or more materials or components prior to re-entering the extrusion process. In contrast, a polystyrene article may not be recyclable. In one example, an article made from non-aromatic or styrene-free materials may simplify recycling.

In illustrative embodiments, article 10 is transparent. Outer surface 42 of conditioning roller 14 is textured to have a surface roughness value that provides a desired control of sheet 30 and transparency and surface finish of article 10. In accordance with the present disclosure, the term transparent incorporates a range of transparency values including translucent to fully transparent values. Furthermore, the term transparent encompasses transmittance, wide angle scattering (sometimes referred to as haze), narrow angle scattering (sometimes referred to as clarity or see-through quality), and any other factor affecting the ability to see through article 10. In other embodiments, article 10 is not transparent.

Figure 27:
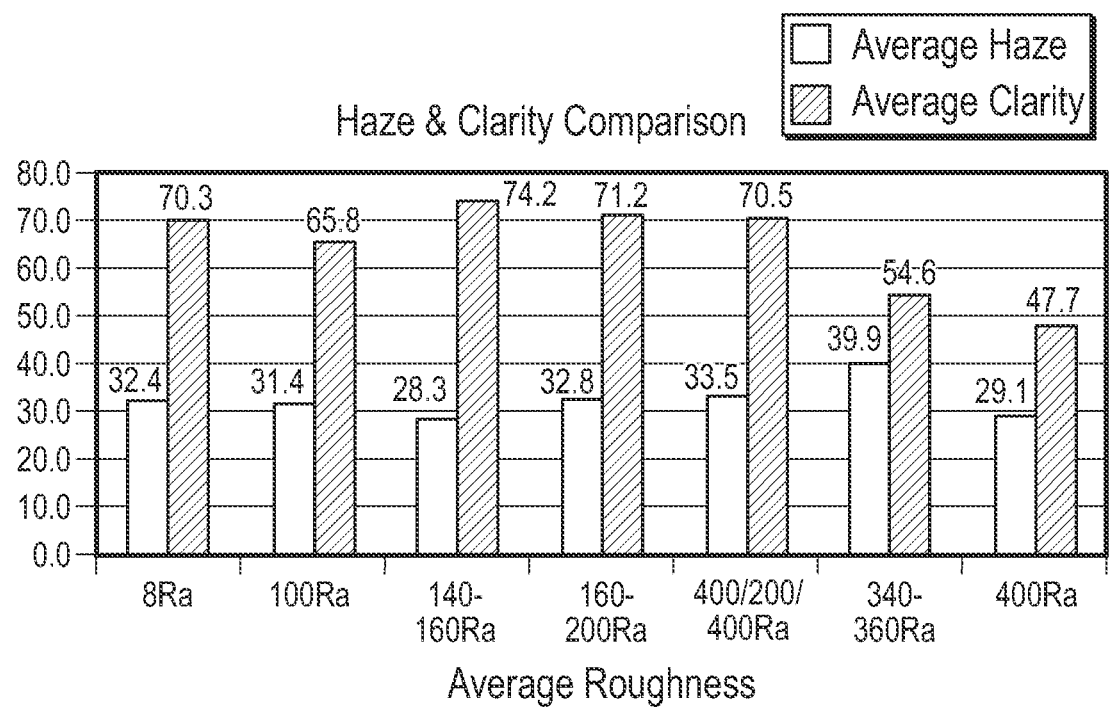
FIG. 27 is a view of a chart showing haze and clarity values of articles formed with the article-manufacturing process using different conditioning roller surface textures.

Illustratively, article 10 is lid 210 that is transparent to allow a consumer to view contents of interior liquid-storage region of cup on which lid 210 is mated through article 10. Lid 210 is transparent and made of non-aromatic polymeric materials. The transparency may be defined by clarity and haze values and examples of clarity and haze values for articles 10 formed using conditioning rollers 14 having different outer surface 42 texture roughness are shown in FIG. 27. Articles 10 having a desired transparency may be formed using roller 14 having outer surface 42 with a surface roughness of less than about 400 Ra. In illustrative embodiments, articles 10 having a desired transparency are formed using roller 14 having outer surface 42 with surface roughness of between about 100 Ra and about 240 Ra.

The clarity of article 10 as discussed herein is measured using ASTM D 1746 which is hereby incorporated by reference herein in its entirety. In some examples, the clarity of article 10 is in a range of about 0% to about 100%. In some examples, the clarity of article 10 is in a range of about 10% to about 99%. In some examples, the clarity of article 10 is in a range of about 20% to about 100%. In some examples, the clarity of article 10 is in a range of about 30% to about 100%. In some examples, the clarity of article 10 is in a range of about 40% to about 100%. In some examples, the clarity of article 10 is in a range of about 50% to about 100%. In some examples, the clarity of article 10 is in a range of about 60% to about 100%. In some examples, the clarity of article 10 is in a range of about 70% to about 100%. In some examples, the clarity of article 10 is in a range of about 80% to about 100%. In some examples, the clarity of article 10 is in a range of about 90% to about 100%.

In some examples, the clarity of article 10 is in a range of about 40% to about 95%. In some examples, the clarity of article 10 is in a range of about 50% to about 95%. In some embodiments, the clarity of article 10 is in a range of about 55% to about 95%. In some embodiments, the clarity of article 10 is in a range of about 60% to about 95%. In some embodiments, the clarity of article 10 is in a range of about 55% to about 65%. In some embodiments, the clarity of article 10 is in a range of about 65% to about 75%. In some embodiments, the clarity of article 10 is in a range of about 70% to about 95%. In some embodiments, the clarity of article 10 is in a range of about 70% to about 90%. In some embodiments, the clarity of article 10 is in a range of about 70% to about 85%. In some embodiments, the clarity of article 10 is in a range of about 70% to about 80%. In some embodiments, the clarity of article 10 is in a range of about 65% to about 85%.

In illustrative embodiments, the clarity of article 10 is greater than about 70%. In some embodiments, the clarity of article 10 is greater than about 60%. In some embodiments, the clarity of article 10 is greater than about 65%. In some embodiments, the clarity of article 10 is greater than about 75%.

In some examples, the clarity of article 10 is about 56.2%. In some examples, the clarity of article 10 is about 58.5%. In some examples, the clarity of article 10 is about 63.7%. In some examples, the clarity of article 10 is about 60.2%. In some examples, the clarity of article 10 is about 70.2%. In some examples, the clarity of article 10 is about 80.9%. In some examples, the clarity of article 10 is about 94.8%. In some examples, the clarity of article 10 is about 74.2%. In some examples, the clarity of article 10 is about 71.2%. In some examples, the clarity of article 10 is about 70.3%. In some examples, the clarity of article 10 is about 65.8%. In some examples, the clarity of article 10 is about 63.2%. In some examples, the clarity of article 10 is about 54.6%. In some examples, the clarity of article 10 is about 47.7%.

The haze of article 10 as discussed herein is measured using ASTM D 1003 procedure B which is hereby incorporated by reference herein in its entirety. In some examples, the haze of article 10 is in a range of about 0% to about 60%. In some examples, the haze of article 10 is in a range of about 10% to about 60%. In some examples, the haze of article 10 is in a range of about 0% to about 70%. In some examples, the haze of article 10 is in a range of about 0% to about 80%. In some examples, the haze of article 10 is in a range of about 0% to about 90%. In some examples, the haze of article 10 is in a range of about 0% to about 100%.

In some examples, the haze of article 10 is in a range of about 10% to about 40%. In some examples, the haze of article 10 is in a range of about 20% to about 38%. In some examples, the haze of article 10 is in a range of about 20% to about 40%. In some examples, the haze of article 10 is in a range of about 30% to about 40%. In some examples, the haze of article 10 is in a range of about 14% to about 25%. In some examples, the haze of article 10 is in a range of about 0% to about 30%. In some examples, the haze of article 10 is in a range of about 10% to about 30%. In some examples, the haze of article 10 is in a range of about 20% to about 28%. In some examples, the haze of article 10 is less than about 60%. In some examples, the haze of article 10 is less than about 50%. In some examples, the haze of article 10 is less than about 40%. In some examples, the haze of article 10 is less than about 30%.

In illustrative embodiments, the haze of article 10 is less than about 30%. In some embodiments, the haze of article 10 is less than about 29%. In illustrative embodiments, the haze of article 10 is less than about 28%. In illustrative embodiments, the haze of article 10 is less than about 40%.

In some examples, the haze of article 10 is about 36.9%. In some examples, the haze of article 10 is about 23.0%. In some examples, the haze of article 10 is about 21.5%. In some examples, the haze of article 10 is about 20.2%. In some examples, the haze of article 10 is about 23.5%. In some examples, the haze of article 10 is about 18.8%. In some examples, the haze of article 10 is about 14.1%. In some examples, the haze of article 10 is about 28.3%. In some examples, the haze of article 10 is about 31.4%. In some examples, the haze of article 10 is about 32.4%. In some examples, the haze of article 10 is about 32.8%. In some examples, the haze of article 10 is about 39.9%. In some examples, the haze of article 10 is about 29.1%.

In some examples, the clarity of article 10 is greater than about 70% and the haze is less than about 30%. In some examples, the clarity of article 10 is about 74.2% and the haze is about 28.3%. In some examples, the clarity of article 10 is about 71.2% and the haze is about 32.8%. In some examples, the clarity of article 10 is about 63.2% and the haze is about 32.8%.

When forming transparent articles 10, the average haze and the average clarity of articles 10 may be varied at least by varying the surface roughness of outer surface 42 of roller 14. Table 1 shown below provides characteristics of a number of example transparent articles 10 formed using conditioning rollers 14 with different average surface roughness values on the portion of the outer surface 42 that aligns with molds 46.

and about 30 Ra (microinches) in some embodiments. Article 10 is transparent and has a surface roughness of between about 10 Ra (microinches) and about 20 Ra (microinches) in some embodiments. Illustratively, article 10 has a surface roughness of between about 13 Ra (microinches) and about 16 Ra (microinches) in some embodiments. Article 10 has a surface roughness of about 13.6 Ra (microinches) in some embodiments. Article 10 has a surface roughness of about 13 Ra (microinches) in some embodiments. Article 10 has a surface roughness of about 15.6 Ra (microinches) in some embodiments. Article 10 has a surface roughness of about 15 Ra (microinches) in some embodiments. Article 10 has a surface roughness of about 14.8 Ra (microinches) in some embodiments.

Outer surface 42 of conditioning roller 14 has a surface roughness at least 2 times greater than the surface roughness of article 10 in some embodiments. Outer surface 42 of conditioning roller 14 has a surface roughness at least 3 times greater than the surface roughness of article 10 in some embodiments. Outer surface 42 of conditioning roller 14 has a surface roughness at least 4 times greater than the surface roughness of article 10 in some embodiments. Outer surface 42 of conditioning roller 14 has a surface roughness

TABLE 1

Example Article Data Summary

|  | Example 1 | Example 2 | Example 3 | Example 4 | Example 5 | Example 6 | Example 7 |
|---|---|---|---|---|---|---|---|
| Average Roughness (microinches) | 8Ra | 100Ra | 140-160Ra | 160-200Ra | 400/200/400Ra | 340-360Ra | 400Ra |
| Average Haze | 32.4 | 31.4 | 28.3 | 32.8 | 33.5 | 39.9 | 29.1 |
| Average Clarity | 70.3 | 65.8 | 74.2 | 71.2 | 70.5 | 54.6 | 47.7 |
| Average Sheet Gauge (inches) | 0.010 | 0.0120 | 0.012 | 0.011 | 0.012 | 0.011 | 0.008 |
| Gram Weight Standard Deviation (grams) | 0.170 | 0.090 | 0.085 | 0.110 | 0.050 | N/A | N/A |
| Gram Weight Range (+/−3σ) | 1.020 | 0.540 | 0.510 | 0.660 | 0.300 | N/A | N/A |

The surface roughness of conditioning roller 14 is greater than typical smooth rollers 14 to provide greater control of sheet 30 as opposed to providing a surface roughness or texture to article 10. Greater controller of sheet 30 may be desired for forming transparent and/or polypropylene sheets or sheets of polymeric material having a higher shrinkage rate such as a shrinkage rate of about or greater than about 0.007 inches per inch. Molds 46 on thermoformer 16 contact sheet 30 after roller 14 and, as a result, molds 46 may have a greater impact on surface roughness of article 10 than roller 14. The surface roughness of roller 14 may be increased in response to increasing a line speed of process 100. Increasing the surface roughness of roller 14 in such situations may not affect the surface roughness of articles 10.

Article 10 is transparent and has a surface roughness that is less than a surface roughness of outer surface 42. Article 10 is transparent and has a surface roughness of between about 5 Ra (microinches) and about 40 Ra (microinches) in some embodiments. Article 10 is transparent and has a surface roughness of between about 10 Ra (microinches)

at least 5 times greater than the surface roughness of article 10 in some embodiments. Outer surface 42 of conditioning roller 14 has a surface roughness at least 8 times greater than the surface roughness of article 10 in some embodiments. Outer surface 42 of conditioning roller 14 has a surface roughness at least 10 times greater than the surface roughness of article 10 in some embodiments. Outer surface 42 of conditioning roller 14 has a surface roughness at least 12 times greater than the surface roughness of article 10 in some embodiments. Outer surface 42 of conditioning roller 14 has a surface roughness at least 13 times greater than the surface roughness of article 10 in some embodiments. Outer surface 42 of conditioning roller 14 has a surface roughness at least 15 times greater than the surface roughness of article 10 in some embodiments. Outer surface 42 of conditioning roller 14 has a surface roughness at least 20 times greater than the surface roughness of article 10 in some embodiments. Outer surface 42 of conditioning roller 14 has a surface roughness at least 25 times greater than the surface roughness of article 10 in some embodiments. Outer surface 42 of conditioning roller 14 has a surface roughness at least 13 times greater than the surface roughness of article 10 in some embodiments.

Outer surface 42 of conditioning roller 14 has a surface roughness of between about 2 and 5 times greater than the surface roughness of article 10 in some embodiments. Outer surface 42 of conditioning roller 14 has a surface roughness of between about 2 and 30 times greater than the surface roughness of article 10 in some embodiments. Outer surface 42 of conditioning roller 14 has a surface roughness of between about 10 and 25 times greater than the surface roughness of article 10 in some embodiments. Outer surface 42 of conditioning roller 14 has a surface roughness of between about 5 and 10 times greater than the surface roughness of article 10 in some embodiments. Outer surface 42 of conditioning roller 14 has a surface roughness of between about 5 and 15 times greater than the surface roughness of article 10 in some embodiments. Outer surface 42 of conditioning roller 14 has a surface roughness of between about 10 and 25 times greater than the surface roughness of article 10 in some embodiments. Outer surface 42 of conditioning roller 14 has a surface roughness of between about 10 and 20 times greater than the surface roughness of article 10 in some embodiments. Outer surface 42 of conditioning roller 14 has a surface roughness of between about 20 and 30 times greater than the surface roughness of article 10 in some embodiments.

In one example, sheet 30 comprises 40% or more by weight of sheet 30 polypropylene, outer surface 42 of roller 14 has a surface roughness of between about 100 Ra (microinches) and about 200 Ra (microinches), and article 10 is produced having a surface roughness of between about 10 Ra (microinches) and about 20 Ra (microinches). In another example, sheet 30 comprises 40% or more by weight of sheet 30 polypropylene, outer surface 42 of roller 14 has a surface roughness of between about 160 Ra (microinches), and about 200 Ra (microinches) and article 10 has a surface roughness of between about 13 Ra (microinches) and about 16 Ra (microinches).

Illustratively article 10 is lid 210 which includes a ring-shaped brim mount 82, a central closure 84, and a plurality of deformable product-identification domes 86 as shown, for example, in FIG. 2. Reference is hereby made to U.S. application Ser. No. 15/946,023, filed Apr. 5, 2018 and titled DRINK CUP LID for disclosure relating to lids in accordance with the present disclosure, which is hereby incorporated by reference in its entirety herein.

Brim mount 82 is configured to mount with a brim included in a container. Central closure 84 is appended to brim mount 82 and adapted to block access into an interior liquid-storage region of the container. Product-identification domes 86 append from central closure 84 and are configured to move from an un-deformed arrangement to a deformed arrangement to indicate visually a selected flavor of a liquid beverage stored in the container. In some embodiments, deformable product-identification domes 86 are omitted from lid 210.

In some embodiments, each product-identification dome 86 is less transparent in the deformed arrangement than the un-deformed arrangement to indicate visually a selected flavor of a liquid beverage stored in an interior liquid-storage region of a cup. In some embodiments, each product-identification dome 86 is relatively opaque (sometimes referred to as craze or whitening) in the deformed arrangement as compared to the un-deformed arrangement to indicate visually a selected flavor of a liquid beverage stored in an interior liquid-storage region of a cup. In some embodiments, each product-identification dome 86 has portions that are transparent and portions that become relatively opaque (crazed or whitened) in the deformed arrangement as compared to having all portions being relatively transparent in the un-deformed arrangement to indicate visually a selected flavor of a liquid beverage stored in an interior liquid-storage region of a cup. A consumer may be able to see through product-identification domes 86 when product-identification domes 86 are in the un-deformed arrangement and the deformed arrangement.

Product-identification domes 86 share the clarity and haze values of article 10 when product-identification domes 86 are in the first arrangement. In other words, product-identification domes 86 share the clarity and haze values of article 10 before product-identification domes 86 are depressed downward.

Article 10 is made, for example, by thermoforming sheet 30 in an article-manufacturing process in accordance with the illustrative embodiments of the present disclosure. In some embodiments, sheet 30 is a single-layer sheet that comprises a polymeric mixture. In other embodiments, sheet 30 is a multi-layer sheet. In one aspect, the polymeric mixture may be formed through an extrusion process of a formulation. In some embodiments, article 10 is made from a polymeric non-aromatic sheet of material having a formulation.

Illustratively, the formulation for forming sheet 30 may be added to a hopper on an extrusion machine and heated to produce a molten material in an extruder. The molten material may be extruded to produce the single-layer sheet 30. In some embodiments, the single-layer sheet 30 has a density between 0.8 g/cm$^3$ and 1.1 g/cm$^3$. In some embodiments, the single-layer sheet has a density of about 0.902 g/cm$^3$. In some embodiments, the single-layer sheet has a density of about 0.9 g/cm$^3$.

The polymeric mixture of sheet 30 may comprise, for example, a plastic polymer, a material, or a resin, and may optionally include one or more additives. Examples of plastic polymers, resins, or materials suitable for single-layer sheet 30 include high density polyethylene (HDPE), low density polyethylene (LDPE), polypropylene (PP), and copolymers of any combination of ethylene, propylene, butylene, and any other suitable alpha-olefin. In some aspects, the plastic polymer, material, or resin may be called a base resin.

In one aspect, the polypropylene may be a polypropylene homopolymer, a polypropylene copolymer, a polypropylene impact copolymer, or combinations thereof. In some embodiments, the polypropylene may contain an additive. In some aspects, the polypropylene copolymer is a random copolymer.

In some examples, sheet 30 comprises a polymeric mixture comprising a first polypropylene and a second polypropylene. In some examples, the first polypropylene may be a homopolymer. In some examples, the second polypropylene may be a polypropylene impact copolymer. In some examples, sheet 30 comprises a first polypropylene, a second polypropylene, and a polypropylene random copolymer.

In some examples, the polypropylene homopolymer may be a high crystallinity homopolymer. In some examples, the polypropylene homopolymer may comprise a nucleating agent. In some examples, the polypropylene homopolymer is Braskem INSPIRE™ 6025N.

In some examples, a polypropylene impact copolymer comprises a copolymer of ethylene and propylene. In some examples, a polypropylene impact copolymer is a heterophasic in-situ blend comprising an ethylene/propylene rubber (EPR) component. In some examples, a polypropylene impact copolymer is a heterophasic in-situ blend comprising an ethylene/propylene rubber (EPR) component distributed inside a semi-crystalline polypropylene homopolymer matrix. Illustratively, a polypropylene impact copolymer comprises a rubber phase and a polypropylene matrix phase. In some examples, a polypropylene impact copolymer may be produced with a Ziegler Natta catalyst. In some examples, a polypropylene impact copolymer is a semi-crystalline thermoplastic resin. In some examples, the polypropylene impact copolymer contains a nucleating agent. In some examples, the polypropylene impact copolymer is LyondellBasell Pro-fax™ SC204.

In some embodiments, sheet 30 has a rubber content up to about 50% by weight of sheet. In some embodiments, sheet 30 comprises at least 0.05%, 1%, 2%, 3%, 4%, 5%, 6%, 7%, 8%, 9%, 10%, 12%, 14%, 16%, 18%, 20%, 25%, 30%, 35%, or 40% by weight rubber. In some embodiments, the rubber content of sheet 30 can be selected from a first series of ranges of about 0.5% to about 50%, about 0.5% to about 40%, about 0.5% to about 30%, about 0.5% to about 20%, about 0.5% to about 18%, about 0.5% to about 16%, about 0.5% to about 10%, or about 0.5% to about 5% by weight of the single-layer sheet. In some embodiments, the rubber content of sheet 30 can be selected from a second series of ranges of about 0.5% to about 20%, about 1% to about 20%, about 2% to about 20%, about 2.5% to about 20%, about 2.5% to about 20%, about 3% to about 20%, about 3.5% to about 20%, about 4% to about 20%, about 4.5% to about 20%, about 5% to about 20%, about 6% to about 20%, or about 7% to about 20% by weight of sheet 30. In some embodiments, the rubber content of sheet 30 can be selected from a third series of ranges of about 0.5% to about 20%, about 1% to about 20%, about 1.5% to about 20%, about 2% to about 20%, about 2% to about 15%, about 2% to about 10%, about 2% to about 8%, or about 2% to about 5% by weight of the single-layer sheet. In some examples, the rubber content is about 0.5%, about 1%, about 1.5%, about 2%, about 2.5%, about 3%, about 3.5% about 4%, about 4.5% about 5%, about 6%, about 7%, about 7.5%, about 8%, about 8.5%, about 9%, about 9.5%, about 10%, about 12%, about 14%, about 16%, about 18%, about 20%, about 25%, about 30%, about 35%, about 40%, about 45%, or about 50% by weight of sheet 30.

In some examples, sheet 30 comprises a polymeric mixture comprising a base resin and a secondary resin. Illustratively, sheet 30 may comprise up to 99% base resin. In some examples, sheet 30 may comprise up to 99% secondary resin. Sheet 30 may comprise an amount of base resin selected from a range of about 5% to about 95%, about 10% to about 95%, about 10% to about 85%, about 20% to about 85%, about 20% to about 75%, about 30% to about 75%, about 40% to about 75%, or about 40% to about 60% by weight of sheet. In some embodiments, sheet 30 may comprise an amount of base resin selected from a range of about 15% to about 75%, about 15% to about 65%, about 15% to about 50%, about 20% to about 50%, or about 25% to about 45% by weight of sheet. sheet 30 may comprise an amount of base resin of about 5%, about 10%, about 15%, about 20%, about 25%, about 30%, about 35%, about 40%, about 45%, about 48%, about 49%, about 50%, about 51%, about 52%, about 55%, about 60%, about 65%, about 70%, about 80%, or about 95% by weight of sheet. Sheet 30 may comprise an amount of secondary resin selected from a range of about 5% to about 95%, about 10% to about 95%, about 10% to about 85%, about 20% to about 85%, about 20% to about 75%, about 25% to about 70%, about 30% to about 75%, about 40% to about 75%, about 45% to about 65%, or about 40% to about 60% by weight of sheet. Sheet 30 may comprise an amount of secondary resin of about 5%, about 10%, about 15%, about 20%, about 25%, about 30%, about 35%, about 40%, about 45%, about 48%, about 49%, about 50%, about 51%, about 52%, about 55%, about 60%, about 65%, about 70%, about 80%, or about 95% by weight of sheet. In some examples, sheet 30 comprises about 50% base resin and about 50% secondary resin. In some examples, sheet 30 comprises about 50% base resin and about 49% secondary resin. In some examples, the single-layer sheet comprises about 35% base resin and about 55% secondary resin. In some embodiments, the base resin is a polypropylene. In some embodiments, the secondary resin is a polypropylene. In some examples both the base resin and the secondary resin are a polypropylene. In some embodiments, the base resin is a polypropylene homopolymer. In some examples, the secondary resin is a polypropylene impact copolymer. In some embodiments, the base resin is a polypropylene impact copolymer. In some embodiments, the secondary resin is a polypropylene homopolymer.

In some examples, sheet 30 comprises a polymeric mixture comprising a polypropylene homopolymer and a polypropylene impact copolymer. Illustratively, sheet 30 may comprise up to 99% polypropylene homopolymer. In some examples, sheet 30 may comprise up to 99% polypropylene impact copolymer. Sheet 30 may comprise an amount of polypropylene homopolymer selected from a range of about 5% to about 95%, about 10% to about 95%, about 10% to about 85%, about 20% to about 85%, about 20% to about 75%, about 30% to about 75%, about 40% to about 75%, or about 40% to about 60% by weight of sheet. In some embodiments, sheet 30 may comprise an amount of polypropylene homopolymer selected from a range of about 15% to about 75%, about 15% to about 65%, about 15% to about 50%, about 20% to about 50%, or about 25% to about 45% by weight of sheet. Sheet 30 may comprise an amount of polypropylene homopolymer of about 5%, about 10%, about 15%, about 20%, about 25%, about 30%, about 35%, about 40%, about 45%, about 48%, about 49%, about 50%, about 51%, about 52%, about 55%, about 60%, about 65%, about 70%, about 80%, or about 95% by weight of sheet. Sheet 30 may comprise an amount of polypropylene impact copolymer selected from a range of about 5% to about 95%, about 10% to about 95%, about 10% to about 85%, about 20% to about 85%, about 20% to about 75%, about 25% to about 70%, about 30% to about 75%, about 40% to about 75%, about 45% to about 65%, or about 40% to about 60% by weight of sheet. Sheet 30 may comprise an amount of polypropylene impact copolymer of about 5%, about 10%, about 15%, about 20%, about 25%, about 30%, about 35%, about 40%, about 45%, about 48%, about 49%, about 50%, about 51%, about 52%, about 55%, about 60%, about 65%, about 70%, about 80%, or about 95% by weight of sheet. In some examples, sheet 30 comprises about 50% polypropylene homopolymer and about 50% polypropylene impact copolymer. In some examples, sheet 30 comprises about 50% polypropylene homopolymer and about 49% polypropylene impact copolymer. In some examples, the single-layer sheet comprises about 35% polypropylene homopolymer and about 55% polypropylene impact copolymer.

In some embodiments, sheet 30 has a rubber content up to about 50% by weight of sheet. In some embodiments, sheet 30 comprises at least 0.05%, 1%, 2%, 3%, 4%, 5%, 6%, 7%, 8%, 9%, 10%, 12%, 14%, 16%, 18%, 20%, 25%, 30%, 35%, or 40% by weight rubber. In some embodiments, the rubber content of sheet 30 can be selected from a first series of ranges of about 0.5% to about 50%, about 0.5% to about 40%, about 0.5% to about 30%, about 0.5% to about 20%, about 0.5% to about 18%, about 0.5% to about 16%, or 0.5% to about 10%, or about 0.5% to about 5% by weight of the single-layer sheet. In some embodiments, the rubber content of sheet 30 can be selected from a second series of ranges of about 0.5% to about 20%, about 1% to about 20%, about 2% to about 20%, about 2.5% to about 20%, about 2.5% to about 20%, about 3% to about 20%, about 3.5% to about 20%, about 4% to about 20%, about 4.5% to about 20%, about 5% to about 20%, about 6% to about 20%, or about 7% to about 20% by weight of sheet 30. In some embodiments, the rubber content of sheet 30 can be selected from a third series of ranges of about 0.5% to about 20%, about 1% to about 20%, about 1.5% to about 20%, about 2% to about 20%, about 2% to about 15%, about 2% to about 10%, about 2% to about 8%, or about 2% to about 5% by weight of the single-layer sheet. In some examples, the rubber content is about 0.5%, about 1%, about 1.5%, about 2%, about 2.5%, about 3%, about 3.5% about 4%, about 4.5% about 5%, about 6%, about 7%, about 7.5%, about 8%, about 8.5%, about 9%, about 9.5%, about 10%, about 12%, about 14%, about 16%, about 18%, about 20%, about 25%, about 30%, about 35%, about 40%, about 45%, or about 50% by weight of sheet 30.

In some embodiments, the polypropylene homopolymer has a melt flow as measured by ASTM Method D1238 (230° C., 2.16 kg) of a range of about 1 g/10 min to about 10 g/10 min, about 1 g/10 min to about 5 g/10 min, or about 1 g/10 min to about 4 g/10 min. In some examples, the polypropylene homopolymer has a melt flow as measured by ASTM Method D1238 (230° C., 2.16 kg) of about 1 g/10 min, about 1.5 g/10 min, about 2 g/10 min, about 2.5 g/10 min, about 3 g/10 min, about 3.5 g/10 min, about 4 g/10 min, about 5 g/10 min, about 6 g/10 min, about 7 g/10 min, about 8 g/10 min, or about 10 g/10 min.

In some embodiments, the polypropylene homopolymer has a flexural modular as measured by ASTM Method D790A (0.05 in/min, 1% secant) of a range of about 100,000 psi to about 700,000 psi, about 100,000 psi to about 600,000 psi, about 100,000 psi to about 500,000 psi, or about 200,000 psi to about 500,000 psi. In some examples, the polypropylene homopolymer has a flexural modular as measured by ASTM Method D790A (0.05 in/min, 1% secant) of about 100,000 psi, about 200,000 psi, about 250,000 psi, about 300,000 psi, about 350,000 psi, about 400,000 psi, about 500,000 psi, about 600,000 psi, or about 700,000 psi.

In some embodiments, the polypropylene impact copolymer has a melt flow as measured by ASTM Method D1238 (230° C., 2.16 kg) of a range of about 1 g/10 min to about 10 g/10 min, about 1 g/10 min to about 8 g/10 min, about 2 g/10 min to about 8 g/10 min, or about 2 g/10 min to about 6 g/10 min. In some examples, the polypropylene impact copolymer has a melt flow as measured by ASTM Method D1238 (230° C., 2.16 kg) of about 1 g/10 min, about 2 g/10 min, about 2.5 g/10 min, about 3 g/10 min, about 3.5 g/10 min, about 4 g/10 min, about 4.5 g/10 min, about 5 g/10 min, about 5.5 g/10 min, about 6 g/10 min, about 7 g/10 min, about 8 g/10 min, or about 10 g/10 min.

In some embodiments, the polypropylene impact copolymer has a flexural modular as measured by ASTM Method D790A (0.05 in/min, 1% secant) of a range of about 100,000 psi to about 700,000 psi, about 100,000 psi to about 600,000 psi, about 100,000 psi to about 500,000 psi, or about 200,000 psi to about 500,000 psi. In some examples, the polypropylene impact copolymer has a flexural modular as measured by ASTM Method D790A (0.05 in/min, 1% secant) of about 100,000 psi, 200,000 psi, about 230,000 psi, about 250,000 psi, about 300,000 psi, about 350,000 psi, about 400,000 psi, about 500,000 psi, about 600,000 psi, or about 700,000 psi.

In some embodiments, the polypropylene impact copolymer has a rubber content up to about 50% by weight of the polypropylene impact copolymer. In some embodiments, the polypropylene impact copolymer comprises at least 0.05%, 1%, 2%, 3%, 4%, 5%, 6%, 7%, 8%, 9%, 10%, 12%, 14%, 16%, 18%, 20%, 25%, 30%, 35%, or 40% by weight rubber. In some embodiments, the rubber content of the polypropylene impact copolymer can be selected from a first series of ranges of about 0.5% to about 50%, about 0.5% to about 40%, about 0.5% to about 30%, about 0.5% to about 20%, about 0.5% to about 18%, about 0.5% to about 16%, or about 0.5% to about 10% by weight of the polypropylene impact copolymer. In some embodiments, the rubber content of the polypropylene impact copolymer can be selected from a second series of ranges of about 0.5% to about 30%, about 1% to about 30%, about 3% to about 30%, about 5% to about 30%, about 6% to about 30%, or about 7% to about 30% by weight of the polypropylene impact copolymer. In some embodiments, the rubber content of the polypropylene impact copolymer can be selected from a third series of ranges of about 0.5% to about 30%, about 1% to about 30%, about 1% to about 20%, about 2% to about 20%, about 2% to about 15%, about 3% to about 15%, about 3% to about 10%, or about 5% to about 10% by weight of the polypropylene impact copolymer. In some examples, the rubber content is about 0.5%, about 1%, about 3%, about 4%, about 5%, about 6%, about 7%, about 7.5%, about 8%, about 8.5%, about 9%, about 9.5%, about 10%, about 12%, about 14%, about 16%, about 18%, about 20%, about 25%, about 30%, about 35%, about 40%, about 45%, or about 50% by weight of the polypropylene impact copolymer.

In some embodiments, sheet 30 comprises a polymeric mixture further comprising an additive. Exemplary additives include a copolymer, clarifiers, process aids, slip agents, combinations thereof, or any suitable material for improving the single-layer sheet. In some embodiments, the additive is a clarifier. In some embodiments, the clarifier is a polypropylene random copolymer. In some embodiments, the additive is a copolymer. In some embodiments, the additive is a random copolymer. In some embodiments, the copolymer is an ethylene-polypropylene copolymer. In some embodiments, the copolymer is a random ethylene-polypropylene copolymer. In some embodiments, sheet 30 comprises Braskem RP650. In some embodiments, the additive is Braskem RP650.

In some embodiments, the additive may be up to about 20% or up to about 10% by weight of the polymeric mixture of sheet 30. In some embodiments, the additive may be selected from a range of about 0.5% to about 20%, about 0.5% to about 15%, about 5% to about 15%, about 0.5% to about 10%, about 0.5% to about 5%, or about 0.5% to about 3% by weight of sheet 30. In some embodiments sheet 30 comprises about 0.5%, about 1%, about 1.5%, about 2%, about 3%, about 4%, about 5%, about 6%, about 8%, about 10%, about 12%, about 14%, about 16%, about 18%, or about 20%, by weight of an additive. In some embodiments, the polymeric mixture of sheet 30 comprises about 0.5% to about 5% ethylene-propylene copolymer. In some embodiments, the polymeric mixture comprises about 0.5% to about 15% ethylene-propylene random copolymer. In some embodiments, the polymeric mixture comprises about 5% to about 15% ethylene-propylene random copolymer.

In some embodiments, sheet 30 consists of a polymeric mixture comprising a first polypropylene and a second polypropylene in accordance with the present disclosure. In some embodiments, sheet 30 comprises a polymeric formulation consisting of a first polypropylene, a second polypropylene, and an additive. In some embodiments, sheet 30 comprises a polymeric formulation consisting of a first polypropylene, a second polypropylene, and a random copolymer. In some embodiments, sheet 30 comprises a polymeric formulation consisting of a first polypropylene, a second polypropylene, and an ethylene-propylene copolymer. In some embodiments, sheet 30 comprises a polymeric formulation consisting of a first polypropylene and a second polypropylene.

In some embodiments, sheet 30 consists of a polymeric mixture comprising a base resin and a secondary resin in accordance with the present disclosure. In some embodiments, sheet 30 comprises a polymeric formulation consisting of a base resin, a secondary resin, and an additive. In some embodiments, sheet 30 comprises a polymeric formulation consisting of a base resin, a secondary resin, and a random copolymer. In some embodiments, sheet 30 comprises a polymeric formulation consisting of a base resin, a secondary resin, and an ethylene-propylene copolymer. In some embodiments, sheet 30 comprises a polymeric formulation consisting of a polypropylene homopolymer and an polypropylene impact copolymer. In some embodiments, sheet 30 comprises a polymeric formulation consisting of a polypropylene homopolymer, a polypropylene impact copolymer, and a polypropylene random copolymer.

In some embodiments, sheet 30 consists of a polymeric mixture consisting of a base resin and a secondary resin in accordance with the present disclosure. In some embodiments, sheet 30 consists of a polymeric formulation consisting of a base resin, a secondary resin, and an additive. In some embodiments, sheet 30 consists of a polymeric formulation consisting of a base resin, a secondary resin, and a random copolymer. In some embodiments, sheet 30 consists of a polymeric formulation consisting of a base resin, a secondary resin, and an ethylene-propylene copolymer. In some embodiments, sheet 30 consists of a polymeric formulation consisting of a polypropylene homopolymer and an polypropylene impact copolymer. In some embodiments, sheet 30 consists of a polymeric formulation consisting of a polypropylene homopolymer, a polypropylene impact copolymer, and a polypropylene random copolymer.

The following numbered clauses include embodiments that are contemplated and non-limiting:

Clause 1. A method of providing an article, the method comprising
providing a sheet comprising polymeric materials.

Clause 2. The method of clause 1, any other suitable clause, or combination of suitable clauses, further comprising molding the sheet onto a mold to provide an article-blank web.

Clause 3. The method of clause 2, any other suitable clause, or combination of suitable clauses, further comprising cutting the article-blank web to form a carrier web and an article preform coupled with the carrier web after molding the sheet.

Clause 4. The method of clause 3, any other suitable clause, or combination of suitable clauses, separating the article preform from the carrier web to provide the article.

Clause 5. The method of clause 4, any other suitable clause, or combination of suitable clauses, further comprising conditioning the sheet with a surface of a rotating roller and the surface of the rotating roller has a surface roughness of greater than about 80 Ra and less than about 380 (microinches).

Clause 6. The method of clause 4, any other suitable clause, or combination of suitable clauses, wherein the mold is included in a rotary thermoformer, the molding stage includes applying the sheet onto the mold included in the rotary thermoformer to provide the article-blank web, and the polymeric materials has a shrinkage rate of about or greater than about 0.008 inches per inch.

Clause 7. The method of clause 6, any other suitable clause, or combination of suitable clauses, wherein the polymeric materials include polypropylene.

Clause 8. The method of clause 7, any other suitable clause, or combination of suitable clauses, wherein the polypropylene comprises rubber.

Clause 9. The method of clause 4, any other suitable clause, or combination of suitable clauses, wherein the molding stage includes applying the sheet to a single sided tool.

Clause 10. The method of clause 4, any other suitable clause, or combination of suitable clauses, wherein the polymeric materials comprise polypropylene and the article has a wall thickness of about 0.012 inches and is within three sigma of a standard deviation of 0.06.

Clause 11. The method of clause 4, any other suitable clause, or combination of suitable clauses, wherein the polymeric materials comprise polypropylene and the article has a wall thickness of about 0.010 inches and is within three sigma of a standard deviation of 0.1.

Clause 12. The method of clause 4, any other suitable clause, or combination of suitable clauses, wherein controlling edge curl includes applying the sheet to edge-curl blocking strips.

Clause 13. The method of clause 12, any other suitable clause, or combination of suitable clauses, wherein the molding stage is performed using a rotary thermoformer and the edge-curl blocking strips are coupled with the rotary thermoformer.

Clause 14. The method of clause 4, any other suitable clause, or combination of suitable clauses, wherein the cutting stage is performed with a rotor die that includes a rotor configured to rotate about an axis and dies coupled with the die and the dies are adjustable axially, radially, and circumferentially relative to the rotor about the axis.

Clause 15. The method of clause 4, any other suitable clause, or combination of suitable clauses, further comprising splitting the article-blank web into at least two strips after the molding stage and before the cutting stage.

Clause 16. The method of clause 4, any other suitable clause, or combination of suitable clauses, wherein the molding stage is performed using a rotary thermoformer and the article has a clarity of about or greater than about 40% as measured using ASTM D 1746 and a haze of about or less than about 70% as measured using ASTM D 1003 procedure B.

Clause 17. The method of clause 4, any other suitable clause, or combination of suitable clauses, wherein the sheet has a thickness of about or less than about 0.012 inches and the polymeric materials have a shrinkage rate of about or greater than about 0.008 inches per inch.

Clause 18. The method of clause 17, any other suitable clause, or combination of suitable clauses, wherein the polymeric materials comprise polypropylene.

Clause 19. The method of clause 4, any other suitable clause, or combination of suitable clauses, wherein the providing stage includes extruding the sheet comprising polymeric materials.

Clause 20. A method of providing a thermoformed article, the method comprising
providing a sheet comprising polymeric materials.

Clause 21. The method of clause 20, any other suitable clause, or combination of suitable clauses, further comprising conditioning the sheet with a surface of a rotating roller.

Clause 22. The method of clause 21, any other suitable clause, or combination of suitable clauses, wherein the rotating roller has a surface roughness of less than about 400 Ra (microinches).

Clause 23. The method of clause 22, any other suitable clause, or combination of suitable clauses, further comprising thermoforming the sheet onto a mold to provide an article-blank web having a plurality of article blanks formed therein after conditioning the sheet.

Clause 24. The method of clause 23, any other suitable clause, or combination of suitable clauses, further comprising cutting the article-blank web after thermoforming the sheet to provide the thermoformed article.

Clause 25. The method of clause 24, any other suitable clause, or combination of suitable clauses, wherein the thermoforming stage is performed using a rotary thermoformer.

Clause 26. The method of clause 25, any other suitable clause, or combination of suitable clauses, wherein the cutting stage is performed using a rotary cutter.

Clause 27. The method of clause 24, any other suitable clause, or combination of suitable clauses, wherein cutting the article-blank web includes rotating a rotor die included in a rotary cutter about an axis, measuring a distance between the rotor die and a first article blank included in the plurality of article blanks located upstream of the rotor die, varying a rotational speed of the rotor die based on the distance, and applying pressure to the article-blank web with the rotor die.

Clause 28. The method of clause 24, any other suitable clause, or combination of suitable clauses, further comprising splitting the article-blank web into at least two strips before cutting the article-blank web.

Clause 29. The method of clause 24, any other suitable clause, or combination of suitable clauses, wherein the cutting stage is performed using a rotor die that includes a rotor arranged to rotate about an axis and a plurality of dies coupled with the rotor for rotation about the axis and each of the plurality of dies are configured to selectively move at least one of axially, radially, and circumferentially relative to the rotor to adjust a position of the die.

Clause 30. The method of clause 24, any other suitable clause, or combination of suitable clauses, wherein the thermoformed article has a clarity of about or greater than about 50% as measured using ASTM D 1746 and a haze of about or less than about 60% as measured using ASTM D 1003 procedure B.

Clause 31. The method of clause 30, any other suitable clause, or combination of suitable clauses, wherein the surface roughness of the surface of the rotating roller is between about 100 Ra and about 240 Ra (microinches).

Clause 32. The method of clause 31, any other suitable clause, or combination of suitable clauses, wherein the polymeric materials comprise polypropylene.

Clause 33. The method of clause 32, any other suitable clause, or combination of suitable clauses, wherein the polymeric materials comprise a polypropylene impact copolymer.

Clause 34. The method of clause 33, any other suitable clause, or combination of suitable clauses, wherein the thermoforming stage includes applying the sheet to a rotary thermoformer, the rotary thermoformer including a rotor mounted to rotate about a rotation axis of the rotary thermoformer, the mold which is coupled to the rotor for rotation therewith, and a curl-blocking strip coupled to the rotor and including a plurality of protrusions that extend radially outward away from the rotor toward the sheet to engage and block the sheet from curling away from the rotor during the rotary thermoforming stage.

Clause 35. The method of clause 24, any other suitable clause, or combination of suitable clauses, wherein providing the sheet includes extruding the sheet through a die.

Clause 36. A method of providing a thermoformed article, the method comprising extruding a sheet comprising polymeric materials.

Clause 37. The method of clause 36, any other suitable clause, or combination of suitable clauses, further comprising rotary thermoforming the sheet onto a mold to provide an article-blank web after conditioning the sheet without applying an external mold to the sheet during the rotary thermoforming stage.

Clause 38. The method of clause 37, any other suitable clause, or combination of suitable clauses, further comprising cutting the article-blank web after rotary thermoforming the sheet to provide the thermoformed article.

Clause 39. The method of clause 38, any other suitable clause, or combination of suitable clauses, further including conditioning the sheet with a surface of a rotating roller before the rotary thermoforming stage.

Clause 40. The method of clause 38, any other suitable clause, or combination of suitable clauses, further comprising splitting the article-blank web into at least two strips after rotary thermoforming the sheet and before cutting the article-blank web.

Clause 41. The method of clause 38, any other suitable clause, or combination of suitable clauses, wherein the cutting stage includes rotating a rotor die included in a rotary cutter and applying pressure to the article-blank web with the rotor die.

Clause 42. The method of clause 41, any other suitable clause, or combination of suitable clauses, further comprising measuring a distance between the rotor die and a first article blank included in the plurality of article blanks and located upstream of the rotor die and varying a rotational speed of the rotor die based on the distance.

Clause 43. The method of clause 42, any other suitable clause, or combination of suitable clauses, further comprising splitting the article-blank web into at least two strips after rotary thermoforming the sheet and before cutting the article-blank web.

Clause 44. The method of clause 43, any other suitable clause, or combination of suitable clauses, wherein the rotor die includes a rotor arranged to rotate about an axis and a plurality of dies coupled with the rotor for rotation about the axis and each of the plurality of dies is configured to move selectively axially relative to the rotor to adjust a position of the die.

Clause 45. The method of clause 44, any other suitable clause, or combination of suitable clauses, wherein each of the plurality of dies are configured to move selectively at least one of radially and circumferentially relative to the rotor.

Clause 46. The method of clause 41, any other suitable clause, or combination of suitable clauses, wherein the rotor die includes a rotor arranged to rotate about an axis and a plurality of dies coupled with the rotor for rotation about the axis and each of the plurality of dies configured to selectively move axially, radially, and circumferentially relative to the rotor to adjust a position of the die.

Clause 47. The method of clause 38, any other suitable clause, or combination of suitable clauses, wherein the sheet has an average thickness of less than about 0.012 inches.

Clause 48. The method of clause 47, any other suitable clause, or combination of suitable clauses, wherein the thermoformed article has a clarity of about or greater than about 50% as measured using ASTM D 1746 and a haze of about or less than about 60% as measured using ASTM D 1003 procedure B.

Clause 49. The method of clause 38, any other suitable clause, or combination of suitable clauses, wherein the polymeric materials include only non-aromatic polymeric materials and the polymeric materials include at least polypropylene.

EXAMPLES

The following examples are set forth for purposes of illustration only. Parts and percentages appearing in such examples are by weight unless otherwise stipulated. All ASTM, ISO, and other standard test methods cited or referred to in this disclosure are incorporated by reference in their entirety.

Example 1

Formulation and Extrusion

An exemplary single-layer sheet 30 in accordance with certain aspects of the present disclosure is provided in the instant example. Sheet 30 in this example is a single-layer sheet.

A polymeric mixture comprised a polypropylene homopolymer, a polypropylene impact copolymer, and a polypropylene random copolymer. The polypropylene homopolymer was Braskem INSPIRE™ 6025N. The polypropylene impact copolymer was LyondellBassell Pro-fax™ SC204. The clarifier was Braskem RP650. The percentages by weight of the components were about:

| | |
|---|---|
| 50% | Braskem INSPIRE ™ 6025N |
| 49% | LyondellBassell Pro-fax ™ SC204 |
| 1% | Braskem RP650 |

The polypropylene homopolymer, the polypropylene impact copolymer, and the polypropylene random copolymer were added to an extruder hopper and combined via blending to provide a formulation. The formulation was then heated in the extruder to form a molten material. The molten material was extruded to form a single-layer sheet. The single-layer sheet was thermoformed to form a lid in accordance with the present disclosure.

Example 2

Formulation and Extrusion

An exemplary single-layer sheet 30 in accordance with certain aspects of the present disclosure is provided in the instant example. Sheet 30 in this example is a single-layer sheet.

A polymeric mixture comprised a polypropylene homopolymer and a polypropylene impact copolymer. The polypropylene homopolymer was Braskem INSPIRE™ 6025N. The polypropylene impact copolymer was LyondellBassell Pro-fax™ SC204. The percentages by weight of the components were about:

| | |
|---|---|
| 50% | Braskem INSPIRE ™ 6025N |
| 50% | LyondellBassell Pro-fax ™ SC204 |

The polypropylene homopolymer and the polypropylene impact copolymer were added to an extruder hopper and combined via blending to provide a formulation. The formulation was then heated in the extruder to form a molten material. The molten material was extruded to form a single-layer sheet. The single-layer sheet was thermoformed to form a lid in accordance with the present disclosure.

Example 3

Formulation and Extrusion

An exemplary single-layer sheet 30 in accordance with certain aspects of the present disclosure is provided in the instant example. Sheet 30 in this example is a single-layer sheet.

A polymeric mixture comprised a polypropylene homopolymer, a polypropylene impact copolymer, and a polypropylene random copolymer. The polypropylene homopolymer was Braskem INSPIRE™ 6025N. The polypropylene impact copolymer was LyondellBassell Pro-fax™ SC204. The clarifier was Braskem RP650. The percentages by weight of the components were about:

| | |
|---|---|
| 35% | Braskem INSPIRE ™ 6025N |
| 55% | LyondellBassell Pro-fax ™ SC204 |
| 10% | Braskem RP650 |

The polypropylene homopolymer, the polypropylene impact copolymer, and the polypropylene random copolymer were added to an extruder hopper and combined via blending to provide a formulation. The formulation was then heated in the extruder to form a molten material. The molten material was extruded to form a single-layer sheet. The single-layer sheet was thermoformed to form a lid in accordance with the present disclosure.

Example 4

Formulation and Extrusion

An exemplary single-layer sheet in accordance with certain aspects of the present disclosure is provided in the instant example. The sheet in this example is a single-layer sheet.

A polymeric mixture comprised a polypropylene impact copolymer and a polypropylene homopolymer. The polypropylene impact copolymer was LyondellBassell Pro-fax™ SC204. The polypropylene homopolymer was Braskem INSPIRE™ 6025N. The percentages by weight of the components were about:

| | |
|---|---|
| 65% | LyondellBassell Pro-fax ™ SC204 |
| 35% | Braskem INSPIRE ™ 6025N |

The polypropylene impact copolymer and the polypropylene homopolymer were added to an extruder hopper and combined via blending to provide a formulation. The formulation was then heated in the extruder to form a molten material. The molten material was extruded to form a single-layer sheet. The single-layer sheet was thermoformed to form a lid in accordance with the present disclosure.

Example 5

Formulation and Extrusion

An exemplary single-layer sheet in accordance with certain aspects of the present disclosure is provided in the instant example. The sheet in this example is a single-layer sheet.

A polymeric mixture comprised a polypropylene impact copolymer and a polypropylene homopolymer. The polypropylene impact copolymer was LyondellBassell Pro-fax™ SC204. The polypropylene homopolymer was Braskem INSPIRE™ 6025N. The percentages by weight of the components were about:

| | |
|---|---|
| 75% | LyondellBassell Pro-fax ™ SC204 |
| 25% | Braskem INSPIRE ™ 6025N |

The polypropylene impact copolymer and the polypropylene homopolymer were added to an extruder hopper and combined via blending to provide a formulation. The formulation was then heated in the extruder to form a molten material. The molten material was extruded to form a single-layer sheet. The single-layer sheet was thermoformed to form a lid in accordance with the present disclosure.

Example 6

Formulation and Extrusion

An exemplary single-layer sheet in accordance with certain aspects of the present disclosure is provided in the instant example. The sheet in this example is a single-layer sheet.

A polymeric mixture comprised a polypropylene impact copolymer, a polypropylene homopolymer, and a polypropylene random copolymer. The polypropylene impact copolymer was LyondellBassell Pro-fax™ SC204. The polypropylene homopolymer was Braskem INSPIRE™ 6025N. The clarifier was Braskem RP650. The percentages by weight of the components were about:

| | |
|---|---|
| 55% | LyondellBassell Pro-fax ™ SC204 |
| 25% | Braskem INSPIRE ™ 6025N |
| 20% | Braskem RP650 |

The polypropylene impact copolymer, the polypropylene homopolymer, and the polypropylene random copolymer were added to an extruder hopper and combined via blending to provide a formulation. The formulation was then heated in the extruder to form a molten material. The molten material was extruded to form a single-layer sheet. The single-layer sheet was thermoformed to form a lid in accordance with the present disclosure.

Example 7

Formulation and Extrusion

An exemplary single-layer sheet in accordance with certain aspects of the present disclosure is provided in the instant example. The sheet in this example is a single-layer sheet.

A polymeric mixture comprised a polypropylene impact copolymer. The polypropylene impact copolymer was LyondellBassell Pro-fax™ SC204. The percentages by weight of the components were about:

100% LyondellBassell Pro-fax™ SC204

The polypropylene impact copolymer was added to an extruder hopper to provide a formulation. The formulation was then heated in the extruder to form a molten material. The molten material was extruded to form a single-layer sheet. The single-layer sheet was thermoformed to form a lid in accordance with the present disclosure.

Articles 10 may be used in cold or refrigerated environments such as in cold climates or may be used soon after being stored in a cold storage location. Edges and features of articles 10 of the present disclosure may resist cracking due to being deformed to cause localized crazing (whitening) when cold. Even still, rounded edges may experience improved resistance to cracking in response to being deformed at cold temperatures or at room temperature as compared to non-rounded or sharp edges on article 10. Curved edges may minimize cracking of article 10 at and around the curved edges. In the illustrative embodiment, features 86 of lid 210 include several curved edges that connect the panels of feature 86 with a top plate of feature 86 as suggested in FIG. 2.

In some embodiments, formulas having at least about 40% by weight polypropylene impact copolymer reduce or eliminate cracking of the edges of articles 10 when articles 10 have a temperature of about 55 degrees Fahrenheit or less and are deformed to cause crazing. In some embodiments, formulas having at least about 50% by weight polypropylene impact copolymer reduce or eliminate cracking of the edges of articles 10 when articles 10 have a temperature of about 55 degrees Fahrenheit or less and are deformed to cause crazing. In some embodiments, formulas having at least about 55% by weight polypropylene impact copolymer reduce or eliminate cracking of the edges of articles 10 when articles 10 have a temperature of about 55 degrees Fahrenheit or less and are deformed to cause crazing.

The invention claimed is:

1. A method of providing a thermoformed article, the method comprising
providing a sheet comprising non-aromatic polymeric materials,
conditioning the sheet with a rotating roller,
transferring the sheet from the rotating roller to a rotary thermoformer having a rotation axis,
thermoforming the sheet onto the rotary thermoformer to provide an article-blank web on a first portion of the sheet and a plurality of first protrusions on a second portion of the sheet located axially outward of the first portion of the sheet relative to the rotation axis to block the second portion of the sheet from curling away from a rotor of the rotary transformer, each protrusion of the plurality of first protrusions being elliptical in shape with converging pointed ends, the plurality of first protrusions including a first row of protrusions and a second row of protrusions adjacent to and axially inward of the first row of protrusions, the first row of protrusions oriented with the pointed ends of each protrusion of the first row of protrusions aligned in a first direction and the second row of protrusions oriented with the pointed ends of each protrusions of the second row of protrusions aligned in a second direction, the second direction different than the first direction, and cutting the article-blank web to provide the thermoformed article.

2. The method of claim 1, wherein the article-blank web is formed at about the same time as the plurality of first protrusions, wherein the plurality of first protrusions are formed on the article-blank web by thermoforming the sheet to a curl-blocking strip on the rotary thermoformer.

3. The method of claim 1, wherein the thermoforming stage provides a plurality of second protrusions on a third portion of the sheet that is located axially outward of the second portion to locate the second portion axially between the first and third portions, each protrusion of the plurality of second protrusions being elliptical in shape with converging pointed ends, the plurality of second protrusions including a third row of protrusion and a fourth row of protrusions adjacent to and axially inward of the third row of protrusions, the third row of protrusions oriented with the pointed ends of each protrusion of the third row of protrusions aligned in a third direction and the fourth row of protrusions oriented with the pointed ends of each protrusions of the fourth row of protrusions aligned in a fourth direction, the fourth direction different than the third direction.

4. The method of claim 1, wherein further comprising directing a forced fluid toward the rotary thermoformer at a location aligned radially outward and above the second portion to urge the second portion of the sheet into engagement with the rotary thermoformer.

5. The method of claim 4, wherein the directing stage comprises cooling the sheet and the plurality of first protrusions with a strip-cooling air blower.

6. The method of claim 5, wherein the forced fluid has a temperature lower than a temperature of the sheet at the thermoforming stage.

7. The method of claim 1, wherein the rotor is mounted to rotate about the rotation axis, a mold coupled to the rotor and configured to provide the article-blank web on the first portion of the sheet, and a strip of protrusions coupled to the rotor and configured to provide the plurality of first protrusions on the second portion of the sheet.

8. The method of claim 7, wherein the mold has an axial mold width and the strip of protrusions has an axial strip width, and the axial mold width is greater than the axial strip width.

9. The method of claim 1, wherein the article-blank web includes at least one article blank having an article-blank length, and wherein the plurality of first protrusions form a protrusion strip having a protrusion strip length, and the protrusion strip length is greater than the article-blank length.

10. The method of claim 9, wherein the at least one article blank has an axial article-blank width, the curl-blocking strip has an axial curl-blocking strip width, and the axial article-blank width is greater than the axial curl-blocking strip width.

* * * * *